US012100287B2

(12) United States Patent
Cohn et al.

(10) Patent No.: US 12,100,287 B2
(45) Date of Patent: Sep. 24, 2024

(54) METHOD AND SYSTEM FOR PROCESSING SECURITY EVENT DATA

(71) Applicant: iControl Networks, Inc., Philadelphia, PA (US)

(72) Inventors: Alan Wade Cohn, Austin, TX (US); Gary Robert Faulkner, Austin, TX (US); James Edward Kitchen, Round Rock, TX (US); David Leon Proft, Austin, TX (US); Corey Wayne Quain, Lago Vista, TX (US)

(73) Assignee: iControl Networks, Inc., Philadelphia, PA (US)

(*) Notice: Subject to any disclaimer, the term of this patent is extended or adjusted under 35 U.S.C. 154(b) by 58 days.

(21) Appl. No.: 17/723,101

(22) Filed: Apr. 18, 2022

(65) Prior Publication Data

US 2023/0005358 A1 Jan. 5, 2023

Related U.S. Application Data

(63) Continuation of application No. 16/910,967, filed on Jun. 24, 2020, now Pat. No. 11,341,840, which is a continuation of application No. 16/059,833, filed on Aug. 9, 2018, now Pat. No. 10,741,057, which is a continuation of application No. 14/852,822, filed on Sep. 14, 2015, now Pat. No. 10,078,958, which is a continuation of application No. 12/971,282, filed on Dec. 17, 2010, now Pat. No. 9,147,337.

(51) Int. Cl.
*G08B 25/14* (2006.01)
*G08B 25/00* (2006.01)

(52) U.S. Cl.
CPC .......... *G08B 25/14* (2013.01); *G08B 25/004* (2013.01)

(58) Field of Classification Search
CPC .......................... G08B 25/14; G08B 25/004
USPC .......................................................... 340/501
See application file for complete search history.

(56) References Cited

U.S. PATENT DOCUMENTS

| | | | |
|---|---|---|---|
| 686,838 | A | 11/1901 | Appel |
| 1,738,540 | A | 12/1929 | Replogle et al. |
| 3,803,576 | A | 4/1974 | Dobrzanski et al. |
| 3,852,541 | A | 12/1974 | Altenberger |
| 4,006,460 | A | 2/1977 | Jewitt et al. |
| 4,141,006 | A | 2/1979 | Braxton |
| 4,206,449 | A | 6/1980 | Apsell et al. |
| 4,257,038 | A | 3/1981 | Rounds et al. |
| 4,286,331 | A | 8/1981 | Anderson et al. |

(Continued)

FOREIGN PATENT DOCUMENTS

| | | | |
|---|---|---|---|
| AU | 2005223267 | B2 | 12/2010 |
| AU | 2010297957 | A1 | 5/2012 |

(Continued)

OTHER PUBLICATIONS

U.S. Appl. No. 16/910,967, filed Jun. 24, 2020.

(Continued)

*Primary Examiner* — Kerri L McNally
(74) *Attorney, Agent, or Firm* — BakerHostetler

(57) ABSTRACT

Methods and systems for processing data associated with a premises management system are disclosed. The data may comprise alarm event data and non-alarm event data. The alarm event data and non-alarm event data may be processed to determine whether to send a notification.

24 Claims, 9 Drawing Sheets

(56) References Cited

U.S. PATENT DOCUMENTS

| | | | |
|---|---|---|---|
| 4,304,970 | A | 12/1981 | Fahey et al. |
| 4,351,023 | A | 9/1982 | Richer |
| 4,363,031 | A | 12/1982 | Reinowitz |
| 4,459,582 | A | 7/1984 | Sheahan et al. |
| 4,520,503 | A | 5/1985 | Kirst et al. |
| 4,559,526 | A | 12/1985 | Tani et al. |
| 4,559,527 | A | 12/1985 | Kirby |
| 4,567,557 | A | 1/1986 | Burns |
| 4,574,305 | A | 3/1986 | Campbell et al. |
| 4,581,606 | A | 4/1986 | Mallory |
| 4,591,834 | A | 5/1986 | Kyle |
| D284,084 | S | 6/1986 | Ferrara, Jr. |
| 4,641,127 | A | 2/1987 | Hogan et al. |
| 4,652,859 | A | 3/1987 | Van Wienen |
| 4,670,739 | A | 6/1987 | Kelly, Jr. |
| 4,683,460 | A | 7/1987 | Nakatsugawa |
| 4,694,282 | A | 9/1987 | Tamura et al. |
| 4,716,973 | A | 1/1988 | Cobern |
| 4,730,184 | A | 3/1988 | Bach |
| 4,754,261 | A | 6/1988 | Marino |
| 4,755,792 | A | 7/1988 | Pezzolo et al. |
| 4,779,007 | A | 10/1988 | Schlanger et al. |
| 4,785,289 | A | 11/1988 | Chen |
| 4,801,924 | A | 1/1989 | Burgmann et al. |
| 4,812,820 | A | 3/1989 | Chatwin |
| 4,818,970 | A | 4/1989 | Natale et al. |
| 4,833,339 | A | 5/1989 | Luchaco et al. |
| 4,833,449 | A | 5/1989 | Gaffigan |
| 4,855,713 | A | 8/1989 | Brunius |
| 4,860,185 | A | 8/1989 | Brewer et al. |
| 4,887,064 | A | 12/1989 | Drori et al. |
| 4,897,630 | A | 1/1990 | Nykerk |
| 4,918,623 | A | 4/1990 | Lockitt et al. |
| 4,918,717 | A | 4/1990 | Bissonnette et al. |
| 4,951,029 | A | 8/1990 | Severson |
| 4,959,713 | A | 9/1990 | Morotomi et al. |
| 4,962,473 | A | 10/1990 | Crain |
| 4,980,666 | A | 12/1990 | Hwang |
| 4,993,059 | A | 2/1991 | Smith et al. |
| 4,994,787 | A | 2/1991 | Kratt et al. |
| 4,996,646 | A | 2/1991 | Farrington |
| 5,023,901 | A | 6/1991 | Sloan et al. |
| 5,083,106 | A | 1/1992 | Kostusiak et al. |
| 5,086,385 | A | 2/1992 | Launey et al. |
| 5,091,780 | A | 2/1992 | Pomerleau |
| 5,109,278 | A | 4/1992 | Erickson et al. |
| 5,132,968 | A | 7/1992 | Cephus |
| 5,134,644 | A | 7/1992 | Garton et al. |
| 5,159,315 | A | 10/1992 | Schultz et al. |
| 5,160,879 | A | 11/1992 | Tortola et al. |
| 5,164,703 | A | 11/1992 | Rickman |
| 5,164,979 | A | 11/1992 | Choi |
| D337,569 | S | 7/1993 | Kando |
| 5,227,776 | A | 7/1993 | Starefoss |
| 5,237,305 | A | 8/1993 | Ishikuro et al. |
| 5,245,694 | A | 9/1993 | Zwern |
| 5,247,232 | A | 9/1993 | Lin |
| 5,280,527 | A | 1/1994 | Gullman et al. |
| 5,283,816 | A | 2/1994 | Gomez Diaz |
| 5,299,971 | A | 4/1994 | Hart |
| 5,319,394 | A | 6/1994 | Dukek |
| 5,319,698 | A | 6/1994 | Glidewell et al. |
| 5,334,974 | A | 8/1994 | Simms et al. |
| 5,400,011 | A | 3/1995 | Sutton |
| 5,400,246 | A | 3/1995 | Wilson et al. |
| 5,406,260 | A | 4/1995 | Cummings et al. |
| 5,410,343 | A | 4/1995 | Coddington et al. |
| 5,412,708 | A | 5/1995 | Katz |
| 5,414,409 | A | 5/1995 | Voosen et al. |
| 5,414,833 | A | 5/1995 | Hershey et al. |
| 5,428,293 | A | 6/1995 | Sinclair et al. |
| 5,438,607 | A | 8/1995 | Przygoda et al. |
| 5,446,445 | A | 8/1995 | Bloomfield et al. |
| 5,448,290 | A | 9/1995 | Vanzeeland |
| 5,452,344 | A | 9/1995 | Larson |
| 5,465,081 | A | 11/1995 | Todd |
| 5,471,194 | A | 11/1995 | Guscott |
| 5,481,312 | A | 1/1996 | Cash et al. |
| 5,483,224 | A | 1/1996 | Rankin et al. |
| 5,486,812 | A | 1/1996 | Todd |
| 5,499,014 | A | 3/1996 | Greenwaldt |
| 5,499,196 | A | 3/1996 | Pacheco |
| 5,510,975 | A | 4/1996 | Ziegler, Jr. |
| 5,519,878 | A | 5/1996 | Dolin, Jr. |
| RE35,268 | E | 6/1996 | Frolov et al. |
| 5,525,966 | A | 6/1996 | Parish |
| 5,526,428 | A | 6/1996 | Arnold |
| 5,534,845 | A | 7/1996 | Issa et al. |
| 5,541,585 | A | 7/1996 | Duhame et al. |
| 5,543,778 | A | 8/1996 | Stouffer |
| 5,546,072 | A | 8/1996 | Creuseremee et al. |
| 5,546,074 | A | 8/1996 | Bernal et al. |
| 5,546,447 | A | 8/1996 | Skarbo et al. |
| 5,548,646 | A | 8/1996 | Aziz et al. |
| 5,550,984 | A | 8/1996 | Gelb |
| 5,557,254 | A | 9/1996 | Johnson et al. |
| 5,565,843 | A | 10/1996 | Meyvis |
| 5,570,079 | A | 10/1996 | Dockery |
| 5,572,438 | A | 11/1996 | Ehlers et al. |
| 5,578,989 | A | 11/1996 | Pedtke |
| 5,579,197 | A | 11/1996 | Mengelt et al. |
| 5,579,221 | A | 11/1996 | Mun |
| D377,034 | S | 12/1996 | Matsushita |
| 5,586,254 | A | 12/1996 | Kondo et al. |
| 5,587,705 | A | 12/1996 | Morris |
| 5,598,086 | A | 1/1997 | Somerville |
| 5,602,918 | A | 2/1997 | Chen et al. |
| 5,604,493 | A | 2/1997 | Behlke |
| 5,606,615 | A | 2/1997 | Lapointe et al. |
| 5,621,662 | A | 4/1997 | Humphries et al. |
| 5,623,601 | A | 4/1997 | Vu |
| 5,625,338 | A | 4/1997 | Pildner et al. |
| 5,625,410 | A | 4/1997 | Washino et al. |
| 5,629,687 | A | 5/1997 | Sutton et al. |
| 5,630,216 | A | 5/1997 | McEwan |
| 5,631,630 | A | 5/1997 | McSweeney |
| 5,638,046 | A | 6/1997 | Malinowski |
| 5,650,773 | A | 7/1997 | Chiarello |
| 5,651,070 | A | 7/1997 | Blunt |
| 5,652,567 | A | 7/1997 | Traxler |
| 5,654,694 | A | 8/1997 | Newham |
| 5,675,321 | A | 10/1997 | McBride |
| 5,680,131 | A | 10/1997 | Utz |
| 5,682,133 | A | 10/1997 | Johnson et al. |
| 5,686,885 | A | 11/1997 | Bergman |
| 5,686,896 | A | 11/1997 | Bergman |
| 5,689,235 | A | 11/1997 | Sugimoto et al. |
| 5,689,708 | A | 11/1997 | Regnier et al. |
| 5,691,697 | A | 11/1997 | Carvalho et al. |
| 5,694,335 | A | 12/1997 | Hollenberg |
| 5,694,595 | A | 12/1997 | Jacobs et al. |
| 5,696,486 | A | 12/1997 | Poliquin et al. |
| 5,696,898 | A | 12/1997 | Baker et al. |
| D389,501 | S | 1/1998 | Mascarenas et al. |
| 5,706,191 | A | 1/1998 | Bassett et al. |
| 5,712,679 | A | 1/1998 | Coles |
| 5,714,933 | A | 2/1998 | Le Van Suu |
| 5,715,394 | A | 2/1998 | Jabs |
| 5,717,378 | A | 2/1998 | Malvaso et al. |
| 5,717,379 | A | 2/1998 | Peters |
| 5,717,578 | A | 2/1998 | Afzal |
| 5,719,551 | A | 2/1998 | Flick |
| 5,726,912 | A | 3/1998 | Krall et al. |
| 5,731,756 | A | 3/1998 | Roddy |
| 5,736,927 | A | 4/1998 | Stebbins et al. |
| 5,737,391 | A | 4/1998 | Dame et al. |
| 5,748,084 | A | 5/1998 | Isikoff |
| 5,748,089 | A | 5/1998 | Sizemore |
| 5,757,616 | A | 5/1998 | May et al. |
| 5,761,206 | A | 6/1998 | Kackman |
| 5,774,051 | A | 6/1998 | Kostusiak |
| 5,777,551 | A | 7/1998 | Hess |
| 5,777,837 | A | 7/1998 | Eckel et al. |
| 5,784,461 | A | 7/1998 | Shaffer et al. |

(56) References Cited

U.S. PATENT DOCUMENTS

| | | | |
|---|---|---|---|
| 5,784,463 | A | 7/1998 | Chen et al. |
| 5,790,531 | A | 8/1998 | Ellebracht et al. |
| 5,793,028 | A | 8/1998 | Wagener et al. |
| 5,793,763 | A | 8/1998 | Mayes et al. |
| 5,794,128 | A | 8/1998 | Brockel et al. |
| 5,796,401 | A | 8/1998 | Winer |
| 5,798,701 | A | 8/1998 | Bernal et al. |
| 5,801,618 | A | 9/1998 | Jenkins |
| 5,805,056 | A | 9/1998 | Mueller et al. |
| 5,805,064 | A | 9/1998 | Yorkey |
| 5,809,013 | A | 9/1998 | Kackman |
| 5,809,265 | A | 9/1998 | Blair et al. |
| 5,812,054 | A | 9/1998 | Cohen |
| 5,819,124 | A | 10/1998 | Somner et al. |
| 5,821,937 | A | 10/1998 | Tonelli |
| 5,825,865 | A | 10/1998 | Oberlander et al. |
| 5,838,226 | A | 11/1998 | Houggy et al. |
| 5,844,599 | A | 12/1998 | Hildin |
| 5,845,070 | A | 12/1998 | Ikudome |
| 5,845,081 | A | 12/1998 | Rangarajan et al. |
| 5,854,588 | A | 12/1998 | Dockery |
| 5,859,966 | A | 1/1999 | Hayman et al. |
| 5,861,804 | A | 1/1999 | Fansa et al. |
| 5,864,614 | A | 1/1999 | Farris et al. |
| 5,867,484 | A | 2/1999 | Shaunfield |
| 5,867,495 | A | 2/1999 | Elliott et al. |
| 5,874,952 | A | 2/1999 | Morgan |
| 5,875,395 | A | 2/1999 | Holmes |
| 5,877,696 | A | 3/1999 | Powell |
| 5,877,957 | A | 3/1999 | Bennett |
| 5,880,775 | A | 3/1999 | Ross |
| 5,881,226 | A | 3/1999 | Veneklase |
| 5,886,697 | A | 3/1999 | Naughton et al. |
| 5,886,894 | A | 3/1999 | Rakoff |
| 5,892,442 | A | 4/1999 | Ozery |
| 5,898,831 | A | 4/1999 | Hall et al. |
| 5,905,438 | A | 5/1999 | Weiss et al. |
| 5,907,279 | A | 5/1999 | Bruins et al. |
| 5,909,183 | A | 6/1999 | Borgstahl et al. |
| 5,914,655 | A | 6/1999 | Clifton et al. |
| 5,924,069 | A | 7/1999 | Kowalkowski et al. |
| 5,926,209 | A | 7/1999 | Glatt |
| 5,933,098 | A | 8/1999 | Haxton |
| 5,940,387 | A | 8/1999 | Humpleman |
| 5,943,394 | A | 8/1999 | Ader et al. |
| 5,952,815 | A | 9/1999 | Rouillard et al. |
| 5,955,946 | A | 9/1999 | Beheshti et al. |
| 5,958,053 | A | 9/1999 | Denker |
| 5,959,528 | A | 9/1999 | Right et al. |
| 5,959,529 | A | 9/1999 | Kail, IV |
| 5,963,916 | A | 10/1999 | Kaplan |
| 5,967,975 | A | 10/1999 | Ridgeway |
| 5,974,547 | A | 10/1999 | Klimenko |
| D416,910 | S | 11/1999 | Vasquez |
| 5,982,418 | A | 11/1999 | Ely |
| 5,991,795 | A | 11/1999 | Howard et al. |
| 5,995,838 | A | 11/1999 | Oda et al. |
| 5,999,525 | A | 12/1999 | Krishnaswamy et al. |
| 6,002,430 | A | 12/1999 | McCall et al. |
| 6,009,320 | A | 12/1999 | Dudley |
| 6,011,321 | A | 1/2000 | Stancu et al. |
| 6,011,921 | A | 1/2000 | Takahashi et al. |
| 6,032,036 | A | 2/2000 | Maystre et al. |
| 6,037,991 | A | 3/2000 | Thro et al. |
| 6,038,289 | A | 3/2000 | Sands |
| 6,040,770 | A | 3/2000 | Britton |
| 6,049,272 | A | 4/2000 | Lee et al. |
| 6,049,273 | A | 4/2000 | Hess |
| 6,049,598 | A | 4/2000 | Peters et al. |
| 6,052,052 | A | 4/2000 | Delmonaco |
| 6,058,115 | A | 5/2000 | Sawyer et al. |
| 6,060,994 | A | 5/2000 | Chen |
| 6,067,346 | A | 5/2000 | Akhteruzzaman |
| 6,067,440 | A | 5/2000 | Diefes |
| 6,069,655 | A | 5/2000 | Seeley et al. |
| 6,078,253 | A | 6/2000 | Fowler |
| 6,078,257 | A | 6/2000 | Ferraro |
| 6,078,649 | A | 6/2000 | Small et al. |
| 6,085,030 | A | 7/2000 | Whitehead et al. |
| 6,085,238 | A | 7/2000 | Yuasa et al. |
| 6,091,771 | A | 7/2000 | Seeley et al. |
| 6,094,134 | A | 7/2000 | Cohen |
| 6,097,429 | A | 8/2000 | Seeley et al. |
| 6,104,785 | A | 8/2000 | Chen |
| 6,107,918 | A | 8/2000 | Klein et al. |
| 6,107,930 | A | 8/2000 | Behlke et al. |
| 6,108,034 | A | 8/2000 | Kim |
| 6,112,015 | A | 8/2000 | Planas et al. |
| 6,112,237 | A | 8/2000 | Donaldson et al. |
| 6,117,182 | A | 9/2000 | Alpert et al. |
| 6,124,882 | A | 9/2000 | Voois et al. |
| 6,128,653 | A | 10/2000 | Del et al. |
| 6,134,303 | A | 10/2000 | Chen |
| 6,134,591 | A | 10/2000 | Nickles |
| 6,138,249 | A | 10/2000 | Nolet |
| 6,139,177 | A | 10/2000 | Venkatraman et al. |
| 6,140,987 | A | 10/2000 | Stein et al. |
| 6,144,993 | A | 11/2000 | Fukunaga et al. |
| 6,154,133 | A | 11/2000 | Ross et al. |
| 6,157,649 | A | 12/2000 | Peirce et al. |
| 6,157,943 | A | 12/2000 | Meyer |
| 6,161,182 | A | 12/2000 | Nadooshan |
| 6,167,186 | A | 12/2000 | Kawasaki et al. |
| 6,167,253 | A | 12/2000 | Farris et al. |
| 6,181,341 | B1 | 1/2001 | Shinagawa |
| 6,192,282 | B1 | 2/2001 | Smith et al. |
| 6,192,418 | B1 | 2/2001 | Hale et al. |
| 6,198,475 | B1 | 3/2001 | Kunimatsu et al. |
| 6,198,479 | B1 | 3/2001 | Humpleman et al. |
| 6,208,247 | B1 | 3/2001 | Agre et al. |
| 6,208,379 | B1 | 3/2001 | Oya et al. |
| 6,208,952 | B1 | 3/2001 | Goertzel et al. |
| 6,209,011 | B1 | 3/2001 | Vong et al. |
| 6,211,783 | B1 | 4/2001 | Wang |
| 6,215,404 | B1 | 4/2001 | Morales |
| 6,218,938 | B1 | 4/2001 | Lin |
| 6,219,677 | B1 | 4/2001 | Howard |
| 6,226,031 | B1 | 5/2001 | Barraclough et al. |
| 6,229,429 | B1 | 5/2001 | Horon |
| 6,230,271 | B1 | 5/2001 | Wadlow et al. |
| 6,239,892 | B1 | 5/2001 | Davidson |
| 6,243,683 | B1 | 6/2001 | Peters |
| 6,246,320 | B1 | 6/2001 | Monroe |
| 6,252,883 | B1 | 6/2001 | Schweickart et al. |
| 6,259,440 | B1 | 7/2001 | Vaughan et al. |
| 6,268,789 | B1 | 7/2001 | Diamant et al. |
| 6,271,752 | B1 | 8/2001 | Vaios |
| 6,275,227 | B1 | 8/2001 | DeStefano |
| 6,281,790 | B1 | 8/2001 | Kimmel et al. |
| 6,282,569 | B1 | 8/2001 | Wallis et al. |
| 6,286,038 | B1 | 9/2001 | Reichmeyer et al. |
| 6,288,716 | B1 | 9/2001 | Humpleman et al. |
| 6,289,382 | B1 | 9/2001 | Bowman-Amuah |
| 6,292,766 | B1 | 9/2001 | Mattos et al. |
| 6,292,827 | B1 | 9/2001 | Raz |
| 6,295,346 | B1 | 9/2001 | Markowitz et al. |
| 6,295,558 | B1 | 9/2001 | Davis et al. |
| 6,314,425 | B1 | 11/2001 | Serbinis et al. |
| 6,320,506 | B1 | 11/2001 | Ferraro |
| 6,323,897 | B1 | 11/2001 | Kogane et al. |
| D451,529 | S | 12/2001 | Vasquez |
| 6,327,044 | B1 | 12/2001 | Shima |
| 6,331,122 | B1 | 12/2001 | Wu |
| 6,332,193 | B1 | 12/2001 | Glass et al. |
| 6,341,274 | B1 | 1/2002 | Leon |
| 6,347,393 | B1 | 2/2002 | Alpert et al. |
| 6,351,213 | B1 | 2/2002 | Hirsch et al. |
| 6,351,271 | B1 | 2/2002 | Mainwaring et al. |
| 6,351,595 | B1 | 2/2002 | Kim |
| 6,351,829 | B1 | 2/2002 | Dupont et al. |
| 6,353,853 | B1 | 3/2002 | Gravlin |
| 6,353,891 | B1 | 3/2002 | Borella et al. |
| 6,359,560 | B1 | 3/2002 | Budge et al. |
| 6,363,417 | B1 | 3/2002 | Howard et al. |

(56) References Cited

U.S. PATENT DOCUMENTS 6,363,422 B1 3/2002 Hunter et al.
6,366,211 B1 4/2002 Parker
6,369,695 B2 4/2002 Horon
6,369,705 B1 4/2002 Kennedy
6,370,436 B1 4/2002 Howard et al.
6,374,079 B1 4/2002 Hsu
6,377,861 B1 4/2002 York
6,378,109 B1 4/2002 Young et al.
6,385,772 B1 5/2002 Courtney
6,392,538 B1 5/2002 Shere
6,396,531 B1 5/2002 Gerszberg et al.
6,400,265 B1 6/2002 Saylor et al.
6,405,348 B1 6/2002 Fallah-Tehrani et al.
6,411,802 B1 6/2002 Cardina et al.
D460,472 S 7/2002 Wang
6,418,037 B1 7/2002 Zhang
6,421,080 B1 7/2002 Ambert
6,430,629 B1 8/2002 Smyers
6,433,683 B1 8/2002 Robinson
6,434,604 B1 8/2002 Harada et al.
6,434,700 B1 8/2002 Alonso et al.
6,437,692 B1 8/2002 Petite et al.
6,441,723 B1 8/2002 Mansfield et al.
6,441,731 B1 8/2002 Hess
6,442,241 B1 8/2002 Tsumpes
6,445,291 B2 9/2002 Addy et al.
6,446,111 B1 9/2002 Lowery
6,446,192 B1 9/2002 Narasimhan et al.
6,452,490 B1 9/2002 Garland et al.
6,452,923 B1 9/2002 Gerszberg et al.
6,452,924 B1 9/2002 Golden et al.
6,453,687 B2 9/2002 Sharood et al.
D464,328 S 10/2002 Vasquez et al.
D464,948 S 10/2002 Vasquez et al.
6,462,507 B2 10/2002 Fisher, Jr.
6,462,663 B1 10/2002 Wilson et al.
6,467,084 B1 10/2002 Howard et al.
6,473,407 B1 10/2002 Ditmer et al.
6,476,858 B1 11/2002 Ramirez et al.
6,480,901 B1 11/2002 Weber et al.
6,486,896 B1 11/2002 Ubillos
6,493,020 B1 12/2002 Stevenson et al.
6,496,927 B1 12/2002 McGrane et al.
6,499,131 B1 12/2002 Savithri et al.
6,504,479 B1 1/2003 Lemons et al.
6,507,589 B1 1/2003 Ramasubramani et al.
6,508,709 B1 1/2003 Karmarkar
6,515,968 B1 2/2003 Combar et al.
6,526,581 B1 2/2003 Edson
6,529,230 B1 3/2003 Chong
6,529,589 B1 3/2003 Nelson et al.
6,529,723 B1 3/2003 Bentley
6,535,110 B1 3/2003 Arora et al.
6,542,075 B2 4/2003 Barker et al.
6,542,992 B1 4/2003 Peirce et al.
6,549,130 B1 4/2003 Joao
6,552,647 B1 4/2003 Thiessen et al.
6,553,336 B1 4/2003 Johnson et al.
6,559,769 B2 5/2003 Anthony et al.
6,563,800 B1 5/2003 Salo et al.
6,563,910 B2 5/2003 Menard et al.
6,567,122 B1 5/2003 Anderson et al.
6,567,502 B2 5/2003 Zellner et al.
6,574,234 B1 6/2003 Myer et al.
6,580,424 B1 6/2003 Krumm
6,580,950 B1 6/2003 Johnson et al.
6,587,046 B2 7/2003 Joao
6,587,235 B1 7/2003 Chaudhuri et al.
6,587,455 B1 7/2003 Ray et al.
6,587,736 B2 7/2003 Howard et al.
6,587,739 B1 7/2003 Abrams et al.
6,591,094 B1 7/2003 Bentley
6,593,856 B1 7/2003 Madau
6,597,703 B1 7/2003 Li et al.
6,601,086 B1 7/2003 Howard et al.
6,603,488 B2 8/2003 Humpleman et al.
6,609,127 B1 8/2003 Lee et al.
6,611,206 B2 8/2003 Eshelman et al.
6,615,088 B1 9/2003 Myer et al.
6,621,827 B1 9/2003 Rezvani et al.
6,624,750 B1 9/2003 Marman et al.
6,631,416 B2 10/2003 Bendinelli et al.
6,636,893 B1 10/2003 Fong
6,643,355 B1 11/2003 Tsumpes
6,643,652 B2 11/2003 Helgeson et al.
6,643,669 B1 11/2003 Novak et al.
6,643,795 B1 11/2003 Sicola et al.
6,648,682 B1 11/2003 Wu
6,658,091 B1 12/2003 Naidoo et al.
6,661,340 B1 12/2003 Saylor et al.
6,662,340 B2 12/2003 Rawat et al.
6,665,004 B1 12/2003 Paff
6,667,688 B1 12/2003 Menard et al.
6,674,767 B1 1/2004 Kadyk et al.
6,675,365 B2 1/2004 Elzinga
6,680,730 B1 1/2004 Shields et al.
6,680,935 B1 1/2004 Kung et al.
6,686,838 B1 2/2004 Rezvani et al.
6,690,411 B2 2/2004 Naidoo et al.
6,690,719 B1 2/2004 Raphaeli et al.
6,693,530 B1 2/2004 Dowens et al.
6,693,545 B2 2/2004 Brown et al.
6,697,103 B1 2/2004 Fernandez et al.
6,704,786 B1 3/2004 Gupta et al.
6,716,101 B1 4/2004 Meadows et al.
6,720,990 B1 4/2004 Walker et al.
6,721,689 B2 4/2004 Markle et al.
6,721,740 B1 4/2004 Skinner et al.
6,721,747 B2 4/2004 Lipkin
6,721,802 B1 4/2004 Wright et al.
6,727,811 B1 4/2004 Fendis
6,728,233 B1 4/2004 Park et al.
6,728,688 B1 4/2004 Hirsch et al.
6,738,824 B1 5/2004 Blair
6,741,171 B2 5/2004 Palka et al.
6,741,977 B1 5/2004 Nagaya et al.
6,754,181 B1 6/2004 Elliott et al.
6,754,717 B1 6/2004 Day et al.
6,756,896 B2 6/2004 Ford
6,756,988 B1 6/2004 Wang et al.
6,756,998 B1 6/2004 Bilger
6,759,956 B2 7/2004 Menard et al.
6,762,686 B1 7/2004 Tabe
6,763,377 B1 7/2004 Belknap et al.
6,766,353 B1 7/2004 Lin et al.
6,771,181 B1 8/2004 Hughen, Jr.
6,778,085 B2 8/2004 Faulkner et al.
6,779,019 B1 8/2004 Mousseau et al.
6,781,509 B1 8/2004 Oppedahl et al.
6,785,542 B1 8/2004 Blight et al.
6,789,147 B1 9/2004 Kessler et al.
6,795,322 B2 9/2004 Aihara et al.
6,795,863 B1 9/2004 Doty, Jr.
6,798,344 B2 9/2004 Faulkner et al.
6,804,638 B2 10/2004 Fiedler
6,810,409 B1 10/2004 Fry et al.
6,810,420 B1 10/2004 Buse et al.
6,823,223 B2 11/2004 Gonzales et al.
6,826,173 B1 11/2004 Kung et al.
6,826,233 B1 11/2004 Hajime
6,829,478 B1 12/2004 Layton et al.
6,834,208 B2 12/2004 Gonzales et al.
6,836,214 B2 12/2004 Choi
6,850,252 B1 2/2005 Hoffberg
6,856,236 B2 2/2005 Christensen et al.
6,857,026 B1 2/2005 Cain
6,859,831 B1 2/2005 Gelvin et al.
6,865,690 B2 3/2005 Kocin
6,871,193 B1 3/2005 Campbell et al.
6,873,256 B2 3/2005 Lemelson et al.
6,885,362 B2 4/2005 Suomela
D504,889 S 5/2005 Andre et al.
6,891,838 B1 5/2005 Petite et al.
6,912,429 B1 6/2005 Bilger

(56) References Cited

U.S. PATENT DOCUMENTS

| | | | |
|---|---|---|---|
| 6,914,533 | B2 | 7/2005 | Petite |
| 6,918,112 | B2 | 7/2005 | Bourke-Dunphy et al. |
| 6,920,502 | B2 | 7/2005 | Araujo et al. |
| 6,920,615 | B1 | 7/2005 | Campbell et al. |
| 6,922,701 | B1 | 7/2005 | Ananian et al. |
| 6,928,148 | B2 | 8/2005 | Simon et al. |
| 6,930,598 | B2 | 8/2005 | Weiss |
| 6,930,599 | B2 | 8/2005 | Naidoo et al. |
| 6,930,730 | B2 | 8/2005 | Maxson et al. |
| 6,931,445 | B2 | 8/2005 | Davis |
| 6,941,258 | B2 | 9/2005 | Van et al. |
| 6,943,681 | B2 | 9/2005 | Rezvani et al. |
| 6,956,477 | B2 | 10/2005 | Chun |
| 6,957,075 | B1 | 10/2005 | Iverson |
| 6,957,186 | B1 | 10/2005 | Guheen et al. |
| 6,957,275 | B1 | 10/2005 | Sekiguchi |
| 6,959,341 | B1 | 10/2005 | Leung |
| 6,959,393 | B2 | 10/2005 | Hollis et al. |
| 6,963,908 | B1 | 11/2005 | Lynch et al. |
| 6,963,981 | B1 | 11/2005 | Bailey et al. |
| 6,965,294 | B1 | 11/2005 | Elliott et al. |
| 6,965,313 | B1 | 11/2005 | Saylor et al. |
| 6,970,183 | B1 | 11/2005 | Monroe |
| 6,971,063 | B1 | 11/2005 | Rappaport et al. |
| 6,971,076 | B2 | 11/2005 | Chen |
| 6,972,676 | B1 | 12/2005 | Kimmel et al. |
| 6,975,220 | B1 | 12/2005 | Foodman et al. |
| 6,977,485 | B1 | 12/2005 | Wei |
| 6,983,432 | B2 | 1/2006 | Hayes |
| 6,990,591 | B1 | 1/2006 | Pearson |
| 6,993,658 | B1 | 1/2006 | Engberg et al. |
| 6,999,562 | B2 | 2/2006 | Winick |
| 6,999,992 | B1 | 2/2006 | Deen et al. |
| 7,015,806 | B2 | 3/2006 | Naidoo et al. |
| 7,016,970 | B2 | 3/2006 | Harumoto et al. |
| 7,019,639 | B2 | 3/2006 | Stilp |
| 7,020,697 | B1 | 3/2006 | Goodman et al. |
| 7,020,701 | B1 | 3/2006 | Gelvin et al. |
| 7,023,913 | B1 | 4/2006 | Monroe |
| 7,023,914 | B2 | 4/2006 | Furukawa et al. |
| 7,023,975 | B2 | 4/2006 | Mansfield et al. |
| 7,024,676 | B1 | 4/2006 | Klopfenstein |
| 7,028,328 | B2 | 4/2006 | Kogane et al. |
| 7,030,752 | B2 | 4/2006 | Tyroler |
| 7,032,002 | B1 | 4/2006 | Rezvani et al. |
| 7,034,681 | B2 | 4/2006 | Yamamoto et al. |
| 7,035,907 | B1 | 4/2006 | Decasper et al. |
| 7,039,391 | B2 | 5/2006 | Rezvani et al. |
| 7,042,880 | B1 | 5/2006 | Voit et al. |
| 7,043,537 | B1 | 5/2006 | Pratt |
| 7,047,088 | B2 | 5/2006 | Nakamura et al. |
| 7,047,092 | B2 | 5/2006 | Wimsatt |
| 7,047,180 | B1 | 5/2006 | Mathews et al. |
| 7,050,388 | B2 | 5/2006 | Kim et al. |
| 7,053,764 | B2 | 5/2006 | Stilp |
| 7,053,765 | B1 | 5/2006 | Clark |
| 7,068,164 | B1 | 6/2006 | Duncan et al. |
| 7,072,934 | B2 | 7/2006 | Helgeson et al. |
| 7,073,140 | B1 | 7/2006 | Li et al. |
| 7,075,429 | B2 | 7/2006 | Marshall |
| 7,079,020 | B2 | 7/2006 | Stilp |
| 7,080,046 | B1 | 7/2006 | Rezvani et al. |
| 7,081,813 | B2 | 7/2006 | Winick et al. |
| 7,082,460 | B2 | 7/2006 | Hansen et al. |
| 7,084,756 | B2 | 8/2006 | Stilp |
| 7,085,814 | B1 | 8/2006 | Gandhi et al. |
| 7,085,937 | B1 | 8/2006 | Rezvani et al. |
| 7,086,018 | B2 | 8/2006 | Ito |
| 7,099,944 | B1 | 8/2006 | Anschutz et al. |
| 7,099,994 | B2 | 8/2006 | Thayer et al. |
| 7,103,152 | B2 | 9/2006 | Naidoo et al. |
| 7,106,176 | B2 | 9/2006 | La et al. |
| 7,107,322 | B1 | 9/2006 | Freeny, Jr. |
| 7,110,774 | B1 | 9/2006 | Davis et al. |
| 7,111,072 | B1 | 9/2006 | Matthews et al. |

| | | | |
|---|---|---|---|
| 7,113,090 | B1 | 9/2006 | Saylor et al. |
| 7,113,099 | B2 | 9/2006 | Tyroler et al. |
| 7,114,554 | B2 | 10/2006 | Bergman et al. |
| 7,119,609 | B2 | 10/2006 | Naidoo et al. |
| 7,119,674 | B2 | 10/2006 | Sefton |
| 7,120,139 | B1 | 10/2006 | Kung et al. |
| 7,120,232 | B2 | 10/2006 | Naidoo et al. |
| 7,120,233 | B2 | 10/2006 | Naidoo et al. |
| 7,126,473 | B1 | 10/2006 | Powell |
| 7,130,383 | B2 | 10/2006 | Naidoo et al. |
| 7,130,585 | B1 | 10/2006 | Ollis et al. |
| 7,134,138 | B2 | 11/2006 | Scherr |
| 7,136,711 | B1 | 11/2006 | Duncan et al. |
| 7,142,503 | B1 | 11/2006 | Grant et al. |
| 7,145,898 | B1 | 12/2006 | Elliott |
| 7,147,147 | B1 | 12/2006 | Enright et al. |
| 7,148,810 | B2 | 12/2006 | Bhat |
| 7,149,798 | B2 | 12/2006 | Rezvani et al. |
| 7,149,814 | B2 | 12/2006 | Neufeld et al. |
| 7,158,026 | B2 | 1/2007 | Feldkamp et al. |
| 7,158,776 | B1 | 1/2007 | Estes et al. |
| 7,158,920 | B2 | 1/2007 | Ishikawa |
| 7,164,883 | B2 | 1/2007 | Rappaport et al. |
| 7,164,907 | B2 | 1/2007 | Cochran et al. |
| 7,166,987 | B2 | 1/2007 | Lee et al. |
| 7,171,466 | B2 | 1/2007 | Van Der Meulen |
| 7,171,686 | B1 | 1/2007 | Jansen et al. |
| 7,174,018 | B1 | 2/2007 | Patil et al. |
| 7,174,564 | B1 | 2/2007 | Weatherspoon et al. |
| 7,180,889 | B1 | 2/2007 | Kung et al. |
| 7,181,207 | B1 | 2/2007 | Chow et al. |
| 7,181,517 | B1 | 2/2007 | Iavergne et al. |
| 7,181,571 | B2 | 2/2007 | Jiang et al. |
| 7,181,716 | B1 | 2/2007 | Dahroug |
| 7,183,907 | B2 | 2/2007 | Simon et al. |
| 7,184,428 | B1 | 2/2007 | Gerszberg et al. |
| 7,184,848 | B2 | 2/2007 | Krzyzanowski et al. |
| 7,187,279 | B2 | 3/2007 | Chung |
| 7,187,986 | B2 | 3/2007 | Johnson et al. |
| 7,194,003 | B2 | 3/2007 | Danner et al. |
| 7,194,446 | B1 | 3/2007 | Bromley et al. |
| 7,197,125 | B1 | 3/2007 | Prasad et al. |
| 7,203,486 | B2 | 4/2007 | Patel |
| 7,209,945 | B2 | 4/2007 | Hicks et al. |
| 7,212,570 | B2 | 5/2007 | Akiyama et al. |
| 7,213,061 | B1 | 5/2007 | Hite et al. |
| 7,218,217 | B2 | 5/2007 | Adonailo et al. |
| 7,222,359 | B2 | 5/2007 | Freund et al. |
| 7,229,012 | B1 | 6/2007 | Enright et al. |
| 7,237,267 | B2 | 6/2007 | Rayes et al. |
| 7,240,327 | B2 | 7/2007 | Singh et al. |
| 7,246,044 | B2 | 7/2007 | Imamura et al. |
| 7,248,150 | B2 | 7/2007 | Mackjust et al. |
| 7,248,161 | B2 | 7/2007 | Spoltore et al. |
| 7,249,177 | B1 | 7/2007 | Miller |
| 7,249,317 | B1 | 7/2007 | Nakagawa et al. |
| 7,250,854 | B2 | 7/2007 | Rezvani et al. |
| 7,250,859 | B2 | 7/2007 | Martin et al. |
| 7,254,779 | B1 | 8/2007 | Rezvani et al. |
| 7,254,833 | B1 | 8/2007 | Cornelius et al. |
| 7,262,690 | B2 | 8/2007 | Heaton et al. |
| 7,277,010 | B2 | 10/2007 | Joao |
| 7,292,142 | B2 | 11/2007 | Simon et al. |
| 7,293,083 | B1 | 11/2007 | Ranous et al. |
| 7,298,253 | B2 | 11/2007 | Petricoin et al. |
| 7,305,461 | B2 | 12/2007 | Ullman |
| 7,310,115 | B2 | 12/2007 | Tanimoto |
| 7,313,102 | B2 | 12/2007 | Stephenson et al. |
| 7,313,231 | B2 | 12/2007 | Reid |
| D558,460 | S | 1/2008 | Yu et al. |
| D558,756 | S | 1/2008 | Andre et al. |
| 7,315,886 | B1 | 1/2008 | Meenan et al. |
| 7,337,217 | B2 | 2/2008 | Wang |
| 7,337,473 | B2 | 2/2008 | Chang et al. |
| 7,339,895 | B2 | 3/2008 | Ozaki et al. |
| 7,340,314 | B1 | 3/2008 | Duncan et al. |
| 7,343,619 | B2 | 3/2008 | Ofek et al. |
| 7,345,580 | B2 | 3/2008 | Akamatsu et al. |
| 7,346,338 | B1 | 3/2008 | Calhoun et al. |

(56) References Cited

U.S. PATENT DOCUMENTS

| | | | |
|---|---|---|---|
| 7,349,682 | B1 | 3/2008 | Bennett et al. |
| 7,349,761 | B1 | 3/2008 | Cruse |
| 7,349,967 | B2 | 3/2008 | Wang |
| 7,356,372 | B1 | 4/2008 | Duncan et al. |
| 7,359,843 | B1 | 4/2008 | Keller et al. |
| 7,362,221 | B2 | 4/2008 | Katz |
| 7,367,045 | B2 | 4/2008 | Ofek et al. |
| 7,370,115 | B2 | 5/2008 | Bae et al. |
| 7,383,339 | B1 | 6/2008 | Meenan et al. |
| 7,383,522 | B2 | 6/2008 | Murgai et al. |
| 7,391,298 | B1 | 6/2008 | Campbell et al. |
| 7,403,838 | B2 | 7/2008 | Deen et al. |
| 7,409,045 | B2 | 8/2008 | Naidoo et al. |
| 7,409,451 | B1 | 8/2008 | Meenan et al. |
| 7,412,447 | B2 | 8/2008 | Hilbert et al. |
| 7,425,101 | B2 | 9/2008 | Cheng |
| 7,428,585 | B1 | 9/2008 | Owens et al. |
| 7,430,614 | B2 | 9/2008 | Shen et al. |
| 7,437,753 | B2 | 10/2008 | Nahum |
| 7,440,434 | B2 | 10/2008 | Chaskar et al. |
| 7,440,767 | B2 | 10/2008 | Ballay et al. |
| 7,447,775 | B1 | 11/2008 | Zhu et al. |
| 7,454,731 | B2 | 11/2008 | Oh et al. |
| 7,457,869 | B2 | 11/2008 | Kernan |
| 7,466,223 | B2 | 12/2008 | Sefton |
| 7,466,710 | B1 | 12/2008 | Clemm et al. |
| 7,469,139 | B2 | 12/2008 | Van De Groenendaal |
| 7,469,294 | B1 | 12/2008 | Luo et al. |
| 7,469,381 | B2 | 12/2008 | Ording |
| 7,469,391 | B2 | 12/2008 | Carrere et al. |
| D584,738 | S | 1/2009 | Kim et al. |
| D585,399 | S | 1/2009 | Hwang |
| 7,477,629 | B2 | 1/2009 | Tsirtsis et al. |
| 7,479,949 | B2 | 1/2009 | Jobs et al. |
| 7,480,713 | B2 | 1/2009 | Ullman |
| 7,480,724 | B2 | 1/2009 | Zimler et al. |
| 7,483,958 | B1 | 1/2009 | Elabbady et al. |
| 7,490,350 | B1 | 2/2009 | Murotake et al. |
| 7,493,651 | B2 | 2/2009 | Vaenskae et al. |
| 7,498,695 | B2 | 3/2009 | Gaudreau et al. |
| 7,502,672 | B1 | 3/2009 | Kolls |
| 7,506,052 | B2 | 3/2009 | Qian et al. |
| 7,509,687 | B2 | 3/2009 | Ofek et al. |
| 7,511,614 | B2 | 3/2009 | Stilp et al. |
| 7,512,965 | B1 | 3/2009 | Amdur et al. |
| 7,526,539 | B1 | 4/2009 | Hsu |
| 7,526,762 | B1 | 4/2009 | Astala et al. |
| 7,528,723 | B2 | 5/2009 | Fast et al. |
| 7,535,880 | B1 | 5/2009 | Hinman et al. |
| 7,542,721 | B1 | 6/2009 | Bonner et al. |
| 7,549,134 | B1 | 6/2009 | Li et al. |
| 7,551,071 | B2 | 6/2009 | Bennett et al. |
| 7,554,934 | B2 | 6/2009 | Abraham et al. |
| 7,558,379 | B2 | 7/2009 | Winick |
| 7,558,862 | B1 | 7/2009 | Tyukasz et al. |
| 7,558,903 | B2 | 7/2009 | Kinstler |
| 7,562,323 | B1 | 7/2009 | Bai et al. |
| 7,564,855 | B1 | 7/2009 | Georgiou |
| 7,568,018 | B1 | 7/2009 | Hove et al. |
| 7,571,459 | B2 | 8/2009 | Ganesh et al. |
| 7,577,420 | B2 | 8/2009 | Srinivasan et al. |
| 7,583,191 | B2 | 9/2009 | Zinser |
| 7,584,263 | B1 | 9/2009 | Hicks et al. |
| 7,587,464 | B2 | 9/2009 | Moorer et al. |
| 7,590,953 | B2 | 9/2009 | Chang |
| 7,595,816 | B1 | 9/2009 | Enright et al. |
| 7,596,622 | B2 | 9/2009 | Owen et al. |
| D602,014 | S | 10/2009 | Andre et al. |
| D602,015 | S | 10/2009 | Andre et al. |
| D602,017 | S | 10/2009 | Andre et al. |
| D602,486 | S | 10/2009 | Andre et al. |
| D602,487 | S | 10/2009 | Maskatia |
| 7,606,767 | B1 | 10/2009 | Couper et al. |
| 7,610,555 | B2 | 10/2009 | Klein et al. |
| 7,610,559 | B1 | 10/2009 | Humpleman et al. |
| 7,619,512 | B2 | 11/2009 | Trundle et al. |
| 7,620,427 | B2 | 11/2009 | Shanahan |
| 7,627,665 | B2 | 12/2009 | Barker et al. |
| 7,633,385 | B2 | 12/2009 | Cohn et al. |
| 7,634,519 | B2 | 12/2009 | Creamer et al. |
| 7,639,157 | B1 | 12/2009 | Whitley et al. |
| 7,651,530 | B2 | 1/2010 | Winick |
| 7,653,911 | B2 | 1/2010 | Doshi et al. |
| 7,671,729 | B2 | 3/2010 | Hershkovitz et al. |
| 7,679,503 | B2 | 3/2010 | Mason et al. |
| 7,681,201 | B2 | 3/2010 | Dale et al. |
| 7,684,418 | B2 | 3/2010 | Scott et al. |
| 7,696,873 | B2 | 4/2010 | Sharma et al. |
| 7,697,028 | B1 | 4/2010 | Johnson |
| 7,701,970 | B2 | 4/2010 | Krits et al. |
| 7,702,421 | B2 | 4/2010 | Sullivan et al. |
| 7,702,782 | B1 | 4/2010 | Pai |
| D615,083 | S | 5/2010 | Andre et al. |
| 7,711,796 | B2 | 5/2010 | Gutt et al. |
| 7,720,654 | B2 | 5/2010 | Hollis |
| 7,730,223 | B1 | 6/2010 | Bavor et al. |
| 7,733,371 | B1 | 6/2010 | Monroe |
| 7,734,020 | B2 | 6/2010 | Elliot et al. |
| 7,734,286 | B2 | 6/2010 | Almeda et al. |
| 7,734,906 | B2 | 6/2010 | Orlando et al. |
| 7,739,596 | B2 | 6/2010 | Clarke-Martin et al. |
| 7,739,658 | B2 | 6/2010 | Watson et al. |
| 7,747,975 | B2 | 6/2010 | Dinter et al. |
| 7,751,409 | B1 | 7/2010 | Carolan |
| 7,755,472 | B2 | 7/2010 | Grossman |
| 7,755,506 | B1 | 7/2010 | Clegg et al. |
| 7,756,928 | B1 | 7/2010 | Meenan et al. |
| 7,761,275 | B2 | 7/2010 | Chopra et al. |
| 7,787,863 | B2 | 8/2010 | Van De Groenendaal |
| 7,804,760 | B2 | 9/2010 | Schmukler et al. |
| D624,896 | S | 10/2010 | Park et al. |
| D626,437 | S | 11/2010 | Lee et al. |
| 7,825,793 | B1 | 11/2010 | Spillman et al. |
| 7,827,252 | B2 | 11/2010 | Hopmann et al. |
| 7,844,699 | B1 | 11/2010 | Horrocks et al. |
| 7,847,675 | B1 | 12/2010 | Thyen et al. |
| 7,855,635 | B2 | 12/2010 | Cohn et al. |
| 7,859,404 | B2 | 12/2010 | Chul et al. |
| 7,882,466 | B2 | 2/2011 | Ishikawa |
| 7,882,537 | B2 | 2/2011 | Okajo et al. |
| 7,884,855 | B2 | 2/2011 | Ortiz |
| 7,890,612 | B2 | 2/2011 | Todd et al. |
| 7,890,915 | B2 | 2/2011 | Celik et al. |
| 7,899,732 | B2 | 3/2011 | Van et al. |
| 7,904,074 | B2 | 3/2011 | Karaoguz et al. |
| 7,904,187 | B2 | 3/2011 | Hoffberg et al. |
| 7,911,341 | B2 | 3/2011 | Raji et al. |
| 7,912,447 | B2 | 3/2011 | Bennett et al. |
| 7,917,624 | B2 | 3/2011 | Gidwani |
| D636,769 | S | 4/2011 | Wood et al. |
| 7,921,686 | B2 | 4/2011 | Bagepalli et al. |
| 7,928,840 | B2 | 4/2011 | Kim et al. |
| 7,930,365 | B2 | 4/2011 | Dixit et al. |
| D637,596 | S | 5/2011 | Akana et al. |
| 7,949,960 | B2 | 5/2011 | Roessler et al. |
| D639,805 | S | 6/2011 | Song et al. |
| D640,663 | S | 6/2011 | Arnholt et al. |
| 7,956,736 | B2 | 6/2011 | Cohn et al. |
| 7,957,326 | B1 | 6/2011 | Christie, IV |
| 7,970,863 | B1 | 6/2011 | Fontaine |
| D641,018 | S | 7/2011 | Lee et al. |
| 7,974,235 | B2 | 7/2011 | Ghozati et al. |
| D642,563 | S | 8/2011 | Akana et al. |
| 8,001,219 | B2 | 8/2011 | Moorer et al. |
| D645,015 | S | 9/2011 | Lee et al. |
| D645,435 | S | 9/2011 | Kim et al. |
| D645,833 | S | 9/2011 | Seflic et al. |
| 8,022,833 | B2 | 9/2011 | Cho |
| 8,028,041 | B2 | 9/2011 | Olliphant et al. |
| 8,032,881 | B2 | 10/2011 | Holmberg et al. |
| 8,042,049 | B2 | 10/2011 | Killian et al. |
| 8,046,411 | B2 | 10/2011 | Hayashi et al. |
| 8,046,721 | B2 | 10/2011 | Chaudhri et al. |
| 8,069,194 | B1 | 11/2011 | Manber et al. |

(56) References Cited

U.S. PATENT DOCUMENTS

| | | | |
|---|---|---|---|
| D650,381 | S | 12/2011 | Park et al. |
| 8,073,931 | B2 | 12/2011 | Dawes et al. |
| 8,086,702 | B2 | 12/2011 | Baum et al. |
| 8,086,703 | B2 | 12/2011 | Baum et al. |
| D654,460 | S | 2/2012 | Kim et al. |
| D654,497 | S | 2/2012 | Lee |
| 8,122,131 | B2 | 2/2012 | Baum et al. |
| 8,125,184 | B2 | 2/2012 | Raji et al. |
| D656,137 | S | 3/2012 | Chung et al. |
| 8,140,658 | B1 | 3/2012 | Gelvin et al. |
| 8,144,836 | B2 | 3/2012 | Naidoo et al. |
| 8,149,849 | B2 | 4/2012 | Osborn et al. |
| 8,159,519 | B2 | 4/2012 | Kurtz et al. |
| 8,159,945 | B2 | 4/2012 | Muro et al. |
| 8,160,425 | B2 | 4/2012 | Kisliakov |
| 8,196,064 | B2 | 6/2012 | Krzyzanowski et al. |
| 8,200,827 | B1 | 6/2012 | Hunyady et al. |
| 8,205,181 | B1 | 6/2012 | Singla et al. |
| 8,209,400 | B2 | 6/2012 | Baum et al. |
| D663,298 | S | 7/2012 | Song et al. |
| D664,540 | S | 7/2012 | Kim et al. |
| 8,214,494 | B1 | 7/2012 | Slavin |
| 8,214,496 | B2 | 7/2012 | Gutt et al. |
| 8,219,254 | B2 | 7/2012 | O'Connor |
| 8,229,812 | B2 | 7/2012 | Raleigh |
| 8,230,466 | B2 | 7/2012 | Cockrell et al. |
| D664,954 | S | 8/2012 | Kim et al. |
| D666,198 | S | 8/2012 | Van et al. |
| 8,239,477 | B2 | 8/2012 | Sharma et al. |
| 8,244,550 | B2 | 8/2012 | Sim et al. |
| D667,395 | S | 9/2012 | Lee |
| D667,396 | S | 9/2012 | Koh |
| D667,397 | S | 9/2012 | Koh |
| D667,398 | S | 9/2012 | Koh |
| D667,399 | S | 9/2012 | Koh |
| 8,269,376 | B1 | 9/2012 | Elberbaum |
| 8,269,623 | B2 | 9/2012 | Addy |
| 8,271,629 | B1 | 9/2012 | Winters et al. |
| 8,271,881 | B2 | 9/2012 | Moorer et al. |
| 8,272,053 | B2 | 9/2012 | Markham et al. |
| 8,275,830 | B2 | 9/2012 | Raleigh |
| D668,650 | S | 10/2012 | Han |
| D668,651 | S | 10/2012 | Kim et al. |
| D668,652 | S | 10/2012 | Kim et al. |
| D669,469 | S | 10/2012 | Kang |
| D670,692 | S | 11/2012 | Akana et al. |
| D671,514 | S | 11/2012 | Kim et al. |
| 8,311,526 | B2 | 11/2012 | Forstall et al. |
| D671,938 | S | 12/2012 | Hsu et al. |
| D672,344 | S | 12/2012 | Li |
| D672,345 | S | 12/2012 | Li |
| D672,739 | S | 12/2012 | Sin |
| D672,768 | S | 12/2012 | Huang et al. |
| 8,335,842 | B2 | 12/2012 | Raji et al. |
| 8,335,854 | B2 | 12/2012 | Eldering |
| 8,336,010 | B1 | 12/2012 | Chang et al. |
| D673,561 | S | 1/2013 | Hyun et al. |
| D673,948 | S | 1/2013 | Andre et al. |
| D673,950 | S | 1/2013 | Li et al. |
| D674,369 | S | 1/2013 | Jaewoong |
| D675,203 | S | 1/2013 | Yang |
| 8,350,694 | B1 | 1/2013 | Trundle et al. |
| 8,363,791 | B2 | 1/2013 | Gupta et al. |
| D675,588 | S | 2/2013 | Park |
| D675,612 | S | 2/2013 | Andre et al. |
| D676,443 | S | 2/2013 | Canizares et al. |
| D676,819 | S | 2/2013 | Choi |
| 8,373,313 | B2 | 2/2013 | Garcia et al. |
| D677,255 | S | 3/2013 | McManigal et al. |
| D677,640 | S | 3/2013 | Kim et al. |
| D677,659 | S | 3/2013 | Akana et al. |
| D677,660 | S | 3/2013 | Groene et al. |
| D678,271 | S | 3/2013 | Chiu |
| D678,272 | S | 3/2013 | Groene et al. |
| D678,877 | S | 3/2013 | Groene et al. |
| 8,396,766 | B1 | 3/2013 | Enright et al. |
| 8,400,767 | B2 | 3/2013 | Yeom et al. |
| D679,706 | S | 4/2013 | Tang et al. |
| D680,151 | S | 4/2013 | Katori |
| D680,524 | S | 4/2013 | Feng et al. |
| D681,032 | S | 4/2013 | Akana et al. |
| 8,413,204 | B2 | 4/2013 | White et al. |
| D681,583 | S | 5/2013 | Park |
| D681,591 | S | 5/2013 | Sung |
| D681,632 | S | 5/2013 | Akana et al. |
| D682,239 | S | 5/2013 | Yeh et al. |
| 8,451,986 | B2 | 5/2013 | Cohn et al. |
| D684,553 | S | 6/2013 | Kim et al. |
| D684,968 | S | 6/2013 | Smith et al. |
| 8,456,293 | B1 | 6/2013 | Trundle et al. |
| 8,473,619 | B2 | 6/2013 | Baum et al. |
| D685,778 | S | 7/2013 | Fahrendorff et al. |
| D685,783 | S | 7/2013 | Bryan et al. |
| 8,478,450 | B2 | 7/2013 | Lu et al. |
| 8,478,844 | B2 | 7/2013 | Baum et al. |
| 8,478,871 | B2 | 7/2013 | Gutt et al. |
| 8,483,853 | B1 | 7/2013 | Lambourne |
| 8,493,202 | B1 | 7/2013 | Trundle et al. |
| 8,499,038 | B1 | 7/2013 | Vucurevich |
| 8,520,068 | B2 | 8/2013 | Naidoo et al. |
| 8,520,072 | B1 | 8/2013 | Slavin et al. |
| 8,525,664 | B2 | 9/2013 | Hadizad et al. |
| 8,543,665 | B2 | 9/2013 | Ansari et al. |
| D692,042 | S | 10/2013 | Dawes et al. |
| 8,554,478 | B2 | 10/2013 | Hartman |
| 8,560,041 | B2 | 10/2013 | Flaherty et al. |
| 8,570,993 | B2 | 10/2013 | Austin et al. |
| 8,584,199 | B1 | 11/2013 | Chen et al. |
| 8,595,377 | B1 | 11/2013 | Apgar et al. |
| D695,735 | S | 12/2013 | Kitchen et al. |
| 8,599,018 | B2 | 12/2013 | Kellen et al. |
| 8,612,591 | B2 | 12/2013 | Dawes et al. |
| 8,619,136 | B2 | 12/2013 | Howarter et al. |
| 8,634,533 | B2 | 1/2014 | Strasters |
| 8,635,350 | B2 | 1/2014 | Gutt et al. |
| 8,635,499 | B2 | 1/2014 | Cohn et al. |
| 8,638,211 | B2 | 1/2014 | Cohn et al. |
| 8,649,386 | B2 | 2/2014 | Ansari et al. |
| 8,650,320 | B1 | 2/2014 | Merrick et al. |
| 8,666,560 | B2 | 3/2014 | Lu et al. |
| 8,670,753 | B2 | 3/2014 | Hewes et al. |
| 8,675,071 | B1 | 3/2014 | Slavin et al. |
| 8,700,769 | B2 | 4/2014 | Alexander et al. |
| 8,704,821 | B2 | 4/2014 | Kulkarni et al. |
| 8,713,132 | B2 | 4/2014 | Baum et al. |
| 8,723,671 | B2 | 5/2014 | Foisy et al. |
| 8,730,834 | B2 | 5/2014 | Marusca et al. |
| 8,738,765 | B2 | 5/2014 | Wyatt et al. |
| 8,812,654 | B2 | 8/2014 | Gelvin et al. |
| 8,817,809 | B2 | 8/2014 | Gage |
| 8,819,178 | B2 | 8/2014 | Baum et al. |
| 8,825,871 | B2 | 9/2014 | Baum et al. |
| 8,832,244 | B2 | 9/2014 | Gelvin et al. |
| 8,836,467 | B1 | 9/2014 | Cohn et al. |
| 8,868,678 | B2 | 10/2014 | Hildreth et al. |
| 8,885,552 | B2 | 11/2014 | Bedingfield et al. |
| 8,902,740 | B2 | 12/2014 | Hicks, III |
| 8,914,526 | B1 | 12/2014 | Lindquist et al. |
| 8,914,837 | B2 | 12/2014 | Ahmed et al. |
| 8,935,236 | B2 | 1/2015 | Morita et al. |
| 8,937,539 | B2 | 1/2015 | Sharma et al. |
| 8,937,658 | B2 | 1/2015 | Hicks et al. |
| 8,953,479 | B2 | 2/2015 | Hall et al. |
| 8,953,749 | B2 | 2/2015 | Naidoo et al. |
| 8,963,713 | B2 | 2/2015 | Dawes et al. |
| 8,976,763 | B2 | 3/2015 | Shrestha et al. |
| 8,983,534 | B2 | 3/2015 | Patel |
| 8,988,217 | B2 | 3/2015 | Piccolo, III |
| 8,988,221 | B2 | 3/2015 | Raji et al. |
| 8,989,922 | B2 | 3/2015 | Jones et al. |
| 8,996,665 | B2 | 3/2015 | Baum et al. |
| 9,047,753 | B2 | 6/2015 | Dawes et al. |
| 9,059,863 | B2 | 6/2015 | Baum et al. |
| 9,064,394 | B1 | 6/2015 | Trundle |

(56) References Cited

U.S. PATENT DOCUMENTS

| | | | |
|---|---|---|---|
| 9,094,407 | B1 | 7/2015 | Matthieu et al. |
| 9,100,446 | B2 | 8/2015 | Cohn et al. |
| 9,141,276 | B2 | 9/2015 | Dawes et al. |
| 9,144,143 | B2 | 9/2015 | Raji et al. |
| 9,146,548 | B2 | 9/2015 | Chambers et al. |
| 9,147,337 | B2 | 9/2015 | Cohn et al. |
| 9,160,784 | B2 | 10/2015 | Jeong et al. |
| 9,164,669 | B1 | 10/2015 | Yaksick et al. |
| 9,170,707 | B1 | 10/2015 | Laska et al. |
| 9,172,532 | B1 | 10/2015 | Fuller et al. |
| 9,172,533 | B2 | 10/2015 | Fielder |
| 9,172,553 | B2 | 10/2015 | Dawes et al. |
| 9,172,605 | B2 | 10/2015 | Hardy et al. |
| 9,189,934 | B2 | 11/2015 | Jentoft et al. |
| 9,191,228 | B2 | 11/2015 | Fulker et al. |
| 9,202,362 | B2 | 12/2015 | Hyland et al. |
| 9,246,921 | B1 | 1/2016 | Vlaminck et al. |
| 9,286,772 | B2 | 3/2016 | Shapiro et al. |
| 9,287,727 | B1 | 3/2016 | Egan et al. |
| 9,300,921 | B2 | 3/2016 | Naidoo et al. |
| 9,306,809 | B2 | 4/2016 | Dawes et al. |
| 9,310,864 | B1 | 4/2016 | Klein et al. |
| 9,373,014 | B1 | 6/2016 | Mehranfar |
| 9,412,248 | B1 | 8/2016 | Cohn et al. |
| 9,426,720 | B2 | 8/2016 | Cohn et al. |
| 9,450,776 | B2 | 9/2016 | Baum et al. |
| 9,462,041 | B1 | 10/2016 | Hagins et al. |
| 9,510,065 | B2 | 11/2016 | Cohn et al. |
| 9,529,344 | B1 | 12/2016 | Hagins et al. |
| 9,531,593 | B2 | 12/2016 | Baum et al. |
| 9,553,738 | B2 | 1/2017 | Meenan et al. |
| 9,600,945 | B2 | 3/2017 | Naidoo et al. |
| 9,609,003 | B1 | 3/2017 | Chmielewski et al. |
| 9,613,524 | B1 | 4/2017 | Lamb et al. |
| 9,621,408 | B2 | 4/2017 | Gutt et al. |
| 9,674,199 | B2 | 6/2017 | Vlaminck et al. |
| 9,721,461 | B2 | 8/2017 | Zeng et al. |
| 9,729,342 | B2 | 8/2017 | Cohn et al. |
| 9,761,123 | B2 | 9/2017 | Ramasubbu et al. |
| 9,779,595 | B2 | 10/2017 | Thibault |
| 9,805,587 | B2 | 10/2017 | Lamb |
| 9,819,911 | B2 | 11/2017 | K V et al. |
| 9,824,234 | B2 | 11/2017 | Cho et al. |
| 9,843,458 | B2 | 12/2017 | Cronin |
| 9,876,651 | B2 | 1/2018 | Cho et al. |
| 9,882,985 | B1 | 1/2018 | Esam et al. |
| 9,978,238 | B2 | 5/2018 | Fadell et al. |
| 9,979,625 | B2 | 5/2018 | McLaughlin et al. |
| 10,002,507 | B2 | 6/2018 | Wilson et al. |
| 10,025,473 | B2 | 7/2018 | Sarao et al. |
| 10,051,078 | B2 | 8/2018 | Burd et al. |
| 10,062,245 | B2 | 8/2018 | Fulker et al. |
| 10,062,273 | B2 | 8/2018 | Raji et al. |
| 10,078,958 | B2 | 9/2018 | Cohn et al. |
| 10,079,839 | B1 | 9/2018 | Bryan et al. |
| 10,108,272 | B1 | 10/2018 | Debates et al. |
| 10,120,354 | B1 | 11/2018 | Rolston et al. |
| 10,237,757 | B2 | 3/2019 | Raleigh et al. |
| 10,257,474 | B2 | 4/2019 | Nadathur et al. |
| 10,264,138 | B2 | 4/2019 | Raleigh et al. |
| 10,354,517 | B1 | 7/2019 | King |
| 10,380,873 | B1 | 8/2019 | Halverson |
| 10,430,887 | B1 | 10/2019 | Parker et al. |
| 10,687,270 | B2 | 6/2020 | Ishii |
| 10,782,681 | B1 | 9/2020 | Slavin |
| 10,796,557 | B2 | 10/2020 | Sundermeyer et al. |
| 10,868,712 | B1 | 12/2020 | Hutz |
| 11,037,433 | B2 | 6/2021 | Baum et al. |
| 11,132,888 | B2 | 9/2021 | Cohn et al. |
| 11,175,793 | B2 | 11/2021 | Fulker et al. |
| 11,184,322 | B2 | 11/2021 | Dawes et al. |
| 11,194,320 | B2 | 12/2021 | Cohn et al. |
| 11,223,998 | B2 | 1/2022 | Cohn et al. |
| 11,417,159 | B2 | 8/2022 | Li et al. |
| 2001/0012775 | A1 | 8/2001 | Modzelesky et al. |

| | | | |
|---|---|---|---|
| 2001/0016501 | A1 | 8/2001 | King |
| 2001/0022836 | A1 | 9/2001 | Bremer et al. |
| 2001/0025349 | A1 | 9/2001 | Sharood et al. |
| 2001/0029585 | A1 | 10/2001 | Simon et al. |
| 2001/0030597 | A1 | 10/2001 | Inoue et al. |
| 2001/0034209 | A1 | 10/2001 | Tong et al. |
| 2001/0034754 | A1 | 10/2001 | Elwahab et al. |
| 2001/0034759 | A1 | 10/2001 | Chiles et al. |
| 2001/0036192 | A1 | 11/2001 | Chiles et al. |
| 2001/0042137 | A1 | 11/2001 | Ota et al. |
| 2001/0044835 | A1 | 11/2001 | Schober et al. |
| 2001/0046366 | A1 | 11/2001 | Susskind |
| 2001/0047474 | A1 | 11/2001 | Takagi et al. |
| 2001/0048030 | A1 | 12/2001 | Sharood et al. |
| 2001/0053207 | A1 | 12/2001 | Jeon et al. |
| 2001/0054115 | A1 | 12/2001 | Ferguson et al. |
| 2002/0000913 | A1 | 1/2002 | Hamamoto et al. |
| 2002/0003575 | A1 | 1/2002 | Marchese |
| 2002/0004828 | A1 | 1/2002 | Davis et al. |
| 2002/0005894 | A1 | 1/2002 | Foodman et al. |
| 2002/0016639 | A1 | 2/2002 | Smith et al. |
| 2002/0018057 | A1 | 2/2002 | Sano |
| 2002/0018478 | A1 | 2/2002 | Takeyama et al. |
| 2002/0019751 | A1 | 2/2002 | Rothschild et al. |
| 2002/0026476 | A1 | 2/2002 | Miyazaki et al. |
| 2002/0026531 | A1 | 2/2002 | Keane et al. |
| 2002/0027504 | A1 | 3/2002 | Davis et al. |
| 2002/0028696 | A1 | 3/2002 | Hirayama et al. |
| 2002/0031120 | A1 | 3/2002 | Rakib |
| 2002/0032853 | A1 | 3/2002 | Preston et al. |
| 2002/0035633 | A1 | 3/2002 | Bose et al. |
| 2002/0037004 | A1 | 3/2002 | Bossemeyer et al. |
| 2002/0038380 | A1 | 3/2002 | Brawn et al. |
| 2002/0046280 | A1 | 4/2002 | Fujita |
| 2002/0046301 | A1 | 4/2002 | Shannon et al. |
| 2002/0052719 | A1 | 5/2002 | Alexander et al. |
| 2002/0052913 | A1 | 5/2002 | Yamada et al. |
| 2002/0055977 | A1 | 5/2002 | Nishi |
| 2002/0059078 | A1 | 5/2002 | Valdes et al. |
| 2002/0059148 | A1 | 5/2002 | Rosenhaft et al. |
| 2002/0059637 | A1 | 5/2002 | Rakib |
| 2002/0068558 | A1 | 6/2002 | Janik |
| 2002/0068984 | A1 | 6/2002 | Alexander et al. |
| 2002/0072868 | A1 | 6/2002 | Bartone et al. |
| 2002/0075153 | A1 | 6/2002 | Dahl |
| 2002/0080771 | A1 | 6/2002 | Krumel |
| 2002/0083342 | A1 | 6/2002 | Webb et al. |
| 2002/0085488 | A1 | 7/2002 | Kobayashi |
| 2002/0091815 | A1 | 7/2002 | Anderson et al. |
| 2002/0099809 | A1 | 7/2002 | Lee |
| 2002/0099829 | A1 | 7/2002 | Richards et al. |
| 2002/0099854 | A1 | 7/2002 | Jorgensen |
| 2002/0101858 | A1 | 8/2002 | Stuart et al. |
| 2002/0103898 | A1 | 8/2002 | Moyer et al. |
| 2002/0103927 | A1 | 8/2002 | Parent |
| 2002/0107910 | A1 | 8/2002 | Zhao |
| 2002/0109580 | A1 | 8/2002 | Shreve et al. |
| 2002/0111698 | A1 | 8/2002 | Graziano et al. |
| 2002/0114439 | A1 | 8/2002 | Dunlap |
| 2002/0116117 | A1 | 8/2002 | Martens et al. |
| 2002/0119800 | A1 | 8/2002 | Jaggers et al. |
| 2002/0120696 | A1 | 8/2002 | Mousseau et al. |
| 2002/0120698 | A1 | 8/2002 | Tamargo |
| 2002/0120790 | A1 | 8/2002 | Schwalb |
| 2002/0126009 | A1 | 9/2002 | Oyagi et al. |
| 2002/0128728 | A1 | 9/2002 | Murakami et al. |
| 2002/0131404 | A1 | 9/2002 | Mehta et al. |
| 2002/0133539 | A1 | 9/2002 | Monday |
| 2002/0133578 | A1 | 9/2002 | Wu |
| 2002/0136167 | A1 | 9/2002 | Steele et al. |
| 2002/0143805 | A1 | 10/2002 | Hayes et al. |
| 2002/0143923 | A1 | 10/2002 | Alexander |
| 2002/0150086 | A1 | 10/2002 | Bailey et al. |
| 2002/0152298 | A1 | 10/2002 | Kikta et al. |
| 2002/0152432 | A1 | 10/2002 | Fleming |
| 2002/0156564 | A1 | 10/2002 | Preston et al. |
| 2002/0156899 | A1 | 10/2002 | Sekiguchi |
| 2002/0161885 | A1 | 10/2002 | Childers et al. |
| 2002/0163534 | A1 | 11/2002 | Choi et al. |

(56) References Cited

U.S. PATENT DOCUMENTS

| | | | |
|---|---|---|---|
| 2002/0163997 | A1 | 11/2002 | Bergman et al. |
| 2002/0164953 | A1 | 11/2002 | Curtis |
| 2002/0164997 | A1 | 11/2002 | Parry |
| 2002/0165006 | A1 | 11/2002 | Haller et al. |
| 2002/0166125 | A1 | 11/2002 | Fulmer |
| 2002/0174367 | A1 | 11/2002 | Kimmel et al. |
| 2002/0174434 | A1 | 11/2002 | Lee et al. |
| 2002/0177428 | A1 | 11/2002 | Menard et al. |
| 2002/0177482 | A1 | 11/2002 | Cheong et al. |
| 2002/0178100 | A1 | 11/2002 | Koveos |
| 2002/0178211 | A1 | 11/2002 | Singhal et al. |
| 2002/0180579 | A1 | 12/2002 | Nagaoka et al. |
| 2002/0184301 | A1 | 12/2002 | Parent |
| 2002/0184527 | A1 | 12/2002 | Chun et al. |
| 2002/0186683 | A1 | 12/2002 | Buck et al. |
| 2002/0188723 | A1 | 12/2002 | Choi et al. |
| 2002/0191636 | A1 | 12/2002 | Hallenbeck |
| 2003/0004088 | A1 | 1/2003 | Ushio et al. |
| 2003/0005030 | A1 | 1/2003 | Sutton et al. |
| 2003/0006879 | A1 | 1/2003 | Kang et al. |
| 2003/0009552 | A1 | 1/2003 | Benfield et al. |
| 2003/0009553 | A1 | 1/2003 | Benfield et al. |
| 2003/0010243 | A1 | 1/2003 | Roller |
| 2003/0023839 | A1 | 1/2003 | Burkhardt et al. |
| 2003/0025599 | A1 | 2/2003 | Monroe |
| 2003/0028294 | A1 | 2/2003 | Yanagi |
| 2003/0028398 | A1 | 2/2003 | Yamashita et al. |
| 2003/0030548 | A1 | 2/2003 | Kovacs et al. |
| 2003/0031165 | A1 | 2/2003 | O'Brien |
| 2003/0038730 | A1 | 2/2003 | Mafuku et al. |
| 2003/0038849 | A1 | 2/2003 | Craven et al. |
| 2003/0039242 | A1 | 2/2003 | Moore |
| 2003/0040813 | A1 | 2/2003 | Gonzales et al. |
| 2003/0041137 | A1 | 2/2003 | Horie et al. |
| 2003/0041167 | A1 | 2/2003 | French et al. |
| 2003/0046557 | A1 | 3/2003 | Miller et al. |
| 2003/0050731 | A1 | 3/2003 | Rosenblum |
| 2003/0050737 | A1 | 3/2003 | Osann |
| 2003/0051009 | A1 | 3/2003 | Shah et al. |
| 2003/0051026 | A1 | 3/2003 | Carter et al. |
| 2003/0052905 | A1 | 3/2003 | Gordon et al. |
| 2003/0052923 | A1 | 3/2003 | Porter |
| 2003/0056012 | A1 | 3/2003 | Modeste et al. |
| 2003/0056014 | A1 | 3/2003 | Verberkt et al. |
| 2003/0059005 | A1 | 3/2003 | Meyerson et al. |
| 2003/0060900 | A1 | 3/2003 | Lo et al. |
| 2003/0061344 | A1 | 3/2003 | Monroe |
| 2003/0061621 | A1 | 3/2003 | Petty et al. |
| 2003/0065757 | A1 | 4/2003 | Mentze et al. |
| 2003/0065784 | A1 | 4/2003 | Herrod |
| 2003/0065791 | A1 | 4/2003 | Garg et al. |
| 2003/0067923 | A1 | 4/2003 | Ju et al. |
| 2003/0069854 | A1 | 4/2003 | Hsu et al. |
| 2003/0069948 | A1 | 4/2003 | Ma et al. |
| 2003/0071724 | A1 | 4/2003 | D Amico |
| 2003/0071840 | A1 | 4/2003 | Huang et al. |
| 2003/0073406 | A1 | 4/2003 | Benjamin et al. |
| 2003/0074090 | A1 | 4/2003 | Becka et al. |
| 2003/0081768 | A1 | 5/2003 | Caminschi |
| 2003/0084165 | A1 | 5/2003 | Nellberg et al. |
| 2003/0090473 | A1 | 5/2003 | Joshi |
| 2003/0096590 | A1 | 5/2003 | Satoh |
| 2003/0101243 | A1 | 5/2003 | Donahue et al. |
| 2003/0101459 | A1 | 5/2003 | Edson |
| 2003/0103088 | A1 | 6/2003 | Dresti et al. |
| 2003/0105850 | A1 | 6/2003 | Lean et al. |
| 2003/0110262 | A1 | 6/2003 | Hasan et al. |
| 2003/0110302 | A1 | 6/2003 | Hodges et al. |
| 2003/0112866 | A1 | 6/2003 | Yu et al. |
| 2003/0113100 | A1 | 6/2003 | Hecht et al. |
| 2003/0115345 | A1 | 6/2003 | Chien et al. |
| 2003/0120593 | A1 | 6/2003 | Bansal et al. |
| 2003/0123419 | A1 | 7/2003 | Rangnekar et al. |
| 2003/0123634 | A1 | 7/2003 | Chee |
| 2003/0126236 | A1 | 7/2003 | Marl et al. |
| 2003/0128114 | A1 | 7/2003 | Quigley |
| 2003/0128115 | A1 | 7/2003 | Giacopelli et al. |
| 2003/0132018 | A1 | 7/2003 | Okita et al. |
| 2003/0134590 | A1 | 7/2003 | Suda et al. |
| 2003/0137426 | A1 | 7/2003 | Anthony et al. |
| 2003/0137991 | A1 | 7/2003 | Doshi et al. |
| 2003/0147534 | A1 | 8/2003 | Ablay et al. |
| 2003/0149671 | A1 | 8/2003 | Yamamoto et al. |
| 2003/0153325 | A1 | 8/2003 | Veerepalli et al. |
| 2003/0155757 | A1 | 8/2003 | Larsen et al. |
| 2003/0158609 | A1 | 8/2003 | Chiu |
| 2003/0158635 | A1 | 8/2003 | Pillar et al. |
| 2003/0159135 | A1 | 8/2003 | Hiller et al. |
| 2003/0163514 | A1 | 8/2003 | Waldschmidt |
| 2003/0169728 | A1 | 9/2003 | Choi |
| 2003/0172145 | A1 | 9/2003 | Nguyen |
| 2003/0174051 | A1 | 9/2003 | Naitou |
| 2003/0174154 | A1 | 9/2003 | Yukie et al. |
| 2003/0174648 | A1 | 9/2003 | Wang et al. |
| 2003/0174717 | A1 | 9/2003 | Zabarski et al. |
| 2003/0177236 | A1 | 9/2003 | Goto et al. |
| 2003/0182396 | A1 | 9/2003 | Reich et al. |
| 2003/0182640 | A1 | 9/2003 | Alani et al. |
| 2003/0184436 | A1 | 10/2003 | Seales et al. |
| 2003/0187920 | A1 | 10/2003 | Redkar |
| 2003/0187938 | A1 | 10/2003 | Mousseau et al. |
| 2003/0189509 | A1 | 10/2003 | Hayes et al. |
| 2003/0193991 | A1 | 10/2003 | Lansford |
| 2003/0196115 | A1 | 10/2003 | Karp |
| 2003/0197847 | A1 | 10/2003 | Shinoda |
| 2003/0198938 | A1 | 10/2003 | Murray et al. |
| 2003/0200325 | A1 | 10/2003 | Krishnaswamy et al. |
| 2003/0201889 | A1 | 10/2003 | Zulkowski |
| 2003/0208610 | A1 | 11/2003 | Rochetti et al. |
| 2003/0210126 | A1 | 11/2003 | Kanazawa |
| 2003/0214775 | A1 | 11/2003 | Fukuta et al. |
| 2003/0216143 | A1 | 11/2003 | Roese et al. |
| 2003/0217136 | A1 | 11/2003 | Cho et al. |
| 2003/0225883 | A1 | 12/2003 | Greaves et al. |
| 2003/0227382 | A1 | 12/2003 | Breed |
| 2003/0227439 | A1 | 12/2003 | Lee et al. |
| 2003/0229779 | A1 | 12/2003 | Morais et al. |
| 2003/0230934 | A1 | 12/2003 | Cordelli et al. |
| 2003/0233155 | A1 | 12/2003 | Slemmer et al. |
| 2003/0233332 | A1 | 12/2003 | Keeler et al. |
| 2003/0233429 | A1 | 12/2003 | Matte et al. |
| 2003/0233549 | A1 | 12/2003 | Hatakeyama et al. |
| 2003/0233583 | A1 | 12/2003 | Carley |
| 2003/0233594 | A1 | 12/2003 | Earl |
| 2003/0236841 | A1 | 12/2003 | Epshteyn |
| 2004/0003051 | A1 | 1/2004 | Krzyzanowski et al. |
| 2004/0003241 | A1 | 1/2004 | Sengodan et al. |
| 2004/0005039 | A1 | 1/2004 | White et al. |
| 2004/0008724 | A1 | 1/2004 | Devine et al. |
| 2004/0015572 | A1 | 1/2004 | Kang |
| 2004/0034697 | A1 | 2/2004 | Fairhurst et al. |
| 2004/0034798 | A1 | 2/2004 | Yamada et al. |
| 2004/0036615 | A1 | 2/2004 | Candela |
| 2004/0037295 | A1 | 2/2004 | Tanaka et al. |
| 2004/0039459 | A1 | 2/2004 | Daugherty et al. |
| 2004/0049321 | A1 | 3/2004 | Lehr et al. |
| 2004/0054789 | A1 | 3/2004 | Breh et al. |
| 2004/0056665 | A1 | 3/2004 | Iwanaga et al. |
| 2004/0064351 | A1 | 4/2004 | Mikurak |
| 2004/0068583 | A1 | 4/2004 | Monroe et al. |
| 2004/0068657 | A1 | 4/2004 | Alexander et al. |
| 2004/0068668 | A1 | 4/2004 | Lor et al. |
| 2004/0075738 | A1 | 4/2004 | Burke et al. |
| 2004/0078825 | A1 | 4/2004 | Murphy |
| 2004/0083015 | A1 | 4/2004 | Patwari |
| 2004/0086093 | A1 | 5/2004 | Schranz |
| 2004/0093492 | A1 | 5/2004 | Daude et al. |
| 2004/0095943 | A1 | 5/2004 | Korotin |
| 2004/0102859 | A1 | 5/2004 | Bennett |
| 2004/0103308 | A1 | 5/2004 | Paller |
| 2004/0107027 | A1 | 6/2004 | Boudrieau |
| 2004/0107299 | A1 | 6/2004 | Lee et al. |
| 2004/0111294 | A1 | 6/2004 | McNally et al. |
| 2004/0113770 | A1 | 6/2004 | Falk et al. |

(56) References Cited

U.S. PATENT DOCUMENTS

| | | | |
|---|---|---|---|
| 2004/0113778 | A1 | 6/2004 | Script et al. |
| 2004/0113937 | A1 | 6/2004 | Sawdey et al. |
| 2004/0117068 | A1 | 6/2004 | Lee |
| 2004/0117330 | A1 | 6/2004 | Ehlers et al. |
| 2004/0117462 | A1 | 6/2004 | Bodin et al. |
| 2004/0117465 | A1 | 6/2004 | Bodin et al. |
| 2004/0125146 | A1 | 7/2004 | Gerlach et al. |
| 2004/0125782 | A1 | 7/2004 | Chang |
| 2004/0125931 | A1 | 7/2004 | Archer |
| 2004/0133689 | A1 | 7/2004 | Vasisht |
| 2004/0136386 | A1 | 7/2004 | Miller et al. |
| 2004/0137915 | A1 | 7/2004 | Diener et al. |
| 2004/0139227 | A1 | 7/2004 | Takeda |
| 2004/0143428 | A1 | 7/2004 | Rappaport et al. |
| 2004/0143602 | A1 | 7/2004 | Ruiz et al. |
| 2004/0143749 | A1 | 7/2004 | Tajalli et al. |
| 2004/0153171 | A1 | 8/2004 | Brandt et al. |
| 2004/0155757 | A1 | 8/2004 | Litwin et al. |
| 2004/0160309 | A1 | 8/2004 | Stilp |
| 2004/0163073 | A1 | 8/2004 | Krzyzanowski et al. |
| 2004/0163118 | A1 | 8/2004 | Mottur |
| 2004/0163705 | A1 | 8/2004 | Uhler |
| 2004/0169288 | A1 | 9/2004 | Hsieh et al. |
| 2004/0170120 | A1 | 9/2004 | Reunamaki et al. |
| 2004/0170155 | A1 | 9/2004 | Omar et al. |
| 2004/0172657 | A1 | 9/2004 | Phillips et al. |
| 2004/0177163 | A1 | 9/2004 | Casey et al. |
| 2004/0181693 | A1 | 9/2004 | Milliot et al. |
| 2004/0183756 | A1 | 9/2004 | Freitas et al. |
| 2004/0189471 | A1 | 9/2004 | Ciarcia et al. |
| 2004/0189871 | A1 | 9/2004 | Kurosawa et al. |
| 2004/0196844 | A1 | 10/2004 | Hagino |
| 2004/0198386 | A1 | 10/2004 | Dupray |
| 2004/0199645 | A1 | 10/2004 | Rouhi |
| 2004/0201472 | A1 | 10/2004 | McGunn et al. |
| 2004/0202351 | A1 | 10/2004 | Park et al. |
| 2004/0204806 | A1 | 10/2004 | Chen et al. |
| 2004/0212494 | A1 | 10/2004 | Stilp |
| 2004/0212687 | A1 | 10/2004 | Patwari |
| 2004/0213150 | A1 | 10/2004 | Krause et al. |
| 2004/0215694 | A1 | 10/2004 | Podolsky |
| 2004/0215700 | A1 | 10/2004 | Shenfield et al. |
| 2004/0215750 | A1 | 10/2004 | Stilp |
| 2004/0215955 | A1 | 10/2004 | Tamai et al. |
| 2004/0218591 | A1 | 11/2004 | Ogawa et al. |
| 2004/0220830 | A1 | 11/2004 | Moreton et al. |
| 2004/0223605 | A1 | 11/2004 | Donnelly |
| 2004/0225516 | A1 | 11/2004 | Bruskotter et al. |
| 2004/0225719 | A1 | 11/2004 | Kisley et al. |
| 2004/0225878 | A1 | 11/2004 | Costa-Requena et al. |
| 2004/0229569 | A1 | 11/2004 | Franz |
| 2004/0243714 | A1 | 12/2004 | Wynn et al. |
| 2004/0243835 | A1 | 12/2004 | Terzis et al. |
| 2004/0243996 | A1 | 12/2004 | Sheehy et al. |
| 2004/0246339 | A1 | 12/2004 | Ooshima et al. |
| 2004/0249613 | A1 | 12/2004 | Sprogis et al. |
| 2004/0249922 | A1 | 12/2004 | Hackman et al. |
| 2004/0253926 | A1 | 12/2004 | Gross |
| 2004/0257433 | A1 | 12/2004 | Lia et al. |
| 2004/0258032 | A1 | 12/2004 | Kawamura |
| 2004/0260407 | A1 | 12/2004 | Wimsatt |
| 2004/0260527 | A1 | 12/2004 | Stanculescu |
| 2004/0263314 | A1 | 12/2004 | Dorai et al. |
| 2004/0263625 | A1 | 12/2004 | Ishigami et al. |
| 2004/0263626 | A1 | 12/2004 | Piccionelli |
| 2004/0266493 | A1 | 12/2004 | Bahl et al. |
| 2004/0267385 | A1 | 12/2004 | Lingemann |
| 2004/0267937 | A1 | 12/2004 | Klemets |
| 2004/0268298 | A1 | 12/2004 | Miller et al. |
| 2005/0002335 | A1 | 1/2005 | Adamczyk et al. |
| 2005/0002408 | A1 | 1/2005 | Lee |
| 2005/0002417 | A1 | 1/2005 | Kelly et al. |
| 2005/0007967 | A1 | 1/2005 | Keskar et al. |
| 2005/0010866 | A1 | 1/2005 | Humpleman et al. |
| 2005/0015458 | A1 | 1/2005 | La |
| 2005/0015805 | A1 | 1/2005 | Ryuichi |
| 2005/0021309 | A1 | 1/2005 | Alexander et al. |
| 2005/0021626 | A1 | 1/2005 | Prajapat et al. |
| 2005/0021826 | A1 | 1/2005 | Kumar |
| 2005/0022210 | A1 | 1/2005 | Zintel et al. |
| 2005/0023858 | A1 | 2/2005 | Bingle et al. |
| 2005/0024203 | A1 | 2/2005 | Wolfe |
| 2005/0027881 | A1 | 2/2005 | Figueira et al. |
| 2005/0030928 | A1 | 2/2005 | Mrtanen et al. |
| 2005/0031108 | A1 | 2/2005 | Eshun et al. |
| 2005/0033513 | A1 | 2/2005 | Gasbarro |
| 2005/0038325 | A1 | 2/2005 | Moll |
| 2005/0038326 | A1 | 2/2005 | Mathur |
| 2005/0044061 | A1 | 2/2005 | Klemow |
| 2005/0048957 | A1 | 3/2005 | Casey et al. |
| 2005/0049746 | A1 | 3/2005 | Rosenblum |
| 2005/0050214 | A1 | 3/2005 | Nishiyama et al. |
| 2005/0052831 | A1 | 3/2005 | Chen |
| 2005/0055575 | A1 | 3/2005 | Evans et al. |
| 2005/0055716 | A1 | 3/2005 | Louie et al. |
| 2005/0057361 | A1 | 3/2005 | Giraldo et al. |
| 2005/0060163 | A1 | 3/2005 | Barsness et al. |
| 2005/0060411 | A1 | 3/2005 | Coulombe et al. |
| 2005/0066045 | A1 | 3/2005 | Johnson et al. |
| 2005/0066912 | A1 | 3/2005 | Korbitz et al. |
| 2005/0069098 | A1 | 3/2005 | Kalervo et al. |
| 2005/0071483 | A1 | 3/2005 | Motoyama |
| 2005/0075764 | A1 | 4/2005 | Horst et al. |
| 2005/0079855 | A1 | 4/2005 | Jethi et al. |
| 2005/0079863 | A1 | 4/2005 | Macaluso |
| 2005/0081161 | A1 | 4/2005 | MacInnes et al. |
| 2005/0086093 | A1 | 4/2005 | Hammad et al. |
| 2005/0086126 | A1 | 4/2005 | Patterson |
| 2005/0086211 | A1 | 4/2005 | Mayer |
| 2005/0086366 | A1 | 4/2005 | Luebke et al. |
| 2005/0088983 | A1 | 4/2005 | Wesslen et al. |
| 2005/0089023 | A1 | 4/2005 | Barkley et al. |
| 2005/0090915 | A1 | 4/2005 | Geiwitz |
| 2005/0091435 | A1 | 4/2005 | Han et al. |
| 2005/0091696 | A1 | 4/2005 | Wolfe et al. |
| 2005/0096753 | A1 | 5/2005 | Arling et al. |
| 2005/0101314 | A1 | 5/2005 | Levi |
| 2005/0102152 | A1 | 5/2005 | Hodges |
| 2005/0102497 | A1 | 5/2005 | Buer |
| 2005/0105530 | A1 | 5/2005 | Kono |
| 2005/0108091 | A1 | 5/2005 | Sotak et al. |
| 2005/0108369 | A1 | 5/2005 | Sather et al. |
| 2005/0111660 | A1 | 5/2005 | Hosoda |
| 2005/0114432 | A1 | 5/2005 | Hodges et al. |
| 2005/0114528 | A1 | 5/2005 | Suito |
| 2005/0114900 | A1 | 5/2005 | Ladd et al. |
| 2005/0117602 | A1 | 6/2005 | Carrigan et al. |
| 2005/0117732 | A1 | 6/2005 | Arpin |
| 2005/0119767 | A1 | 6/2005 | Kiwimagi et al. |
| 2005/0119913 | A1 | 6/2005 | Hornreich et al. |
| 2005/0120082 | A1 | 6/2005 | Hesselink et al. |
| 2005/0125083 | A1 | 6/2005 | Kiko |
| 2005/0128083 | A1 | 6/2005 | Puzio et al. |
| 2005/0128093 | A1 | 6/2005 | Genova et al. |
| 2005/0128314 | A1 | 6/2005 | Ishino |
| 2005/0144044 | A1 | 6/2005 | Godschall et al. |
| 2005/0144312 | A1 | 6/2005 | Kadyk et al. |
| 2005/0144645 | A1 | 6/2005 | Casey et al. |
| 2005/0148356 | A1 | 7/2005 | Ferguson et al. |
| 2005/0149639 | A1 | 7/2005 | Vrielink et al. |
| 2005/0149746 | A1 | 7/2005 | Lu et al. |
| 2005/0154494 | A1 | 7/2005 | Ahmed |
| 2005/0154774 | A1 | 7/2005 | Giaffreda et al. |
| 2005/0155757 | A1 | 7/2005 | Paton |
| 2005/0156568 | A1 | 7/2005 | Yueh |
| 2005/0156737 | A1 | 7/2005 | Al-Khateeb |
| 2005/0159823 | A1 | 7/2005 | Hayes et al. |
| 2005/0159911 | A1 | 7/2005 | Funk et al. |
| 2005/0169288 | A1 | 8/2005 | Kamiwada et al. |
| 2005/0177515 | A1 | 8/2005 | Kalavade et al. |
| 2005/0179531 | A1 | 8/2005 | Tabe |
| 2005/0181196 | A1 | 8/2005 | Aylward et al. |
| 2005/0182681 | A1 | 8/2005 | Bruskotter et al. |
| 2005/0184865 | A1 | 8/2005 | Han |

(56) References Cited

U.S. PATENT DOCUMENTS

| | | | |
|---|---|---|---|
| 2005/0185618 | A1 | 8/2005 | Friday et al. |
| 2005/0187677 | A1 | 8/2005 | Walker |
| 2005/0188315 | A1 | 8/2005 | Campbell et al. |
| 2005/0197847 | A1 | 9/2005 | Smith |
| 2005/0198216 | A1 | 9/2005 | Behera et al. |
| 2005/0200474 | A1 | 9/2005 | Behnke |
| 2005/0204076 | A1 | 9/2005 | Cumpson et al. |
| 2005/0207429 | A1 | 9/2005 | Akita et al. |
| 2005/0216302 | A1 | 9/2005 | Raji et al. |
| 2005/0216580 | A1* | 9/2005 | Raji .................... H04L 12/2825 709/223 |
| 2005/0220123 | A1 | 10/2005 | Wybenga et al. |
| 2005/0222933 | A1 | 10/2005 | Wesby |
| 2005/0229016 | A1 | 10/2005 | Addy |
| 2005/0232242 | A1 | 10/2005 | Karaoguz et al. |
| 2005/0232284 | A1 | 10/2005 | Karaoguz et al. |
| 2005/0234568 | A1 | 10/2005 | Chung et al. |
| 2005/0237182 | A1 | 10/2005 | Wang |
| 2005/0246119 | A1 | 11/2005 | Koodali |
| 2005/0246408 | A1 | 11/2005 | Chung |
| 2005/0249199 | A1 | 11/2005 | Albert et al. |
| 2005/0253709 | A1 | 11/2005 | Baker |
| 2005/0256608 | A1 | 11/2005 | King et al. |
| 2005/0257013 | A1 | 11/2005 | Ma |
| 2005/0257260 | A1 | 11/2005 | Lenoir et al. |
| 2005/0259673 | A1 | 11/2005 | Lu et al. |
| 2005/0262241 | A1 | 11/2005 | Gubbi et al. |
| 2005/0266826 | A1 | 12/2005 | Vlad |
| 2005/0267605 | A1 | 12/2005 | Lee et al. |
| 2005/0270151 | A1 | 12/2005 | Winick |
| 2005/0273831 | A1 | 12/2005 | Slomovich et al. |
| 2005/0276389 | A1 | 12/2005 | Hinkson et al. |
| 2005/0277434 | A1 | 12/2005 | Tuomi et al. |
| 2005/0280964 | A1 | 12/2005 | Richmond et al. |
| 2005/0281196 | A1 | 12/2005 | Tornetta et al. |
| 2005/0282557 | A1 | 12/2005 | Mikko et al. |
| 2005/0285934 | A1 | 12/2005 | Carter |
| 2005/0285941 | A1 | 12/2005 | Haigh et al. |
| 2005/0286518 | A1 | 12/2005 | Park et al. |
| 2006/0007005 | A1 | 1/2006 | Yui et al. |
| 2006/0009863 | A1 | 1/2006 | Lingemann |
| 2006/0015943 | A1 | 1/2006 | Mahieu |
| 2006/0018328 | A1 | 1/2006 | Mody et al. |
| 2006/0018479 | A1 | 1/2006 | Chen |
| 2006/0022816 | A1 | 2/2006 | Yukawa |
| 2006/0023847 | A1 | 2/2006 | Tyroler et al. |
| 2006/0026017 | A1 | 2/2006 | Walker |
| 2006/0026301 | A1 | 2/2006 | Maeda et al. |
| 2006/0028997 | A1 | 2/2006 | McFarland |
| 2006/0031426 | A1 | 2/2006 | Mesarina et al. |
| 2006/0031436 | A1 | 2/2006 | Sakata et al. |
| 2006/0031852 | A1 | 2/2006 | Chu et al. |
| 2006/0036750 | A1 | 2/2006 | Ladd et al. |
| 2006/0041655 | A1 | 2/2006 | Holloway et al. |
| 2006/0045074 | A1 | 3/2006 | Dae-Hyun |
| 2006/0050692 | A1 | 3/2006 | Petrescu et al. |
| 2006/0050862 | A1 | 3/2006 | Shen et al. |
| 2006/0051122 | A1 | 3/2006 | Kawazu et al. |
| 2006/0052884 | A1 | 3/2006 | Staples et al. |
| 2006/0053447 | A1 | 3/2006 | Krzyzanowski et al. |
| 2006/0053459 | A1 | 3/2006 | Simerly et al. |
| 2006/0053491 | A1 | 3/2006 | Khuti et al. |
| 2006/0058923 | A1 | 3/2006 | Kruk et al. |
| 2006/0063534 | A1 | 3/2006 | Kokkonen et al. |
| 2006/0064305 | A1 | 3/2006 | Alonso |
| 2006/0064478 | A1 | 3/2006 | Sirkin |
| 2006/0067344 | A1 | 3/2006 | Sakurai |
| 2006/0067356 | A1 | 3/2006 | Kim et al. |
| 2006/0067484 | A1 | 3/2006 | Elliot et al. |
| 2006/0071773 | A1 | 4/2006 | Ahmed et al. |
| 2006/0072470 | A1 | 4/2006 | Moore et al. |
| 2006/0075235 | A1 | 4/2006 | Renkis |
| 2006/0077254 | A1 | 4/2006 | Shu et al. |
| 2006/0078344 | A1 | 4/2006 | Kawazu et al. |
| 2006/0080380 | A1 | 4/2006 | Aizu et al. |
| 2006/0080465 | A1 | 4/2006 | Conzola et al. |
| 2006/0082651 | A1 | 4/2006 | Hirafuji et al. |
| 2006/0088092 | A1 | 4/2006 | Chen et al. |
| 2006/0092955 | A1 | 5/2006 | Durbin et al. |
| 2006/0093365 | A1 | 5/2006 | Dybsetter et al. |
| 2006/0094400 | A1 | 5/2006 | Beachem et al. |
| 2006/0101062 | A1 | 5/2006 | Godman et al. |
| 2006/0103510 | A1 | 5/2006 | Chen et al. |
| 2006/0104312 | A1 | 5/2006 | Friar |
| 2006/0105713 | A1 | 5/2006 | Zheng et al. |
| 2006/0106933 | A1 | 5/2006 | Huang et al. |
| 2006/0109113 | A1 | 5/2006 | Reyes et al. |
| 2006/0109860 | A1 | 5/2006 | Matsunaga et al. |
| 2006/0109966 | A1 | 5/2006 | Sasakura et al. |
| 2006/0111095 | A1 | 5/2006 | Weigand |
| 2006/0114842 | A1 | 6/2006 | Miyamoto et al. |
| 2006/0121924 | A1 | 6/2006 | Rengaraju et al. |
| 2006/0122774 | A1 | 6/2006 | Nou |
| 2006/0123212 | A1 | 6/2006 | Yagawa |
| 2006/0129837 | A1 | 6/2006 | Im et al. |
| 2006/0130004 | A1 | 6/2006 | Hughes et al. |
| 2006/0132302 | A1 | 6/2006 | Stilp |
| 2006/0133412 | A1 | 6/2006 | Callaghan |
| 2006/0136558 | A1 | 6/2006 | Sheehan et al. |
| 2006/0142968 | A1 | 6/2006 | Han et al. |
| 2006/0142978 | A1 | 6/2006 | Suenbuel et al. |
| 2006/0143268 | A1 | 6/2006 | Chatani |
| 2006/0145842 | A1 | 7/2006 | Stilp |
| 2006/0153122 | A1 | 7/2006 | Hinman et al. |
| 2006/0154642 | A1 | 7/2006 | Scannell |
| 2006/0155851 | A1 | 7/2006 | Ma et al. |
| 2006/0159032 | A1 | 7/2006 | Ukrainetz et al. |
| 2006/0161270 | A1 | 7/2006 | Luskin et al. |
| 2006/0161662 | A1 | 7/2006 | Ng et al. |
| 2006/0161960 | A1 | 7/2006 | Benoit |
| 2006/0167784 | A1 | 7/2006 | Hoffberg |
| 2006/0167919 | A1 | 7/2006 | Hsieh |
| 2006/0168013 | A1 | 7/2006 | Wilson et al. |
| 2006/0168095 | A1 | 7/2006 | Sharma et al. |
| 2006/0168178 | A1 | 7/2006 | Hwang et al. |
| 2006/0168190 | A1 | 7/2006 | Johan et al. |
| 2006/0171307 | A1 | 8/2006 | Gopalakrishnan et al. |
| 2006/0176146 | A1 | 8/2006 | Krishan et al. |
| 2006/0176167 | A1 | 8/2006 | Dohrmann |
| 2006/0181406 | A1 | 8/2006 | Petite et al. |
| 2006/0182100 | A1 | 8/2006 | Li et al. |
| 2006/0187900 | A1 | 8/2006 | Akbar |
| 2006/0189311 | A1 | 8/2006 | Cromer et al. |
| 2006/0190458 | A1 | 8/2006 | Mishina et al. |
| 2006/0190529 | A1 | 8/2006 | Morozumi et al. |
| 2006/0197660 | A1 | 9/2006 | Luebke et al. |
| 2006/0200845 | A1 | 9/2006 | Foster et al. |
| 2006/0206220 | A1 | 9/2006 | Amundson |
| 2006/0206246 | A1 | 9/2006 | Walker |
| 2006/0208872 | A1 | 9/2006 | Yu et al. |
| 2006/0208880 | A1 | 9/2006 | Funk et al. |
| 2006/0209857 | A1 | 9/2006 | Hicks, III |
| 2006/0215650 | A1 | 9/2006 | Wollmershauser et al. |
| 2006/0217115 | A1 | 9/2006 | Cassett et al. |
| 2006/0218244 | A1 | 9/2006 | Rasmussen et al. |
| 2006/0218593 | A1 | 9/2006 | Afshary et al. |
| 2006/0221184 | A1 | 10/2006 | Vallone et al. |
| 2006/0222153 | A1 | 10/2006 | Tarkoff et al. |
| 2006/0226972 | A1 | 10/2006 | Smith |
| 2006/0229746 | A1 | 10/2006 | Ollis et al. |
| 2006/0230270 | A1 | 10/2006 | Goffin |
| 2006/0233372 | A1 | 10/2006 | Shaheen et al. |
| 2006/0235963 | A1 | 10/2006 | Wetherly et al. |
| 2006/0236050 | A1 | 10/2006 | Sugimoto et al. |
| 2006/0238372 | A1 | 10/2006 | Jung et al. |
| 2006/0238617 | A1 | 10/2006 | Tamir |
| 2006/0242395 | A1 | 10/2006 | Fausak |
| 2006/0244589 | A1 | 11/2006 | Schranz |
| 2006/0245369 | A1 | 11/2006 | Schimmelpfeng et al. |
| 2006/0246886 | A1 | 11/2006 | Benco et al. |
| 2006/0246919 | A1 | 11/2006 | Park et al. |
| 2006/0250235 | A1 | 11/2006 | Astrin |
| 2006/0250578 | A1 | 11/2006 | Pohl et al. |
| 2006/0251255 | A1 | 11/2006 | Batta |

(56) References Cited

U.S. PATENT DOCUMENTS

2006/0258342 A1 11/2006 Fok et al.
2006/0259951 A1 11/2006 Forssell et al.
2006/0265489 A1 11/2006 Moore
2006/0271695 A1 11/2006 Lavian
2006/0274764 A1 12/2006 Mah et al.
2006/0281435 A1 12/2006 Shearer et al.
2006/0282886 A1 12/2006 Gaug
2006/0288288 A1 12/2006 Girgensohn et al.
2006/0291507 A1 12/2006 Sarosi et al.
2006/0293100 A1 12/2006 Walter
2006/0294565 A1 12/2006 Walter
2007/0001818 A1 1/2007 Small et al.
2007/0002833 A1 1/2007 Bajic
2007/0005736 A1 1/2007 Hansen et al.
2007/0005957 A1 1/2007 Sahita et al.
2007/0006177 A1 1/2007 Aiber et al.
2007/0008099 A1 1/2007 Kimmel et al.
2007/0014248 A1 1/2007 Fowlow
2007/0027987 A1 2/2007 Tripp et al.
2007/0043478 A1 2/2007 Ehlers et al.
2007/0043954 A1 2/2007 Fox
2007/0046462 A1 3/2007 Fancella
2007/0047585 A1 3/2007 Gillespie et al.
2007/0052675 A1 3/2007 Chang
2007/0055770 A1 3/2007 Karmakar et al.
2007/0058627 A1 3/2007 Smith et al.
2007/0061018 A1 3/2007 Callaghan et al.
2007/0061020 A1 3/2007 Bovee et al.
2007/0061266 A1 3/2007 Moore et al.
2007/0061430 A1 3/2007 Kim
2007/0061878 A1 3/2007 Hagiu et al.
2007/0063836 A1 3/2007 Hayden et al.
2007/0063866 A1 3/2007 Webb
2007/0064714 A1 3/2007 Bi et al.
2007/0067780 A1 3/2007 Kumar et al.
2007/0079012 A1 4/2007 Walker
2007/0079151 A1 4/2007 Connor et al.
2007/0079385 A1 4/2007 Williams et al.
2007/0083668 A1 4/2007 Kelsey et al.
2007/0090944 A1 4/2007 Du Breuil
2007/0094716 A1 4/2007 Farino et al.
2007/0096981 A1 5/2007 Abraham
2007/0101345 A1 5/2007 Takagi
2007/0105072 A1 5/2007 Koljonen
2007/0106124 A1 5/2007 Kuriyama et al.
2007/0106536 A1 5/2007 Moore
2007/0106547 A1 5/2007 Agrawal
2007/0109975 A1 5/2007 Reckamp et al.
2007/0116020 A1 5/2007 Cheever et al.
2007/0117464 A1 5/2007 Freeman
2007/0118609 A1 5/2007 Mullan et al.
2007/0126875 A1 6/2007 Miyamaki
2007/0127510 A1 6/2007 Bossemeyer et al.
2007/0132576 A1 6/2007 Kolavennu et al.
2007/0136759 A1 6/2007 Zhang et al.
2007/0140267 A1 6/2007 Yang
2007/0142022 A1 6/2007 Madonna et al.
2007/0142044 A1 6/2007 Fitzgerald et al.
2007/0143400 A1 6/2007 Kelley et al.
2007/0143440 A1 6/2007 Reckamp et al.
2007/0146127 A1 6/2007 Stilp et al.
2007/0146484 A1 6/2007 Horton et al.
2007/0147419 A1 6/2007 Tsujimoto et al.
2007/0150616 A1 6/2007 Baek et al.
2007/0154010 A1 7/2007 Wong
2007/0155325 A1 7/2007 Bambic et al.
2007/0155423 A1 7/2007 Carmody et al.
2007/0156689 A1 7/2007 Meek et al.
2007/0160017 A1 7/2007 Meier et al.
2007/0161372 A1 7/2007 Rogalski et al.
2007/0162228 A1 7/2007 Mitchell
2007/0162680 A1 7/2007 Mitchell
2007/0164779 A1 7/2007 Weston et al.
2007/0168860 A1 7/2007 Takayama et al.
2007/0176766 A1 8/2007 Cheng
2007/0182543 A1 8/2007 Luo
2007/0182819 A1 8/2007 Monroe
2007/0183345 A1 8/2007 Fahim et al.
2007/0185989 A1 8/2007 Corbett et al.
2007/0192486 A1 8/2007 Wilson et al.
2007/0192863 A1 8/2007 Kapoor et al.
2007/0197236 A1 8/2007 Ahn et al.
2007/0198698 A1 8/2007 Boyd et al.
2007/0200658 A1 8/2007 Yang
2007/0208521 A1 9/2007 Petite et al.
2007/0214262 A1 9/2007 Buchbinder et al.
2007/0214264 A1 9/2007 Koister
2007/0216764 A1 9/2007 Kwak
2007/0216783 A1 9/2007 Ortiz et al.
2007/0218895 A1 9/2007 Saito et al.
2007/0223465 A1 9/2007 Wang et al.
2007/0223500 A1 9/2007 Lee et al.
2007/0226182 A1 9/2007 Sobotka et al.
2007/0230415 A1 10/2007 Malik
2007/0230744 A1 10/2007 Dronge
2007/0245223 A1 10/2007 Siedzik et al.
2007/0249323 A1 10/2007 Lee et al.
2007/0253361 A1 11/2007 Pristas et al.
2007/0255856 A1 11/2007 Reckamp et al.
2007/0256105 A1 11/2007 Tabe
2007/0257986 A1 11/2007 Ivanov et al.
2007/0260713 A1 11/2007 Moorer et al.
2007/0262857 A1 11/2007 Jackson
2007/0263782 A1 11/2007 Stock et al.
2007/0265866 A1 11/2007 Fehling et al.
2007/0271398 A1 11/2007 Manchester et al.
2007/0275703 A1 11/2007 Lim et al.
2007/0277111 A1 11/2007 Bennett et al.
2007/0282665 A1 12/2007 Buehler et al.
2007/0283001 A1 12/2007 Spiess et al.
2007/0283004 A1 12/2007 Buehler
2007/0287405 A1 12/2007 Radtke
2007/0288858 A1 12/2007 Pereira
2007/0290830 A1 12/2007 Gurley
2007/0291118 A1 12/2007 Shu et al.
2007/0296814 A1 12/2007 Cooper et al.
2007/0298772 A1 12/2007 Owens et al.
2008/0013531 A1 1/2008 Elliott et al.
2008/0013957 A1 1/2008 Akers et al.
2008/0025487 A1 1/2008 Johan et al.
2008/0027587 A1 1/2008 Nickerson et al.
2008/0034379 A1 2/2008 Dale et al.
2008/0040272 A1 2/2008 Eskin
2008/0042826 A1 2/2008 Hevia et al.
2008/0043107 A1 2/2008 Coogan et al.
2008/0046593 A1 2/2008 Ando et al.
2008/0048975 A1 2/2008 Leibow
2008/0052348 A1 2/2008 Adler et al.
2008/0056212 A1 3/2008 Karaoguz et al.
2008/0059533 A1 3/2008 Krikorian
2008/0059622 A1 3/2008 Hite et al.
2008/0065681 A1 3/2008 Fontijn et al.
2008/0065685 A1 3/2008 Frank
2008/0069121 A1 3/2008 Adamson et al.
2008/0072244 A1 3/2008 Eker et al.
2008/0074258 A1 3/2008 Bennett et al.
2008/0074993 A1 3/2008 Vainola
2008/0082186 A1 4/2008 Hood et al.
2008/0084294 A1 4/2008 Zhiying et al.
2008/0084296 A1 4/2008 Kutzik et al.
2008/0086564 A1 4/2008 Putman et al.
2008/0091793 A1 4/2008 Diroo et al.
2008/0094204 A1 4/2008 Kogan et al.
2008/0095339 A1 4/2008 Elliott et al.
2008/0100705 A1 5/2008 Kister et al.
2008/0102845 A1 5/2008 Zhao
2008/0103608 A1 5/2008 Gough et al.
2008/0104215 A1 5/2008 Excoffier et al.
2008/0104516 A1 5/2008 Lee
2008/0109302 A1 5/2008 Salokannel et al.
2008/0109650 A1 5/2008 Shim et al.
2008/0112340 A1 5/2008 Luebke
2008/0112405 A1 5/2008 Cholas et al.
2008/0117029 A1 5/2008 Dohrmann et al.

(56) References Cited

U.S. PATENT DOCUMENTS

2008/0117201 A1 5/2008 Martinez et al.
2008/0117922 A1 5/2008 Cockrell et al.
2008/0120405 A1 5/2008 Son et al.
2008/0122575 A1 5/2008 Lavian et al.
2008/0126535 A1 5/2008 Zhu et al.
2008/0128444 A1 6/2008 Schininger et al.
2008/0129484 A1 6/2008 Dahl et al.
2008/0129821 A1 6/2008 Howarter et al.
2008/0130949 A1 6/2008 Ivanov et al.
2008/0133725 A1 6/2008 Shaouy
2008/0134165 A1 6/2008 Anderson et al.
2008/0134343 A1 6/2008 Pennington et al.
2008/0137572 A1 6/2008 Park et al.
2008/0140868 A1 6/2008 Kalayjian et al.
2008/0141303 A1 6/2008 Walker et al.
2008/0141341 A1 6/2008 Vinogradov et al.
2008/0144884 A1 6/2008 Habibi
2008/0147834 A1 6/2008 Quinn et al.
2008/0151037 A1 6/2008 Kumarasamy et al.
2008/0155080 A1 6/2008 Marlow et al.
2008/0155470 A1 6/2008 Khedouri et al.
2008/0162637 A1 7/2008 Adamczyk et al.
2008/0163355 A1 7/2008 Chu
2008/0165787 A1 7/2008 Xu et al.
2008/0170511 A1 7/2008 Shorty et al.
2008/0181239 A1 7/2008 Wood et al.
2008/0183483 A1 7/2008 Hart
2008/0189609 A1 8/2008 Larson et al.
2008/0189774 A1 8/2008 Ansari et al.
2008/0201468 A1 8/2008 Titus
2008/0201723 A1 8/2008 Bottaro et al.
2008/0208399 A1 8/2008 Pham
2008/0209505 A1 8/2008 Ghai et al.
2008/0209506 A1 8/2008 Ghai et al.
2008/0215450 A1 9/2008 Gates et al.
2008/0215613 A1 9/2008 Grasso
2008/0219239 A1 9/2008 Bell et al.
2008/0221715 A1 9/2008 Krzyzanowski et al.
2008/0227460 A1 9/2008 David et al.
2008/0229415 A1 9/2008 Kapoor et al.
2008/0235326 A1 9/2008 Parsi et al.
2008/0235600 A1 9/2008 Harper et al.
2008/0239075 A1 10/2008 Mehrotra et al.
2008/0240372 A1 10/2008 Frenette
2008/0240696 A1 10/2008 Kucharyson
2008/0259818 A1 10/2008 Balassanian
2008/0261540 A1 10/2008 Rohani et al.
2008/0262990 A1 10/2008 Kapoor et al.
2008/0262991 A1 10/2008 Kapoor et al.
2008/0263150 A1 10/2008 Childers et al.
2008/0266080 A1 10/2008 Leung et al.
2008/0266257 A1 10/2008 Chiang
2008/0271150 A1 10/2008 Boerger et al.
2008/0284580 A1 11/2008 Babich et al.
2008/0284587 A1 11/2008 Saigh et al.
2008/0284592 A1 11/2008 Collins et al.
2008/0288639 A1 11/2008 Ruppert et al.
2008/0294588 A1 11/2008 Morris et al.
2008/0295172 A1 11/2008 Bohacek
2008/0297599 A1 12/2008 Donovan et al.
2008/0303903 A1 12/2008 Bentley et al.
2008/0313316 A1 12/2008 Hite et al.
2008/0316024 A1 12/2008 Chantelou et al.
2009/0003172 A1 1/2009 Yahata et al.
2009/0003252 A1 1/2009 Salomone et al.
2009/0003820 A1 1/2009 Law et al.
2009/0007596 A1 1/2009 Goldstein et al.
2009/0013210 A1 1/2009 McIntosh et al.
2009/0018850 A1 1/2009 Abhyanker
2009/0019141 A1 1/2009 Bush et al.
2009/0022362 A1 1/2009 Gagvani et al.
2009/0024493 A1 1/2009 Huang et al.
2009/0036142 A1 2/2009 Yan
2009/0036159 A1 2/2009 Chen
2009/0041467 A1 2/2009 Carleton et al.
2009/0042649 A1 2/2009 Hsieh et al.
2009/0046664 A1 2/2009 Aso
2009/0049094 A1 2/2009 Howell et al.
2009/0049488 A1 2/2009 Stransky
2009/0051769 A1 2/2009 Kuo et al.
2009/0055760 A1 2/2009 Whatcott et al.
2009/0057427 A1 3/2009 Geadelmann et al.
2009/0063582 A1 3/2009 Anna et al.
2009/0066534 A1 3/2009 Sivakkolundhu
2009/0067395 A1 3/2009 Curtis et al.
2009/0070692 A1 3/2009 Dawes et al.
2009/0072988 A1 3/2009 Haywood
2009/0076211 A1 3/2009 Yang et al.
2009/0076879 A1 3/2009 Sparks et al.
2009/0077623 A1 3/2009 Baum et al.
2009/0079547 A1 3/2009 Oksanen et al.
2009/0083167 A1 3/2009 Subbloie
2009/0086660 A1 4/2009 Sood et al.
2009/0086740 A1 4/2009 Al-Bakri et al.
2009/0089822 A1 4/2009 Wada
2009/0092283 A1 4/2009 Whillock et al.
2009/0094671 A1 4/2009 Kurapati et al.
2009/0100176 A1 4/2009 Hicks, III et al.
2009/0100329 A1 4/2009 Espinoza
2009/0100460 A1 4/2009 Hicks et al.
2009/0100492 A1 4/2009 Hicks et al.
2009/0109959 A1 4/2009 Elliott et al.
2009/0113344 A1 4/2009 Nesse et al.
2009/0119397 A1 5/2009 Neerdaels
2009/0125708 A1 5/2009 Woodring et al.
2009/0128365 A1 5/2009 Laskin
2009/0144237 A1 6/2009 Branam et al.
2009/0158189 A1 6/2009 Itani
2009/0158292 A1 6/2009 Rattner et al.
2009/0161609 A1 6/2009 Bergstrom
2009/0172443 A1 7/2009 Rothman et al.
2009/0177298 A1 7/2009 McFarland et al.
2009/0177906 A1 7/2009 Paniagua et al.
2009/0180430 A1 7/2009 Fadell
2009/0182868 A1 7/2009 McFate et al.
2009/0187297 A1 7/2009 Kish et al.
2009/0189981 A1 7/2009 Siann et al.
2009/0193373 A1 7/2009 Abbaspour et al.
2009/0197539 A1 8/2009 Shiba
2009/0202250 A1 8/2009 Dizechi et al.
2009/0204693 A1 8/2009 Andreev et al.
2009/0221368 A1 9/2009 Yen et al.
2009/0224875 A1 9/2009 Rabinowitz et al.
2009/0228445 A1 9/2009 Gangal
2009/0240353 A1 9/2009 Songkakul et al.
2009/0240730 A1 9/2009 Wood
2009/0240787 A1 9/2009 Denny
2009/0240814 A1 9/2009 Brubacher et al.
2009/0240946 A1 9/2009 Yeap et al.
2009/0254960 A1 10/2009 Yarom et al.
2009/0256708 A1 10/2009 Hsiao et al.
2009/0259515 A1 10/2009 Belimpasakis et al.
2009/0260052 A1 10/2009 Bathula et al.
2009/0260083 A1 10/2009 Szeto et al.
2009/0260430 A1 10/2009 Zamfes
2009/0261943 A1* 10/2009 Jana .................... G08B 25/012 340/3.1
2009/0265042 A1 10/2009 Mollenkopf et al.
2009/0265193 A1 10/2009 Collins et al.
2009/0270090 A1 10/2009 Kawamura
2009/0271042 A1 10/2009 Voysey
2009/0276728 A1 11/2009 Doan et al.
2009/0289787 A1 11/2009 Dawson et al.
2009/0289788 A1 11/2009 Leblond
2009/0292909 A1 11/2009 Feder et al.
2009/0303100 A1 12/2009 Zemany
2009/0307255 A1 12/2009 Park
2009/0307307 A1 12/2009 Igarashi
2009/0311995 A1* 12/2009 Himmelstein ....... G07B 15/063 455/414.1
2009/0313693 A1 12/2009 Rogers
2009/0316671 A1 12/2009 Rolf et al.
2009/0319361 A1 12/2009 Conrady
2009/0322510 A1 12/2009 Berger et al.

(56) References Cited

U.S. PATENT DOCUMENTS

2009/0324010 A1 12/2009 Hou
2009/0327483 A1 12/2009 Thompson et al.
2009/0327510 A1 12/2009 Edelman et al.
2010/0000791 A1 1/2010 Alberty
2010/0001812 A1 1/2010 Kausch
2010/0004949 A1 1/2010 O'Brien
2010/0008274 A1 1/2010 Kneckt et al.
2010/0009758 A1 1/2010 Twitchell, Jr.
2010/0011298 A1 1/2010 Campbell et al.
2010/0013917 A1 1/2010 Hanna et al.
2010/0026481 A1 2/2010 Oh et al.
2010/0026487 A1 2/2010 Hershkovitz
2010/0030578 A1 2/2010 Siddique et al.
2010/0030810 A1 2/2010 Marr
2010/0039958 A1 2/2010 Ge et al.
2010/0041380 A1 2/2010 Hewes et al.
2010/0042954 A1 2/2010 Rosenblatt et al.
2010/0045461 A1* 2/2010 Caler .................. G08B 25/008 340/541
2010/0067371 A1 3/2010 Gogic et al.
2010/0070618 A1 3/2010 Kim et al.
2010/0071053 A1 3/2010 Ansari et al.
2010/0074112 A1 3/2010 Derr et al.
2010/0077111 A1 3/2010 Holmes et al.
2010/0077347 A1 3/2010 Kirtane et al.
2010/0100269 A1 4/2010 Ekhaguere et al.
2010/0102951 A1 4/2010 Rutledge
2010/0121521 A1 5/2010 Kiribayashi
2010/0122091 A1 5/2010 Huang et al.
2010/0138758 A1 6/2010 Mizumori et al.
2010/0138764 A1 6/2010 Hatambeiki et al.
2010/0141762 A1 6/2010 Siann et al.
2010/0145485 A1 6/2010 Duchene et al.
2010/0150170 A1 6/2010 Lee et al.
2010/0159898 A1 6/2010 Krzyzanowski et al.
2010/0159967 A1 6/2010 Pounds et al.
2010/0164736 A1 7/2010 Byers et al.
2010/0165897 A1 7/2010 Sood
2010/0174643 A1 7/2010 Schaefer et al.
2010/0177749 A1 7/2010 Essinger et al.
2010/0177750 A1 7/2010 Essinger et al.
2010/0185857 A1 7/2010 Neitzel et al.
2010/0191352 A1 7/2010 Quail
2010/0197219 A1 8/2010 Issa et al.
2010/0204839 A1 8/2010 Behm et al.
2010/0210240 A1 8/2010 Mahaffey et al.
2010/0212012 A1 8/2010 Touboul et al.
2010/0217837 A1 8/2010 Ansari et al.
2010/0218104 A1 8/2010 Lewis
2010/0222069 A1 9/2010 Abraham et al.
2010/0238286 A1 9/2010 Boghossian et al.
2010/0241711 A1 9/2010 Ansari et al.
2010/0241748 A1 9/2010 Ansari et al.
2010/0248681 A1 9/2010 Phills
2010/0267390 A1 10/2010 Lin et al.
2010/0274366 A1 10/2010 Fata et al.
2010/0275018 A1 10/2010 Pedersen
2010/0277302 A1 11/2010 Cohn et al.
2010/0279649 A1 11/2010 Thomas
2010/0281135 A1 11/2010 Cohn et al.
2010/0281161 A1 11/2010 Cohn et al.
2010/0298024 A1 11/2010 Choi
2010/0299556 A1 11/2010 Taylor et al.
2010/0305779 A1 12/2010 Hassan et al.
2010/0308990 A1 12/2010 Simon et al.
2010/0321151 A1 12/2010 Matsuura et al.
2010/0325107 A1 12/2010 Kenton et al.
2010/0332164 A1 12/2010 Aisa et al.
2011/0000521 A1 1/2011 Tachibana
2011/0001898 A1 1/2011 Mikubo et al.
2011/0018998 A1 1/2011 Guzik
2011/0029875 A1 2/2011 Milch
2011/0030056 A1 2/2011 Tokunaga
2011/0037593 A1 2/2011 Foisy et al.
2011/0040415 A1 2/2011 Nickerson et al.
2011/0040877 A1 2/2011 Foisy
2011/0046792 A1 2/2011 Imes et al.
2011/0051638 A1 3/2011 Jeon et al.
2011/0058034 A1 3/2011 Grass
2011/0061011 A1 3/2011 Hoguet
2011/0068921 A1 3/2011 Shafer
2011/0080267 A1 4/2011 Clare et al.
2011/0087988 A1 4/2011 Ray et al.
2011/0090334 A1* 4/2011 Hicks, III ........ G08B 13/19658 379/44
2011/0093799 A1 4/2011 Hatambeiki et al.
2011/0096678 A1 4/2011 Ketonen
2011/0102588 A1* 5/2011 Trundle ................. G08B 25/14 348/143
2011/0107436 A1 5/2011 Cholas et al.
2011/0125333 A1 5/2011 Gray
2011/0125846 A1 5/2011 Ham et al.
2011/0128378 A1 6/2011 Raji
2011/0130112 A1 6/2011 Saigh et al.
2011/0131226 A1 6/2011 Chandra et al.
2011/0148572 A1 6/2011 Ku
2011/0156914 A1 6/2011 Sheharri et al.
2011/0169637 A1 7/2011 Siegler et al.
2011/0187497 A1 8/2011 Chin
2011/0197327 A1 8/2011 McElroy et al.
2011/0200052 A1 8/2011 Mungo et al.
2011/0208359 A1 8/2011 Duchene et al.
2011/0212706 A1 9/2011 Uusilehto
2011/0213869 A1 9/2011 Korsunsky et al.
2011/0214157 A1 9/2011 Korsunsky et al.
2011/0218777 A1 9/2011 Chen et al.
2011/0219035 A1 9/2011 Korsunsky et al.
2011/0230139 A1 9/2011 Nakahara
2011/0230160 A1 9/2011 Felgate
2011/0231510 A1 9/2011 Korsunsky et al.
2011/0231564 A1 9/2011 Korsunsky et al.
2011/0234392 A1 9/2011 Cohn et al.
2011/0238660 A1 9/2011 Riggs
2011/0238855 A1 9/2011 Korsunsky et al.
2011/0246762 A1 10/2011 Adams et al.
2011/0257953 A1 10/2011 Li et al.
2011/0261195 A1 10/2011 Martin et al.
2011/0276699 A1 11/2011 Pedersen
2011/0283006 A1 11/2011 Ramamurthy
2011/0289517 A1 11/2011 Sather et al.
2011/0299546 A1 12/2011 Prodan et al.
2011/0302497 A1 12/2011 Garrett et al.
2011/0309929 A1 12/2011 Myers
2011/0314515 A1 12/2011 Hernoud et al.
2012/0001436 A1 1/2012 Sami et al.
2012/0005276 A1 1/2012 Guo et al.
2012/0014363 A1 1/2012 Hassan et al.
2012/0016607 A1 1/2012 Cottrell et al.
2012/0017268 A9 1/2012 Dispensa
2012/0020060 A1 1/2012 Myer et al.
2012/0023151 A1 1/2012 Bennett et al.
2012/0030130 A1 2/2012 Smith et al.
2012/0062370 A1 3/2012 Feldstein et al.
2012/0066608 A1 3/2012 Sundermeyer et al.
2012/0075469 A1 3/2012 Oskin et al.
2012/0081842 A1 4/2012 Ewing et al.
2012/0084184 A1 4/2012 Raleigh et al.
2012/0086552 A1 4/2012 Fast et al.
2012/0143383 A1 6/2012 Cooperrider et al.
2012/0150966 A1 6/2012 Fan et al.
2012/0154126 A1 6/2012 Cohn et al.
2012/0172027 A1 7/2012 Partheesh et al.
2012/0182245 A1 7/2012 Hutton
2012/0209951 A1 8/2012 Enns et al.
2012/0214502 A1 8/2012 Qiang
2012/0232788 A1 9/2012 Diao
2012/0240185 A1 9/2012 Kapoor et al.
2012/0242788 A1 9/2012 Chuang et al.
2012/0257061 A1 10/2012 Edwards et al.
2012/0259722 A1 10/2012 Mikurak
2012/0265892 A1 10/2012 Ma et al.
2012/0269199 A1 10/2012 Chan et al.
2012/0278877 A1 11/2012 Baum et al.
2012/0280790 A1 11/2012 Gerhardt et al.

(56) References Cited

U.S. PATENT DOCUMENTS

2012/0290740 A1 11/2012 Tewari et al.
2012/0296486 A1 11/2012 Marriam et al.
2012/0307646 A1 12/2012 Xia et al.
2012/0309354 A1 12/2012 Du
2012/0313781 A1 12/2012 Barker et al.
2012/0314901 A1 12/2012 Hanson et al.
2012/0315848 A1 12/2012 Smith et al.
2012/0324566 A1 12/2012 Baum et al.
2012/0327242 A1 12/2012 Barley et al.
2012/0331109 A1 12/2012 Baum et al.
2013/0002880 A1 1/2013 Levinson et al.
2013/0038730 A1 2/2013 Peterson et al.
2013/0038800 A1 2/2013 Yoo
2013/0047123 A1 2/2013 May et al.
2013/0057384 A1 3/2013 Morris et al.
2013/0057695 A1 3/2013 Huisking
2013/0062951 A1 3/2013 Raji et al.
2013/0073746 A1 3/2013 Singh et al.
2013/0082835 A1 4/2013 Shapiro et al.
2013/0082836 A1 4/2013 Watts
2013/0085615 A1 4/2013 Barker
2013/0086618 A1 4/2013 Klein et al.
2013/0091209 A1 4/2013 Bennett et al.
2013/0091213 A1 4/2013 Diab et al.
2013/0094538 A1 4/2013 Wang
2013/0103207 A1 4/2013 Ruff et al.
2013/0111576 A1 5/2013 Devine et al.
2013/0115972 A1 5/2013 Ziskind et al.
2013/0120131 A1 5/2013 Hicks, III
2013/0125157 A1 5/2013 Sharif-Ahmadi et al.
2013/0136102 A1 5/2013 MacWan et al.
2013/0147799 A1 6/2013 Hoguet
2013/0154822 A1 6/2013 Kumar et al.
2013/0155229 A1 6/2013 Thornton et al.
2013/0157612 A1 6/2013 Cordero et al.
2013/0162571 A1 6/2013 Tamegai
2013/0163491 A1 6/2013 Singh et al.
2013/0163757 A1 6/2013 Bellovin et al.
2013/0173797 A1 7/2013 Poirer et al.
2013/0174239 A1 7/2013 Kim et al.
2013/0183924 A1 7/2013 Saigh et al.
2013/0184874 A1 7/2013 Frader-Thompson et al.
2013/0185026 A1 7/2013 Vanker et al.
2013/0191755 A1 7/2013 Balog et al.
2013/0205016 A1 8/2013 Dupre et al.
2013/0218959 A1 8/2013 Sa et al.
2013/0222133 A1 8/2013 Schultz et al.
2013/0223279 A1 8/2013 Tinnakornsrisuphap et al.
2013/0245837 A1 9/2013 Grohman
2013/0257611 A1 10/2013 Lamb et al.
2013/0258119 A1 10/2013 Kim et al.
2013/0261821 A1 10/2013 Lu et al.
2013/0266193 A1 10/2013 Tiwari et al.
2013/0271270 A1 10/2013 Jamadagni et al.
2013/0286942 A1 10/2013 Bonar et al.
2013/0311146 A1 11/2013 Miller et al.
2013/0314542 A1 11/2013 Jackson
2013/0318443 A1 11/2013 Bachman et al.
2013/0325935 A1 12/2013 Kiley et al.
2013/0331109 A1 12/2013 Dhillon et al.
2013/0344875 A1 12/2013 Chowdhury
2013/0346921 A1 12/2013 Shiplacoff et al.
2014/0006660 A1 1/2014 Frei et al.
2014/0024361 A1 1/2014 Poon et al.
2014/0032034 A1 1/2014 Raptopoulos et al.
2014/0033136 A1 1/2014 St Clair
2014/0035726 A1 2/2014 Schoner et al.
2014/0053246 A1 2/2014 Huang et al.
2014/0068486 A1 3/2014 Sellers et al.
2014/0075464 A1 3/2014 McCrea
2014/0095630 A1 4/2014 Wohlert et al.
2014/0098247 A1 4/2014 Rao et al.
2014/0108151 A1 4/2014 Bookstaff
2014/0109130 A1 4/2014 Sugimoto et al.
2014/0112405 A1 4/2014 Jafarian et al.
2014/0136242 A1 5/2014 Weekes et al.
2014/0136847 A1 5/2014 Huang
2014/0136936 A1 5/2014 Patel et al.
2014/0140575 A1 5/2014 Wolf
2014/0143695 A1 5/2014 Sundermeyer et al.
2014/0143854 A1 5/2014 Lopez et al.
2014/0146170 A1 5/2014 Tofighbakhsh
2014/0146171 A1 5/2014 Brady et al.
2014/0153695 A1 6/2014 Yanagisawa et al.
2014/0167928 A1 6/2014 Burd et al.
2014/0176797 A1 6/2014 Silva et al.
2014/0180968 A1 6/2014 Song et al.
2014/0188290 A1 7/2014 Steinberg et al.
2014/0188729 A1 7/2014 Hong
2014/0201291 A1 7/2014 Russell
2014/0208214 A1 7/2014 Stern
2014/0218517 A1 8/2014 Kim et al.
2014/0233951 A1 8/2014 Cook
2014/0236325 A1 8/2014 Sasaki et al.
2014/0245014 A1 8/2014 Tuck et al.
2014/0245160 A1 8/2014 Bauer et al.
2014/0254896 A1 9/2014 Zhou et al.
2014/0265359 A1 9/2014 Cheng et al.
2014/0266678 A1 9/2014 Shapiro et al.
2014/0266736 A1 9/2014 Cretu-Petra
2014/0278281 A1 9/2014 Vaynriber et al.
2014/0282048 A1 9/2014 Shapiro et al.
2014/0282934 A1 9/2014 Miasnik et al.
2014/0289384 A1 9/2014 Kao et al.
2014/0289388 A1 9/2014 Ghosh et al.
2014/0293046 A1 10/2014 Ni
2014/0298467 A1 10/2014 Bhagwat et al.
2014/0316616 A1 10/2014 Kugelmass
2014/0317660 A1 10/2014 Cheung et al.
2014/0319232 A1 10/2014 Gourlay et al.
2014/0328161 A1 11/2014 Haddad et al.
2014/0340216 A1 11/2014 Puskarich
2014/0359524 A1 12/2014 Sasaki et al.
2014/0368331 A1 12/2014 Cohn et al.
2014/0369584 A1 12/2014 Fan et al.
2014/0372599 A1 12/2014 Gutt et al.
2014/0378110 A1 12/2014 Chingon et al.
2015/0009325 A1 1/2015 Kardashov
2015/0019714 A1 1/2015 Shaashua et al.
2015/0022666 A1 1/2015 Kay et al.
2015/0026796 A1 1/2015 Alan et al.
2015/0054947 A1 2/2015 Dawes
2015/0058250 A1 2/2015 Stanzione et al.
2015/0074206 A1 3/2015 Baldwin
2015/0074259 A1 3/2015 Ansari et al.
2015/0077553 A1 3/2015 Dawes
2015/0082414 A1 3/2015 Dawes
2015/0088982 A1 3/2015 Johnson et al.
2015/0097680 A1 4/2015 Fadell et al.
2015/0097949 A1 4/2015 Ure et al.
2015/0097961 A1 4/2015 Ure et al.
2015/0100167 A1 4/2015 Sloo et al.
2015/0106721 A1 4/2015 Cha et al.
2015/0130625 A1 5/2015 Tuovinen
2015/0140954 A1 5/2015 Maier et al.
2015/0142991 A1 5/2015 Zaloom
2015/0143395 A1 5/2015 Reisman
2015/0161875 A1 6/2015 Cohn et al.
2015/0170447 A1 6/2015 Buzhardt
2015/0192940 A1 7/2015 Silva et al.
2015/0193127 A1 7/2015 Chai et al.
2015/0205297 A1 7/2015 Stevens et al.
2015/0205465 A1 7/2015 Robison et al.
2015/0222601 A1 8/2015 Metz et al.
2015/0227118 A1 8/2015 Wong
2015/0256355 A1 9/2015 Pera et al.
2015/0261427 A1 9/2015 Sasaki
2015/0266577 A1 9/2015 Jones et al.
2015/0287310 A1 10/2015 Deiiuliis et al.
2015/0304804 A1 10/2015 Lotito
2015/0319006 A1 11/2015 Plummer et al.
2015/0319046 A1 11/2015 Plummer et al.
2015/0325106 A1 11/2015 Dawes et al.
2015/0331662 A1 11/2015 Lambourne

(56) References Cited

U.S. PATENT DOCUMENTS

| | | | |
|---|---|---|---|
| 2015/0334087 | A1 | 11/2015 | Dawes |
| 2015/0348554 | A1 | 12/2015 | Orr et al. |
| 2015/0350031 | A1 | 12/2015 | Burks et al. |
| 2015/0350735 | A1 | 12/2015 | Kser |
| 2015/0358359 | A1 | 12/2015 | Ghai et al. |
| 2015/0365217 | A1 | 12/2015 | Scholten et al. |
| 2015/0365933 | A1 | 12/2015 | Lee et al. |
| 2015/0371512 | A1 | 12/2015 | Bennett et al. |
| 2015/0373149 | A1 | 12/2015 | Lyons |
| 2015/0379355 | A1 | 12/2015 | Kanga et al. |
| 2016/0004820 | A1 | 1/2016 | Moore |
| 2016/0023475 | A1 | 1/2016 | Bevier et al. |
| 2016/0027290 | A1 | 1/2016 | English |
| 2016/0027295 | A1 | 1/2016 | Raji et al. |
| 2016/0036944 | A1 | 2/2016 | Kitchen |
| 2016/0037389 | A1 | 2/2016 | Tagg et al. |
| 2016/0042637 | A1 | 2/2016 | Cahill |
| 2016/0055573 | A1 | 2/2016 | Chen et al. |
| 2016/0062624 | A1 | 3/2016 | Sundermeyer et al. |
| 2016/0063642 | A1 | 3/2016 | Luciani et al. |
| 2016/0065414 | A1 | 3/2016 | Sundermeyer et al. |
| 2016/0065653 | A1 | 3/2016 | Chen et al. |
| 2016/0068264 | A1 | 3/2016 | Ganesh et al. |
| 2016/0077935 | A1 | 3/2016 | Zheng et al. |
| 2016/0080365 | A1 | 3/2016 | Baker et al. |
| 2016/0087933 | A1 | 3/2016 | Johnson et al. |
| 2016/0094421 | A1 | 3/2016 | Bali et al. |
| 2016/0100348 | A1 | 4/2016 | Cohn et al. |
| 2016/0107749 | A1 | 4/2016 | Mucci |
| 2016/0116914 | A1 | 4/2016 | Mucci |
| 2016/0127641 | A1 | 5/2016 | Gove |
| 2016/0147919 | A1 | 5/2016 | Yabe et al. |
| 2016/0150433 | A1 | 5/2016 | Bergquist et al. |
| 2016/0156941 | A9 | 6/2016 | Alao et al. |
| 2016/0161277 | A1 | 6/2016 | Park et al. |
| 2016/0164923 | A1 | 6/2016 | Dawes |
| 2016/0171853 | A1 | 6/2016 | Naidoo et al. |
| 2016/0180719 | A1 | 6/2016 | Wouhaybi et al. |
| 2016/0183073 | A1 | 6/2016 | Saito et al. |
| 2016/0187995 | A1 | 6/2016 | Rosewall |
| 2016/0189509 | A1 | 6/2016 | Malhotra et al. |
| 2016/0189524 | A1 | 6/2016 | Poder et al. |
| 2016/0189527 | A1 | 6/2016 | Peterson et al. |
| 2016/0189549 | A1 | 6/2016 | Marcus |
| 2016/0191621 | A1 | 6/2016 | Oh et al. |
| 2016/0192461 | A1 | 6/2016 | Minsky |
| 2016/0196734 | A1 | 7/2016 | Hicks, III |
| 2016/0202695 | A1 | 7/2016 | Deroos et al. |
| 2016/0209072 | A1 | 7/2016 | Golden et al. |
| 2016/0225240 | A1 | 8/2016 | Voddhi et al. |
| 2016/0226732 | A1 | 8/2016 | Kim et al. |
| 2016/0231916 | A1 | 8/2016 | Dawes |
| 2016/0234075 | A1 | 8/2016 | Sirpal et al. |
| 2016/0241633 | A1 | 8/2016 | Overby et al. |
| 2016/0260135 | A1 | 9/2016 | Zomet et al. |
| 2016/0261932 | A1 | 9/2016 | Fadell et al. |
| 2016/0266579 | A1 | 9/2016 | Chen et al. |
| 2016/0323731 | A1 | 11/2016 | Mohammed et al. |
| 2016/0363337 | A1 | 12/2016 | Steinberg et al. |
| 2016/0364089 | A1 | 12/2016 | Blackman et al. |
| 2016/0371961 | A1 | 12/2016 | Narang et al. |
| 2016/0371967 | A1 | 12/2016 | Narang et al. |
| 2016/0373453 | A1 | 12/2016 | Ruffner et al. |
| 2016/0378109 | A1 | 12/2016 | Raffa et al. |
| 2017/0004714 | A1 | 1/2017 | Rhee |
| 2017/0005818 | A1 | 1/2017 | Gould |
| 2017/0006107 | A1 | 1/2017 | Dawes et al. |
| 2017/0019644 | A1 | 1/2017 | K V et al. |
| 2017/0026440 | A1 | 1/2017 | Cockrell et al. |
| 2017/0039413 | A1 | 2/2017 | Nadler |
| 2017/0052513 | A1 | 2/2017 | Raji et al. |
| 2017/0054570 | A1 | 2/2017 | Hagins et al. |
| 2017/0054571 | A1 | 2/2017 | Kitchen et al. |
| 2017/0054594 | A1 | 2/2017 | Decenzo et al. |
| 2017/0063967 | A1 | 3/2017 | Kitchen et al. |
| 2017/0068419 | A1 | 3/2017 | Sundermeyer et al. |
| 2017/0070361 | A1 | 3/2017 | Sundermeyer et al. |
| 2017/0070563 | A1 | 3/2017 | Sundermeyer et al. |
| 2017/0078298 | A1 | 3/2017 | Vlaminck et al. |
| 2017/0092138 | A1 | 3/2017 | Trundle et al. |
| 2017/0109999 | A1 | 4/2017 | Cohn et al. |
| 2017/0111227 | A1 | 4/2017 | Papageorgiou et al. |
| 2017/0118037 | A1 | 4/2017 | Kitchen et al. |
| 2017/0124987 | A1 | 5/2017 | Kim et al. |
| 2017/0127124 | A9 | 5/2017 | Wilson et al. |
| 2017/0154507 | A1 | 6/2017 | Dawes et al. |
| 2017/0155545 | A1 | 6/2017 | Baum et al. |
| 2017/0180198 | A1 | 6/2017 | Baum et al. |
| 2017/0180306 | A1 | 6/2017 | Gutt |
| 2017/0185277 | A1 | 6/2017 | Sundermeyer et al. |
| 2017/0185278 | A1 | 6/2017 | Sundermeyer et al. |
| 2017/0185281 | A1 | 6/2017 | Park et al. |
| 2017/0187993 | A1 | 6/2017 | Martch et al. |
| 2017/0192402 | A1 | 7/2017 | Karp et al. |
| 2017/0225336 | A1 | 8/2017 | Deyle et al. |
| 2017/0227965 | A1 | 8/2017 | Decenzo et al. |
| 2017/0244573 | A1 | 8/2017 | Baum et al. |
| 2017/0255452 | A1 | 9/2017 | Barnes et al. |
| 2017/0257257 | A1 | 9/2017 | Dawes |
| 2017/0278407 | A1 | 9/2017 | Lemmey et al. |
| 2017/0279629 | A1 | 9/2017 | Raji |
| 2017/0289323 | A1 | 10/2017 | Gelvin et al. |
| 2017/0289360 | A1 | 10/2017 | Baum et al. |
| 2017/0302469 | A1 | 10/2017 | Cohn et al. |
| 2017/0303257 | A1 | 10/2017 | Yamada et al. |
| 2017/0310500 | A1 | 10/2017 | Dawes |
| 2017/0330466 | A1 | 11/2017 | Demetriades et al. |
| 2017/0331781 | A1 | 11/2017 | Gutt et al. |
| 2017/0332055 | A1 | 11/2017 | Henderson |
| 2017/0337806 | A1 | 11/2017 | Cohn et al. |
| 2018/0004377 | A1 | 1/2018 | Kitchen et al. |
| 2018/0012460 | A1 | 1/2018 | Heitz, III et al. |
| 2018/0019890 | A1 | 1/2018 | Dawes |
| 2018/0027517 | A9 | 1/2018 | Noonan |
| 2018/0045159 | A1 | 2/2018 | Patel |
| 2018/0054774 | A1 | 2/2018 | Cohn et al. |
| 2018/0063248 | A1 | 3/2018 | Dawes et al. |
| 2018/0063259 | A1 | 3/2018 | Connelly et al. |
| 2018/0069862 | A1 | 3/2018 | Cholas et al. |
| 2018/0069932 | A1 | 3/2018 | Tiwari et al. |
| 2018/0082575 | A1 | 3/2018 | El-Mankabady |
| 2018/0083831 | A1 | 3/2018 | Baum et al. |
| 2018/0092046 | A1 | 3/2018 | Egan et al. |
| 2018/0095155 | A1 | 4/2018 | Soni et al. |
| 2018/0096568 | A1 | 4/2018 | Cohn et al. |
| 2018/0107196 | A1 | 4/2018 | Bian et al. |
| 2018/0146171 | A1 | 5/2018 | Tofighbakhsh |
| 2018/0152342 | A1 | 5/2018 | Karaoguz et al. |
| 2018/0183668 | A1 | 6/2018 | Caldwell et al. |
| 2018/0191720 | A1 | 7/2018 | Dawes |
| 2018/0191741 | A1 | 7/2018 | Dawes et al. |
| 2018/0191742 | A1 | 7/2018 | Dawes |
| 2018/0191807 | A1 | 7/2018 | Dawes |
| 2018/0198688 | A1 | 7/2018 | Dawes |
| 2018/0198755 | A1 | 7/2018 | Domangue et al. |
| 2018/0198756 | A1 | 7/2018 | Dawes |
| 2018/0198788 | A1 | 7/2018 | Helen et al. |
| 2018/0198802 | A1 | 7/2018 | Dawes |
| 2018/0278701 | A1 | 9/2018 | Diem |
| 2018/0307223 | A1 | 10/2018 | Peeters et al. |
| 2018/0322759 | A1 | 11/2018 | Devdas et al. |
| 2019/0014413 | A1 | 1/2019 | Kallai et al. |
| 2019/0041547 | A1 | 2/2019 | Rolf et al. |
| 2019/0058720 | A1 | 2/2019 | Lindquist et al. |
| 2019/0073193 | A1 | 3/2019 | Krispin |
| 2019/0073534 | A1 | 3/2019 | Dvir et al. |
| 2019/0098089 | A1 | 3/2019 | Shim et al. |
| 2019/0103030 | A1 | 4/2019 | Banga et al. |
| 2019/0158304 | A1 | 5/2019 | Sundermeyer et al. |
| 2019/0176985 | A1 | 6/2019 | Mucci |
| 2019/0197256 | A1 | 6/2019 | Lehnhardt et al. |
| 2019/0204836 | A1 | 7/2019 | Rezvani |
| 2019/0239008 | A1 | 8/2019 | Lambourne |
| 2019/0245798 | A1 | 8/2019 | Short et al. |

(56) References Cited

U.S. PATENT DOCUMENTS

| | | | |
|---|---|---|---|
| 2019/0265694 | A1 | 8/2019 | Chen et al. |
| 2019/0289134 | A1 | 9/2019 | Dawes |
| 2019/0347924 | A1 | 11/2019 | Trundle et al. |
| 2019/0391545 | A1 | 12/2019 | Trundle et al. |
| 2020/0014675 | A1 | 1/2020 | Helms et al. |
| 2020/0026285 | A1 | 1/2020 | Perrone |
| 2020/0029339 | A1 | 1/2020 | Suzuki |
| 2020/0032887 | A1 | 1/2020 | McBurney et al. |
| 2020/0036635 | A1 | 1/2020 | Ohuchi |
| 2020/0076858 | A1 | 3/2020 | Apsangi et al. |
| 2020/0089378 | A1 | 3/2020 | Kitchen et al. |
| 2020/0094963 | A1 | 3/2020 | Myslinski |
| 2020/0127891 | A9 | 4/2020 | Johnson et al. |
| 2020/0137125 | A1 | 4/2020 | Patnala et al. |
| 2020/0162890 | A1 | 5/2020 | Spencer et al. |
| 2020/0186612 | A1 | 6/2020 | Saint Clair |
| 2020/0196213 | A1 | 6/2020 | Cheng et al. |
| 2020/0257721 | A1 | 8/2020 | McKinnon et al. |
| 2020/0273277 | A1 | 8/2020 | Kerning et al. |
| 2020/0279626 | A1 | 9/2020 | Ansari et al. |
| 2020/0322577 | A1 | 10/2020 | Raffa et al. |
| 2020/0328880 | A1 | 10/2020 | Bolotin et al. |
| 2020/0328887 | A1 | 10/2020 | Kostiainen et al. |
| 2020/0329136 | A1 | 10/2020 | Gerhardt et al. |
| 2020/0333780 | A1 | 10/2020 | Kerzner |
| 2020/0344309 | A1 | 10/2020 | Gutt et al. |
| 2020/0349786 | A1 | 11/2020 | Ho et al. |
| 2020/0366515 | A1 | 11/2020 | Dawes et al. |
| 2020/0380851 | A1 | 12/2020 | Farrand et al. |
| 2020/0394896 | A1 | 12/2020 | Cohn et al. |
| 2020/0409316 | A1 | 12/2020 | Raji et al. |
| 2020/0413320 | A1 | 12/2020 | Cohn et al. |
| 2021/0014312 | A1 | 1/2021 | Dawes et al. |
| 2021/0021710 | A1 | 1/2021 | Stepanian |
| 2021/0029547 | A1 | 1/2021 | Beachem et al. |
| 2021/0049895 | A1 | 2/2021 | Sundermeyer et al. |
| 2021/0053136 | A1 | 2/2021 | Rappl et al. |
| 2021/0068034 | A1 | 3/2021 | Juhasz et al. |
| 2021/0081553 | A1 | 3/2021 | Lemmey et al. |
| 2021/0099753 | A1 | 4/2021 | Connelly et al. |
| 2021/0149348 | A1 | 5/2021 | Raji et al. |
| 2021/0149466 | A1 | 5/2021 | Raji et al. |
| 2021/0152517 | A1 | 5/2021 | Dawes et al. |
| 2021/0153001 | A1 | 5/2021 | Eisner |
| 2021/0180815 | A1 | 6/2021 | Shamoon et al. |
| 2021/0191485 | A1 | 6/2021 | Raji et al. |
| 2021/0200430 | A1 | 7/2021 | Sundermeyer et al. |
| 2021/0226811 | A1 | 7/2021 | Kitchen et al. |
| 2021/0233384 | A1 | 7/2021 | Baum et al. |
| 2021/0250726 | A1 | 8/2021 | Jones |
| 2021/0326451 | A1 | 10/2021 | Nunez Di Croce |
| 2021/0335123 | A1 | 10/2021 | Trundle et al. |
| 2021/0367921 | A1 | 11/2021 | Baum et al. |
| 2021/0377230 | A1 | 12/2021 | Baum et al. |
| 2021/0383675 | A1 | 12/2021 | Cohn et al. |
| 2021/0407279 | A1 | 12/2021 | Baum et al. |
| 2022/0006779 | A1 | 1/2022 | Baum et al. |
| 2022/0021552 | A1 | 1/2022 | Ansari et al. |
| 2022/0027051 | A1 | 1/2022 | Kant et al. |
| 2022/0029994 | A1 | 1/2022 | Choyi et al. |
| 2022/0038440 | A1 | 2/2022 | Boynton et al. |
| 2022/0057917 | A1 | 2/2022 | Fulker et al. |
| 2022/0057925 | A1 | 2/2022 | Dawes |
| 2022/0060969 | A1 | 2/2022 | Cohn et al. |
| 2022/0070135 | A1 | 3/2022 | Gerald et al. |
| 2022/0070262 | A1 | 3/2022 | Kitchen et al. |
| 2022/0073052 | A1 | 3/2022 | Zhou et al. |
| 2022/0159334 | A1 | 5/2022 | Wang et al. |
| 2022/0247624 | A1 | 8/2022 | Johnson et al. |
| 2022/0415104 | A1 | 12/2022 | McLachlan et al. |
| 2023/0057193 | A1 | 2/2023 | Ansari et al. |

FOREIGN PATENT DOCUMENTS

| | | | |
|---|---|---|---|
| AU | 2011250886 | A1 | 1/2013 |
| AU | 2013284428 | A1 | 2/2015 |
| AU | 2011305163 | B2 | 12/2016 |
| AU | 2017201365 | A1 | 3/2017 |
| AU | 2017201585 | A1 | 3/2017 |
| BE | 1008939 | A6 | 10/1996 |
| CA | 2203813 | A1 | 6/1996 |
| CA | 2174482 | A1 | 10/1997 |
| CA | 2346638 | A1 | 4/2000 |
| CA | 2389958 | A1 | 3/2003 |
| CA | 2878117 | A1 | 1/2014 |
| CA | 2559842 | C | 5/2014 |
| CA | 2992429 | A1 | 12/2016 |
| CA | 2976682 | A1 | 2/2018 |
| CA | 2976802 | A1 | 2/2018 |
| CN | 1599999 | A | 3/2005 |
| CN | 102834818 | A | 12/2012 |
| CN | 102985915 | A | 3/2013 |
| DE | 102004027893 | A1 | 1/2006 |
| EP | 0295146 | A2 | 12/1988 |
| EP | 0308046 | A2 | 3/1989 |
| EP | 0591585 | A1 | 4/1994 |
| EP | 1117214 | A2 | 7/2001 |
| EP | 1119837 | A1 | 8/2001 |
| EP | 0978111 | | 11/2001 |
| EP | 1738540 | A2 | 1/2007 |
| EP | 1881716 | A1 | 1/2008 |
| EP | 2112784 | A1 | 10/2009 |
| EP | 2188794 | A1 | 5/2010 |
| EP | 2191351 | A1 | 6/2010 |
| EP | 2327063 | A1 | 6/2011 |
| EP | 2483788 | A1 | 8/2012 |
| EP | 2569712 | A1 | 3/2013 |
| EP | 2619686 | A1 | 7/2013 |
| EP | 2868039 | A2 | 5/2015 |
| EP | 3031206 | A2 | 6/2016 |
| EP | 3285238 | A2 | 2/2018 |
| EP | 3308222 | A1 | 4/2018 |
| FR | 2584217 | A1 | 1/1987 |
| FR | 2661023 | A1 | 10/1991 |
| FR | 2793334 | A1 | 11/2000 |
| GB | 2222288 | A | 2/1990 |
| GB | 2273593 | A | 6/1994 |
| GB | 2286423 | A | 8/1995 |
| GB | 2291554 | A | 1/1996 |
| GB | 2319373 | A | 5/1998 |
| GB | 2320644 | A | 6/1998 |
| GB | 2324630 | A | 10/1998 |
| GB | 2325548 | A | 11/1998 |
| GB | 2335523 | A | 9/1999 |
| GB | 2349293 | A | 10/2000 |
| GB | 2370400 | A | 6/2002 |
| GB | 2375449 | A | 11/2002 |
| GB | 2442628 | A | 4/2008 |
| GB | 2442633 | A | 4/2008 |
| GB | 2442640 | A | 4/2008 |
| GB | 2428821 | B | 6/2008 |
| IN | 45/2015 | | 11/2015 |
| IN | 04/2016 | | 1/2016 |
| JP | 63-033088 | A | 2/1988 |
| JP | 05-167712 | A | 7/1993 |
| JP | 06-339183 | A | 12/1993 |
| JP | 08-227491 | | 9/1996 |
| JP | 10-004451 | A | 1/1998 |
| JP | 10-108156 | A | 4/1998 |
| JP | 11-234277 | A | 8/1999 |
| JP | 2000-006343 | A | 1/2000 |
| JP | 2000-023146 | A | 1/2000 |
| JP | 2000-278671 | A | 10/2000 |
| JP | 2001-006088 | A | 1/2001 |
| JP | 2001-006343 | A | 1/2001 |
| JP | 2001-069209 | A | 3/2001 |
| JP | 2002-055895 | | 2/2002 |
| JP | 2002-185629 | | 6/2002 |
| JP | 2003-085258 | A | 3/2003 |
| JP | 2003-141659 | A | 5/2003 |
| JP | 2003-281647 | A | 10/2003 |

(56) References Cited

FOREIGN PATENT DOCUMENTS

| | | | |
|---|---|---|---|
| JP | 2004-192659 | A | 7/2004 |
| JP | 2006-094394 | A | 4/2006 |
| JP | 2007-529826 | A | 10/2007 |
| JP | 2009-213107 | A | 9/2009 |
| JP | 2010-140091 | A | 6/2010 |
| KR | 10-2005-0051577 | A | 6/2005 |
| KR | 10-2005-0052826 | A | 6/2005 |
| KR | 10-2006-0021605 | A | 3/2006 |
| KR | 10-0771941 | B1 | 10/2007 |
| NO | 89/11187 | A1 | 11/1989 |
| NO | 02/11444 | A1 | 2/2002 |
| TW | 1239176 | B | 9/2005 |
| TW | 201101243 | A | 1/2011 |
| TW | 201102976 | A | 1/2011 |
| TW | 201102978 | A | 1/2011 |
| TW | 1340934 | B | 4/2011 |
| TW | 201117141 | A | 5/2011 |
| TW | 1480839 | B | 4/2015 |
| TW | 1480840 | B | 4/2015 |
| TW | 1509579 | B | 11/2015 |
| TW | 1517106 | B | 1/2016 |
| WO | 89/07855 | A1 | 8/1989 |
| WO | 94/03881 | A1 | 2/1994 |
| WO | 95/13944 | A1 | 5/1995 |
| WO | 96/36301 | A1 | 11/1996 |
| WO | 97/13230 | A2 | 4/1997 |
| WO | 98/25243 | A1 | 6/1998 |
| WO | 98/49663 | A1 | 11/1998 |
| WO | 98/52343 | A1 | 11/1998 |
| WO | 98/59256 | A2 | 12/1998 |
| WO | 99/34339 | A2 | 7/1999 |
| WO | 00/21053 | A1 | 4/2000 |
| WO | 00/36812 | A1 | 6/2000 |
| WO | 00/72598 | A1 | 11/2000 |
| WO | 01/11586 | A1 | 2/2001 |
| WO | 01/52478 | A2 | 7/2001 |
| WO | 01/71489 | A1 | 9/2001 |
| WO | 01/86622 | A1 | 11/2001 |
| WO | 01/99078 | A2 | 12/2001 |
| WO | 02/21300 | A1 | 3/2002 |
| WO | 02/97584 | A2 | 12/2002 |
| WO | 2002/100083 | | 12/2002 |
| WO | 2003/026305 | A1 | 3/2003 |
| WO | 03/40839 | A1 | 5/2003 |
| WO | 03/49379 | A1 | 6/2003 |
| WO | 03049379 | A1 | 6/2003 |
| WO | 03/98908 | A1 | 11/2003 |
| WO | 2004/004222 | A1 | 1/2004 |
| WO | 2004/077307 | A1 | 9/2004 |
| WO | 2004/098127 | A1 | 11/2004 |
| WO | 2004/107710 | A1 | 12/2004 |
| WO | 2005/047990 | A2 | 5/2005 |
| WO | 2005/091218 | A2 | 9/2005 |
| WO | 2006/122487 | A1 | 11/2006 |
| WO | 2007/038872 | A1 | 4/2007 |
| WO | 2007/124453 | A2 | 11/2007 |
| WO | 2008/056320 | A1 | 5/2008 |
| WO | 2009/006670 | A1 | 1/2009 |
| WO | 2009/023647 | A1 | 2/2009 |
| WO | 2009/029590 | A1 | 3/2009 |
| WO | 2009/029597 | A1 | 3/2009 |
| WO | 2009/064795 | A1 | 5/2009 |
| WO | 2009/145747 | A1 | 12/2009 |
| WO | 2010/019624 | A1 | 2/2010 |
| WO | 2010/025468 | A1 | 3/2010 |
| WO | 2010/127009 | A1 | 11/2010 |
| WO | 2010/127194 | A2 | 11/2010 |
| WO | 2010/127200 | A1 | 11/2010 |
| WO | 2010/127203 | A1 | 11/2010 |
| WO | 2011/038409 | A1 | 3/2011 |
| WO | 2011/063354 | A1 | 5/2011 |
| WO | 2011/143273 | A1 | 11/2011 |
| WO | 2012/040653 | A1 | 3/2012 |
| WO | 2014/004911 | A2 | 1/2014 |
| WO | 2015/021469 | A2 | 2/2015 |
| WO | 2015/134520 | A1 | 9/2015 |
| WO | 2015/176775 | A1 | 11/2015 |
| WO | 2016/201033 | A1 | 12/2016 |
| ZA | 201302668 | | 6/2014 |

OTHER PUBLICATIONS

U.S. Appl. No. 16/059,833, filed Aug. 9, 2018.
U.S. Appl. No. 14/852,822, filed Sep. 14, 2015.
U.S. Appl. No. 12/971,282, filed Dec. 17, 2010.
US Patent Application filed on Mar. 22, 2021, entitled "Premises Management Configuration and Control", U.S. Appl. No. 17/208,866.
US Patent Application filed on Apr. 4, 2022, entitled "Control System User Interface", U.S. Appl. No. 17/712,911.
US Patent Application filed on Apr. 6, 2022, entitled "Hardware Configurable Security, Monitoring and Automation Controller Having Modular Communication Protocol Interfaces", U.S. Appl. No. 17/714,499.
US Patent Application filed on Apr. 8, 2021, entitled "System For Data Routing In Networks", U.S. Appl. No. 17/301,605.
US Patent Application filed on Apr. 14, 2022, entitled "Premises Management Configuration and Control", U.S. Appl. No. 17/659,259.
US Patent Application filed on Apr. 14, 2022, entitled "Premises System Automation", 17/721, 192.
US Patent Application filed on Apr. 17, 2020, entitled "Method and System for Providing Alternate Network Access", U.S. Appl. No. 16/852,072.
US Patent Application filed on Apr. 17, 2020, entitled "Networked Touchscreen With Integrated Interfaces", U.S. Appl. No. 16/852,058.
US Patent Application filed on Apr. 22, 2022, entitled "Communication Protocols in Integrated Systems", U.S. Appl. No. 17/727,470.
US Patent Application filed on Apr. 23, 2019, entitled "Control System User Interface", U.S. Appl. No. 16/391,625.
US Patent Application filed on Apr. 26, 2019, entitled "Custom Content for Premises Management", U.S. Appl. No. 16/396,368.
US patent application filed on May 2, 2018, entitled "Automation System With Mobile Interface", U.S. Appl. No. 15/969,514.
US Patent Application filed on May 4, 2022, entitled "Premises Management Configuration and Control", U.S. Appl. No. 17/736,408.
US Patent Application filed on May 10, 2021, entitled "Management of a Security System at a Premises", U.S. Appl. No. 17/316,402.
US Patent Application filed on May 11, 2020, entitled "Control System User Interface", U.S. Appl. No. 16/871,151.
US Patent Application filed on May 12, 2020, entitled "IP Device Discovery Systems and Methods", U.S. Appl. No. 15/930,029.
US Patent Application filed on May 16, 2022, entitled "Automation System With Mobile Interface", U.S. Appl. No. 17/744,858.
US Patent Application filed on May 19, 2020, entitled "User Interface in a Premises Network", U.S. Appl. No. 16/878,099.
US Patent Application filed on May 23, 2018, entitled "Networked Touchscreen With Integrated Interfaces", U.S. Appl. No. 15/987,638.
US Patent Application filed on May 23, 2022, entitled "Premise Management Systems and Methods", U.S. Appl. No. 17/664,524.
US Patent Application filed on May 26, 2020, entitled "Premises Management Configuration and Control", U.S. Appl. No. 16/882,876.
US Patent Application filed on Jun. 1, 2022, entitled "Integrated Cloud System for Premises Automation", U.S. Appl. No. 17/804,941.
US Patent Application filed on Jun. 8, 2022, entitled "Methods and Systems for Data Communication", U.S. Appl. No. 17/835,394.
US Patent Application filed on Jun. 9, 2021, entitled "Premises Management Configuration and Control", U.S. Appl. No. 17/343,315.
US Patent Application filed on Jun. 10, 2020, entitled "Method and System for Communicating With and Controlling an Alarm System From a Remote Server", U.S. Appl. No. 16/898,146.
US Patent Application filed on Jun. 10, 2022, entitled "Media Content Management", U.S. Appl. No. 17/838,046.
US Patent Application filed on Jun. 10, 2022, entitled "Method, System and Apparatus for Automated Reporting of Account and Sensor Zone Information to a Central Station", U.S. Appl. No. 17/806,341.
US Patent Application filed on Jun. 18, 2021, entitled "Controlling Data Routing Among Networks", U.S. Appl. No. 17/304,342.

(56) References Cited

OTHER PUBLICATIONS

US Patent Application filed on Jun. 22, 2022, entitled "Activation of Gateway Device", U.S. Appl. No. 17/808,146.
US Patent Application filed on Jun. 22, 2022, entitled "Automation System User Interface With Three-Dimensional Display", U.S. Appl. No. 17/808,275.
US Patent Application filed on Jun. 22, 2022, entitled "Communication Protocols in Integrated Systems", U.S. Appl. No. 17/808,118.
US Patent Application filed on Jun. 24, 2020, entitled "Method and System for Processing Security Event Data", U.S. Appl. No. 16/910,967.
US Patent Application filed on Jun. 27, 2018, entitled "Activation of Gateway Device", U.S. Appl. No. 16/020,499.
US Patent Application filed on Jul. 1, 2022, entitled "Forming a Security Network Including Integrated Security System Components", U.S. Appl. No. 17/856,448.
US Patent Application filed on Jul. 2, 2019, entitled "Communication Protocols in Integrated Systems", U.S. Appl. No. 16/460,712.
US Patent Application filed on Jul. 3, 2018, entitled "WIFI-to-Serial Encapsulation In Systems", U.S. Appl. No. 16/026,703.
US Patent Application filed on Jul. 9, 2020, entitled "Automation System With Mobile Interface", U.S. Appl. No. 16/925,026.
US Patent Application filed on Jul. 12, 2018, entitled "Integrated Security System with Parallel Processing Architecture", U.S. Appl. No. 16/034,132.
US Patent Application filed on Jul. 20, 2018, entitled "Cross-Client Sensor User Interface in an Integrated Security Network", U.S. Appl. No. 16/041,291.
US Patent Application filed on Jul. 26, 2019, entitled "Device Integration Framework", U.S. Appl. No. 16/522,949.
US Patent Application filed on Jul. 26, 2021, entitled "Notification of Event Subsequent to Communication Failure With Security System", U.S. Appl. No. 17/443,427.
US Patent Application filed on Jul. 28, 2016, entitled "Method and System for Automatically Providing Alternate Network Access for Telecommunications", U.S. Appl. No. 15/222,416.
US Patent Application filed on Jul. 30, 2021, entitled "Gateway Integrated With Premises Security System", U.S. Appl. No. 17/390,222.
US Patent Application filed on Aug. 3, 2022, entitled "Premises Management Networking", U.S. Appl. No. 17/817,210.
US Patent Application filed on Aug. 8, 2016, entitled "Security, Monitoring and Automation Controller Access and Use of Legacy Security Control Panel Information", U.S. Appl. No. 15/231,273.
US Patent Application filed on Aug. 9, 2016, entitled "Controller and Interface for Home Security, Monitoring and Automation Having Customizable Audio Alerts for Sma Events", U.S. Appl. No. 15/232,135.
US Patent Application filed on Aug. 9, 2018, entitled "Method and System for Processing Security Event Data", U.S. Appl. No. 16/059,833.
US Patent Application filed on Aug. 10, 2021, entitled "Media Content Management", U.S. Appl. No. 17/398,939.
US Patent Application filed on Aug. 11, 2022, entitled "Security Network Integrating Security System and Network Devices", U.S. Appl. No. 17/819,083.
US Patent Application filed on Aug. 16, 2021, entitled "Control System User Interface", U.S. Appl. No. 17/403,526.
United States Patent and Trademark Office—Before the Patent Trial and Appeal Board, Alarm.com (U.S. Pat. No. 8,350,69461) (inventors Stephen Scott Trundle & Alison Jane Slavin) V iControl Networks, Inc. (U.S. Appl. No. 13/311,365) (Inventors. Poul j. Dawes, Jim Fulker, Carolyn Wales, Reza Raji, and Gerald Gutt), Patent Interference 106,001 (HH6) (Technology Center 24000), Mar. 31, 2015.
US Patent Application filed on Oct. 7, 2022, entitled "Security System With Networked Touchscreen", U.S. Appl. No. 18/045,018.
Fujii et al., "Community security platform for individually maintained home computers: The Vigilante Network Project", Proceedings of the 21st IEEE Instrumentation and Measurement Technology Conference, 2004, vol. 2, pp. 891-894.
Kobayashi et al., "Creating worldwide community safety with present technology and privacy protection: The e-JIKEI Network project", Procedia—Social and Behavioral Sciences, 2010, vol. 2, pp. 6-13.
Non-Final Rejection Mailed on Jan. 20, 2023 for U.S. Appl. No. 17/712,911, 8 pages.
Prashyanusorn et al., "Sustainable tourism using security cameras with privacy protecting ability", Journal of Information Security, 2010, vol. 1, pp. 68-73.
US Patent Application filed on Jan. 5, 2023, entitled "Systems and Methods for Device Communication", U.S. Appl. No. 18/150,316.
US Patent Application filed on Jan. 13, 2023, entitled "Communication Protocols in Integrated Systems", U.S. Appl. No. 18/154,590.
Wang et al, "A Large Scale Video Surveillance System with Heterogeneous Information Fusion and Visualization for Wide Area Monitoring," 2012 Eighth International Conference on Intelligent Information Hiding and Multimedia Signal Processing, Piraeus, 2012, pp. 178-181.
Wilkinson, S: "Logitech Harmony One Universal Remote" Ultimate AV magazine May 2008 (May 2008), XP002597782 Retrieved from the Internet : Original URL: http://www.ultimateavmag.com/remotecontrols/508logi) [retrieved on Aug. 23, 2010] the whole document; Updated URL: https://www.soundandvision.com/content/logitech-harmony-one-universal-remote, Retrieved from internet on Jan. 11, 2018.
Windows Telecom Dictionary, Mar. 2005, pp. 937-938.
Wireless, Battery-Powered Smoke Detectors, Brochure, SafeNight Technology, Inc. Roanoke, VA, 1995.
WLS906 Photoelectric Smoke Alarm, Data Sheet, DSC Security Products, Ontario, Canada, Jan. 1998.
X10—ActiveHome, Home Automation Made Easy [retrieved on Nov. 4, 2003], 3 pages.
Yanni Zhai et al., Design of Smart Home Remote Monitoring System Based on Embedded System, 2011 IEEE 2nd International Conference on Computing, Control and Industrial Engineering, vol. 2, pp. 41-44.
K. Lee, D. Murray, D. Hughes and W. Joosen, "Extending sensor networks into the Cloud using Amazon Web Services," 2010 IEEE International Conference on Networked Embedded Systems for Enterprise Applications, 2010.
Lagotek Wireless Home Automation System, May 2006 [retrieved on Aug. 22, 2012].
Network Working Group, Request for Comments H.Schulzrinne Apr. 1998.
Non-Final Office Action mailed Apr. 4, 2013 for U.S. Appl. No. 12/197,931, filed Aug. 25, 2008.
Non-Final Office Action mailed Mar. 4, 2013 for U.S. Appl. No. 13/400,477, filed Feb. 20, 2012.
Non-Final Office Action mailed May 5, 2010 for U.S. Appl. No. 12/189,780, filed Aug. 11, 2008.
Non-Final Office Action mailed May 5, 2010 for U.S. Appl. No. 12/189,785, filed Aug. 11, 2008.
Non-Final Office Action mailed Feb. 7, 2012 for U.S. Appl. No. 12/637,671, filed Dec. 14, 2009.
Non-Final Office Action mailed Feb. 7, 2013 for U.S. Appl. No. 12/970,313, filed Dec. 16, 2010.
Non-Final Office Action mailed Feb. 8, 2012 for U.S. Appl. No. 12/630,092, filed Dec. 3, 2009.
Non-Final Office Action mailed Apr. 9, 2012 for U.S. Appl. No. 12/771,624, filed Apr. 30, 2010.
Non-Final Office Action mailed Dec. 9, 2008 for U.S. Appl. No. 11/084,232, filed Mar. 16, 2005.
Non-Final Office Action mailed Aug. 10, 2012 for U.S. Appl. No. 12/771,471, filed Apr. 30, 2010.
Non-Final Office Action mailed Oct. 11, 2012 for U.S. Appl. No. 12/019,568, filed Jan. 24, 2008.
Non-Final Office Action mailed Apr. 12, 2012 for U.S. Appl. No. 12/770,365, filed Apr. 29, 2010.
Non-Final Office Action mailed Jul. 12, 2012 for U.S. Appl. No. 12/691,992, filed Jan. 22, 2010.
Non-Final Office Action mailed Oct. 12, 2012 for U.S. Appl. No. 12/630,092, filed Dec. 3, 2009.

(56) References Cited

OTHER PUBLICATIONS

Non-Final Office Action mailed Sep. 12, 2012 for U.S. Appl. No. 12/952,080, filed Nov. 22, 2010.
Non-Final Office Action mailed Jul. 13, 2010 for U.S. Appl. No. 12/019,568, filed Jan. 24, 2008.
Non-Final Office Action mailed Nov. 14, 2012 for U.S. Appl. No. 13/531,757, filed Jun. 25, 2012.
Non-Final Office Action mailed Sep. 14, 2010 for U.S. Appl. No. 11/084,232, filed Mar. 16, 2005.
Non-Final Office Action mailed Sep. 16, 2011 for U.S. Appl. No. 12/539,537, filed Aug. 11, 2009.
Non-Final Office Action mailed Sep. 17, 2012 for U.S. Appl. No. 12/189,780, filed Aug. 11, 2008.
Non-Final Office Action mailed Aug. 18, 2011 for U.S. Appl. No. 12/197,958, filed Aug. 25, 2008.
Non-Final Office Action mailed Feb. 18, 2011 for U.S. Appl. No. 12/630,092, filed Dec. 3, 2009.
Non-Final Office Action mailed Jan. 18, 2012 for U.S. Appl. No. 12/771,071, filed Apr. 30, 2010.
Non-Final Office Action mailed Dec. 22, 2010 for U.S. Appl. No. 12/197,931, filed Aug. 25, 2008.
Non-Final Office Action mailed Jul. 22, 2013 for U.S. Appl. No. 12/630,092, filed Dec. 3, 2009.
Non-Final Office Action mailed Jan. 26, 2012 for U.S. Appl. No. 12/019,568, filed Jan. 24, 2008.
Non-Final Office Action mailed Nov. 26, 2010 for U.S. Appl. No. 12/197,958, filed Aug. 25, 2008.
Non-Final Office Action mailed Jun. 27, 2013 for U.S. Appl. No. 12/019,568, filed Jan. 24, 2008.
Non-Final Office Action mailed Dec. 30, 2009 for U.S. Appl. No. 11/084,232, filed Mar. 16, 2005.
Non-Final Office Action mailed May 30, 2008 for U.S. Appl. No. 11/084,232, filed Mar. 16, 2005.
Non-Final Office Action mailed Apr. 13, 2010 for U.S. Appl. No. 11/761,745, filed Jun. 12, 2007.
Non-Final Office Action mailed Feb. 21, 2013 for U.S. Appl. No. 12/771,372, filed Apr. 30, 2010.
Non-Final Office Action mailed Jan. 5, 2010 for U.S. Appl. No. 12/019,554, filed Jan. 24, 2008.
Non-Final Office Action mailed May 23, 2013 for U.S. Appl. No. 13/104,932, filed May 10, 2011.
Non-Final Office Action mailed May 23, 2013 for U.S. Appl. No. 13/104,936, filed May 10, 2011.
Notice of Allowance mailed May 14, 2013 for U.S. Appl. No. 12/637,671, filed Dec. 14, 2009.
Notice of Allowance mailed Oct. 25, 2012 for U.S. Appl. No. 11/084,232, filed Mar. 16, 2005.
Oxford Dictionary, Definition of "application", 2021, 2 pages (Year: 2021).
PCT Application filed on Jun. 9, 2016, entitled "Virtual Device Systems and Methods", PCT/US2016/036674.
PCT Application filed on Jun. 29, 2016, entitled "Integrated Cloud System for Premises Automation", PCT/US2016/040046.
PCT Application filed on Jun. 30, 2016, entitled "Integrated Cloud System with Lightweight Gateway for Premises Automation", PCT/US2016/040451.
PCT Application filed on Jul. 7, 2016, entitled "Automation System User Interface with Three-Dimensional Display", PCT/US2016/041353.
PCT Application filed on Aug. 16, 2016, entitled "Automation System User Interface", PCT/US2016/047172.
PCT Application filed on Aug. 17, 2016, entitled "Automation System User Interface", PCT/US2016/047262.
PCT Application filed on Oct. 13, 2016, entitled "Coordinated Control of Connected Devices in a Premise", PCT/US2016/056842.
PCT Application filed on Nov. 17, 2016, entitled "Mobile Premises Automation Platform", PCT/US2016/062519.
US Patent Application filed on Aug. 21, 2018, entitled "Premises System Management Using Status Signal". U.S. Appl. No. 16/107,568.
US Patent Application filed on Aug. 23, 2019, entitled "Premises System Management Using Status Signal", U.S. Appl. No. 16/549,837.
US Patent Application filed on Aug. 23, 2021, entitled "Method and System for Providing Alternate Network Access", U.S. Appl. No. 17/409,528.
US Patent Application filed on Aug. 26, 2020, entitled "Automation System User Interface With Three-Dimensional Display", U.S. Appl. No. 17/003,550.
US Patent Application filed on Aug. 31, 2021, entitled "Networked Touchscreen With Integrated Interfaces", U.S. Appl. No. 17/463,267.
US Patent Application filed on Sep. 6, 2018, entitled "Takeover of Security Network", U.S. Appl. No. 16/123,695.
US Patent Application filed on Sep. 7, 2021, entitled "Gateway Registry Methods and Systems", U.S. Appl. No. 17/468,188.
US Patent Application filed on Sep. 8, 2021, entitled "User Interface in a Premises Network", U.S. Appl. No. 17/469,417.
US Patent Application filed on Sep. 9, 2021, entitled "Premises System Management Using Status Signal" U.S. Appl. No. 17/470,732.
US Patent Application filed on Sep. 10, 2020, entitled "Security System With Networked Touchscreen", U.S. Appl. No. 17/017,519.
US Patent Application filed on Sep. 11, 2020, entitled "Management of Applications for a Device Located at a Premises", U.S. Appl. No. 17/018,901.
US Patent Application filed on Sep. 17, 2018, entitled "Integrated Security System With Parallel Processing Architecture", U.S. Appl. No. 16/133,135.
US Patent Application filed on Sep. 27, 2019, entitled "Control System User Interface", U.S. Appl. No. 16/585,481.
US Patent Application filed on Sep. 28, 2018, entitled "Control System User Interface", U.S. Appl. No. 16/146,715.
US Patent Application filed on Sep. 28, 2018, entitled "Forming a Security Network Including Integrated Security System Components and Network Devices", U.S. Appl. No. 16/147,044.
US Patent Application filed on Sep. 11, 2018, entitled "Premises Management Networking", U.S. Appl. No. 16/128,089.
US Patent Application filed on Oct. 1, 2018, entitled "Integrated Security System With Parallel Processing Architecture", U.S. Appl. No. 16/148,387.
US Patent Application filed on Oct. 1, 2018, entitled "Integrated Security System with Parallel Processing Architecture", U.S. Appl. No. 16/148,411.
US Patent Application filed on Oct. 1, 2018, entitled "User Interface in a Premises Network", U.S. Appl. No. 16/148,572.
US Patent Application filed on Oct. 3, 2018, entitled "Activation of a Home Automation Controller", U.S. Appl. No. 16/150,973.
US Patent Application filed on Oct. 8, 2020, entitled "Communication Protocols in Integrated Systems", U.S. Appl. No. 17/065,841.
US Patent Application filed on Oct. 10, 2018, entitled "Method and System for Providing Alternate Network Access", U.S. Appl. No. 16/156,448.
US Patent Application filed on Oct. 12, 2020, entitled "Integrated Security System With Paralle Processing Architecture", U.S. Appl. No. 17/068,584.
US Patent Application filed on Oct. 13, 2017, entitled "Notification of Event Subsequent to Communication Failure With Security System", U.S. Appl. No. 15/783,858.
US Patent Application filed on Oct. 18, 2018, entitled "Generating Risk Profile Using Data of Home Monitoring And Security System", U.S. Appl. No. 16/164,114.
US Patent Application filed on Oct. 18, 2019, entitled "Wifi-To-Serial Encapsulation in Systems", U.S. Appl. No. 16/656,874.
US Patent Application filed on Oct. 25, 2021, entitled "Forming a Security Network Including Integrated Security System Components and Network Devices", U.S. Appl. No. 17/510,022.
US Patent Application filed on Oct. 27, 2017, entitled "Security System With Networked Touchscreen", U.S. Appl. No. 15/796,421.
US Patent Application filed on Nov. 10, 2020, entitled "Integrated Cloud System for Premises Automation", U.S. Appl. No. 17/094,120.
US Patent Application filed on Nov. 15, 2021, entitled "Communication Protocols in Integrated Systems", U.S. Appl. No. 17/526,915.
US Patent Application filed on Nov. 15, 2021, entitled "Integrated Cloud System With Lightweight Gateway for Premises Automation", U.S. Appl. No. 17/455,005.

(56) References Cited

OTHER PUBLICATIONS

US Patent Application filed on Nov. 19, 2019, entitled "Integrated Cloud System With Lightweight Gateway for Premises Automation", U.S. Appl. No. 16/688,717.
US Patent Application filed on Nov. 23, 2021, entitled "Security, Monitoring and Automation Controller Access and Use of Legacy Security Control Panel Information", U.S. Appl. No. 17/534,088.
US Patent Application filed on Nov. 25, 2020, entitled "Premises Management Networking", U.S. Appl. No. 17/105,235.
US Patent Application filed on Nov. 26, 2019, entitled "Communication Protocols Over Internet Protocol (IP) Networks", U.S. Appl. No. 16/696,657.
US Patent Application filed on Nov. 28, 2017, entitled "Forming a Security Network Including Integrated Security System Components", U.S. Appl. No. 15/824,503.
US Patent Application filed on Nov. 29, 2018, entitled "Premise Management Systems And Methods", U.S. Appl. No. 16/204,442.
US Patent Application filed on Nov. 30, 2017, entitled "Controller and Interface for Home Security, Monitoring and Automation Having Customizable Audio Alerts for SMA Events", U.S. Appl. No. 15/828,030.
US Patent Application filed on Dec. 3, 2021, entitled "Communication Protocols in Integrated Systems", U.S. Appl. No. 17/542,302.
US Patent Application filed on Dec. 3, 2021, entitled "Control System User Interface", U.S. Appl. No. 17/457,463.
US Patent Application filed on Dec. 3, 2021, entitled "Method and System for Managing Communication Connectivity", U.S. Appl. No. 17/542,310.
US Patent Application filed on Dec. 9, 2020, entitled "Integrated Security System With Parallel Processing Architecture", U.S. Appl. No. 17/115,936.
US Patent Application filed on Dec. 14, 2018, entitled "Communication Protocols Over Internet Protocol (IP) Networks", U.S. Appl. No. 16/221,299.
US Patent Application filed on Dec. 17, 2021, entitled "Cross-Client Sensor User Interface in an Integrated Security Network", U.S. Appl. No. 17/644,935.
US Patent Application filed on Dec. 23, 2021, entitled "Defining and Implementing Sensor Triggered Response Rules", U.S. Appl. No. 17/645,889.
US Patent Application filed on Dec. 27, 2018, entitled "Communication Protocols in Integrated Systems", U.S. Appl. No. 16/233,913.
US Patent Application filed on Dec. 27, 2019, entitled "Premises Management Systems", U.S. Appl. No. 16/728,608.
US Patent Application filed on Aug. 9, 2018, entitled "Method and Systems for Processing Security Event Data", U.S. Appl. No. 16/059,833.
Valtchev, D., and I. Frankov. "Service gateway architecture for a smart home." Communications Magazine, IEEE 40.4 (2002): 126-132.
Visitalk, Communication with Vision, http://www.visitalk.jimbo.com; website accessed Jan. 10, 2018.
Requirement for Restriction/Election mailed Jan. 22, 2013 for U.S. Appl. No. 13/104,932, filed May 10, 2011.
Requirement for Restriction/Election mailed Jan. 22, 2013 for U.S. Appl. No. 13/104,936, filed May 10, 2011.
Requirement for Restriction/Election mailed Oct. 24, 2012 for U.S. Appl. No. 12/750,470, filed Mar. 30, 2010.
Security for the Future, Introducing 5804B0—Advanced two-way wireless remote technology, Advertisement, ADEMCO Group, Syosset, NY, circa 1997.
Shang, Wei-Lai, "Study on Application Embedded Intelligent Area System", Journal of Anyang Institute of Technology, Dec. 2010, vol. 9, No. 6, pp. 56-57 and 65.
South African Patent App. No. 2013/02668, corresponds to WO2012/040653.
Supplemental European Search Report for Application No. EP05725743.8 mailed on Sep. 14, 2010, 2 pages.
Supplementary European Search Report for Application No. EP10819658, mailed on Mar. 10, 2015, 2 pages.
Supplementary European Search Report for Application No. EP11827671, mailed on Mar. 10, 2015, 2 pages.
Supplementary Partial European Search Report for Application No. EP09807196, mailed on Nov. 17, 2014, 5 pages.
Supplementary European Search Report for Application No. EP2191351, mailed on Jun. 23, 2014, 2 pages.
Supplementary Non-Final Office Action mailed Oct. 28, 2010 for U.S. Appl. No. 12/630,092, filed Dec. 3, 2009.
Topalis E., et al., "A Generic Network Management Architecture Targeted to Support Home Automation Networks and Home Internet Connectivity, Consumer Electronics, IEEE Transactions," 2000, vol. 46 (1), pp. 44-51.
United States Patent and Trademark Office—Before the Patent Trial and Appeal Board, Alarm.com (U.S. Pat. No. 8,350,694B1) (inventors Stephen Scott Trundle & Alison Jane Slavin) V iControl Networks, Inc. (U.S. Appl. No. 13/311,365) (Inventors. Poul j. Dawes, Jim Fulker, Carolyn Wales, Reza Raji, And Gerald Gutt), Patent Interference 106,001 (HHB) (Technology Center 24000), Mar. 31, 2015.
US Patent Application filed on Jan. 3, 2019, entitled "Methods and Systems for Data Communication", U.S. Appl. No. 16/239,114.
US Patent Application filed on Jan. 11, 2021, entitled "Premise Management Systems and Methods", U.S. Appl. No. 17/145,773.
US Patent Application filed on Jan. 14, 2022, entitled "Mobile Premises Automation Platform", U.S. Appl. No. 17/576,336.
US Patent Application filed on Jan. 22, 2019, entitled "Data Model for Home Automation", U.S. Appl. No. 16/254,535.
US Patent Application filed on Jan. 22, 2019, entitled "Premises System Automation", U.S. Appl. No. 16/254,480.
US Patent Application filed on Jan. 23, 2020, entitled "Forming a Security Network Including Integrated Security System Components and Network Dev", U.S. Appl. No. 16/750,976.
US Patent Application filed on Jan. 25, 2019, entitled Communication Protocols in Integrated Systems, U.S. Appl. No. 16/257,706.
US Patent Application filed on Jan. 28, 2019, entitled "Automation System User Interface With Three-Dimensional Display", U.S. Appl. No. 16/258,858.
US Patent Application filed on Feb. 6, 2020, entitled "Activation of Gateway FDevice", U.S. Appl. No. 16/784,159.
US Patent Application filed on Feb. 8, 2022, entitled "Server-Based Notification of Alarm Event Subsequent to Communication Failure With Armed Security System", U.S. Appl. No. 17/650,324.
US Patent Application filed on Feb. 9, 2021, entitled "Premises Management Networking", U.S. Appl. No. 17/171,398.
US Patent Application filed on Mar. 2, 2017, entitled "Generating Risk Profile Using Data of Home Monitoring and Security System", U.S. Appl. No. 15/447,982.
US Patent Application filed on Mar. 2, 2020, entitled "Communication Protocols in Integrated Systems", U.S. Appl. No. 16/807,100.
US Patent Application filed on Mar. 2, 2020, entitled "Coordinated Control of Connected Devices in a Premise", U.S. Appl. No. 16/807,028.
US Patent Application filed on Mar. 7, 2014, entitled "Activation of Gateway Device", U.S. Appl. No. 14/201,162.
US Patent Application filed on Mar. 7, 2014, entitled "Communication Protocols in Integrated Systems", U.S. Appl. No. 14/200,921.
US Patent Application filed on Mar. 7, 2014, entitled "Device Integration Framework", U.S. Appl. No. 14/201,227.
US Patent Application filed on Mar. 7, 2014, entitled "Integrated Security and Control System With Geofencing", U.S. Appl. No. 14/201,189.
US Patent Application filed on Mar. 7, 2014, entitled "Security System Integrated With Social Media Platform", U.S. Appl. No. 14/201,133.
US Patent Application filed on Mar. 10, 2014, entitled "Communication Protocols in Integrated Systems", U.S. Appl. No. 14/202,573.
US Patent Application filed on Mar. 10, 2014, entitled "Communication Protocols in Integrated Systems", U.S. Appl. No. 14/202,592.
US Patent Application filed on Mar. 10, 2014, entitled "Communication Protocols in Integrated Systems", U.S. Appl. No. 14/202,627.
US Patent Application filed on Mar. 10, 2014, entitled "Communication Protocols in Integrated Systems", U.S. Appl. No. 14/202,685.

(56) References Cited

OTHER PUBLICATIONS

US Patent Application filed on Mar. 10, 2014, entitled "Communication Protocols in Integrated Systems", U.S. Appl. No. 14/203,077.
US Patent Application filed on Mar. 10, 2014, entitled "Communication Protocols in Integrated Systems", U.S. Appl. No. 14/203,084.
US Patent Application filed on Mar. 10, 2014, entitled "Communication Protocols in Integrated Systems", U.S. Appl. No. 14/203,128.
US Patent Application filed on Mar. 10, 2014, entitled "Communication Protocols in Integrated Systems", U.S. Appl. No. 14/203,141.
US Patent Application filed on Mar. 10, 2014, entitled "Communication Protocols in Integrated Systems", U.S. Appl. No. 14/203,219.
US Patent Application filed on Mar. 10, 2014, entitled "Communication Protocols Over Internet Protocol (IP) Networks", U.S. Appl. No. 14/202,505.
US Patent Application filed on Mar. 10, 2014, entitled "Communication Protocols Over Internet Protocol (IP) Networks", U.S. Appl. No. 14/202,579.
US Patent Application filed on Mar. 10, 2022, entitled "Virtual Device Systems and Methods", U.S. Appl. No. 17/691,774.
US Patent Application filed on Mar. 11, 2020, entitled "Management of a Security System at a Premises", U.S. Appl. No. 16/816,134.
US Patent Application filed on Mar. 15, 2021, entitled "Automation System User Interface", U.S. Appl. No. 17/202,279.
US Patent Application filed on Mar. 17, 2021, entitled "Communication Protocols Over Internet Protocol (IP) Networks", U.S. Appl. No. 17/204,068.
US Patent Application filed on Mar. 18, 2019, entitled "Server-Based Notification of Alarm Event Subsequent to Communication Failure With Armed Security System", U.S. Appl. No. 16/356,742.
US Patent Application filed on Mar. 20, 2020, entitled "Security, Monitoring and Automation Controller Access and Use of Legacy Security Control Panel Information", U.S. Appl. No. 16/825,099.
US Patent Application filed on Jan. 19, 2023, entitled "Premises Management Configuration and Control", U.S. Appl. No. 18/157,030.
US Patent Application filed on Jan. 24, 2023, entitled "Server-Based Notification of Alarm Event Subsequent to Communication Failure With Armed Security System", U.S. Appl. No. 18/158,876.
US Patent Application filed on Jan. 26, 2023, entitled "System for Data Routing in Networks", U.S. Appl. No. 18/159,869.
US Patent Application filed on Feb. 8, 2023, entitled "Management of a Security System at a Premises", U.S. Appl. No. 18/166,052.
US Patent Application filed on Feb. 8, 2023, entitled "Premises Management Configuration and Control", U.S. Appl. No. 18/166,046.
US Patent Application filed on Feb. 13, 2023, entitled "Premise Management Systems and Methods", U.S. Appl. No. 18/168,314.
"Indicate". Memam-Webster.com Dictionary, Merriam-Webster, https://web.archive.org/web/20061209080613/https://www.merriam-webster.com/dictionary/indicate. Dec. 9, 2006.
"Application" The Authoritative Dictionary of IEEE Standard Terms. 7th ed. 2000.
"Icon", Newton's Telecom Dictionary, 21st ed., Mar. 2005.
"Modular programming", The Authoritative Dictionary of IEEE Standard Terms. 7th ed. 2000.
3rd Generation Partnership Project! Technical Specification Group Services and System Aspects! Architecture enhancements to facilitate communications with packet data networks and application, Mar. 2015, 3GPP TS 23.682 V12.3.0, pp. 8-10. (Year: 2015).
6270 Touch Screen Keypad Notes, Honeywell, Sep. 2006.
Alarm.com—Interactive Security Systems, Elders [retrieved on Nov. 4, 2003], 1 page.
Alarm.com—Interactive Security Systems, Frequently Asked Questions [retrieved on Nov. 4, 2003], 3 pages.
Alarm.com—Interactive Security Systems, Overview [retrieved on Nov. 4, 2003], 2 pages.
Associate. Merriaim-Webster.com Dictionary, Merriam-Webster, https://web.archive.org/web/20061209213742/https://www.merriam-webster.com/dictionary/associate. Dec. 9, 2006.
AU application filed on Feb. 28, 2017, entitled "Control System User Interface", 2017201365.
AU application filed on Mar. 8, 2017, entitled "Integrated Security Network with Security Alarm Signaling System", 2017201585.
CA application filed on Aug. 15, 2017, entitled "Automation System User Interface", 2976682.
CA application filed on Aug. 16, 2017, entitled "Automation System User Interface", 2976802.
Chapter 6, Securing TCP/IP, pp. 135-164, Oct. 12, 2004.
Condry M et al., Open Service Gateway architecture overview, Industrial Electronics Society, 1999, IECON '99 Proceedings, The 25th Annual Conference of the IEEE, San Jose, CA, USA, Nov. 29-Dec. 3, 1999, Piscataway, NJ, USA, IEEE, US, vol. 2, Nov. 29, 1999 (Nov. 29, 1999), pp. 735-742, XP010366642.
Control Panel Standard—Features for False Alarm Reduction, The Security Industry Association, SIA 2009, pp. 1-48.
CorAccess Systems, Companion 6 User Guide, Jun. 17, 2002.
Court action filed for U.S. Pat. Nos. 7,262,690; 7,911,341; 8,073,931; 8,335,842; 8,473,619; 8,478,844 in U.S. District Court, Estern District of Virginia, Case No. 1:13-CV-00834, between *iControl Networks, Inc.* (Plaintiff) vs *Alarm.com Incorporated et al.* (Defendant) on Jul. 10, 2013.
Diaz, Redondo R P et al., Enhancing Residential Gateways: OSGI Service Composition, IEEE Transactions on Consumer Electronics, IEEE Service Center, New York, NY, US, vol. 53, No. 1, Feb. 1, 2007 (Feb. 1, 2007), pp. 87-95, XP011381790.
Dragging the Authoritative Dictionary of IEEE Standard Terms. 7th ed. 2000, p. 337.
Elwahab et al. ; Device, System and . . . Customer Premises Gateways, Sep. 27, 2001; WO 01/71489.
EP application filed on Jun. 9, 2016, entitled, "Data Model for Flome Automation", 16808247.7.
EP application filed on Aug. 16, 2017, entitled, "Automation System User Interface", 17186497.8.
EP examination report issued in EP08797646.0, dated May 17, 2017, 11 pages.
Examination Report under Section 18(3) re for UK Patent Application No. GB0620362.4, mailed on Aug. 13, 2007.
Examination Report under Section 18(3) re for UK Patent Application No. GB0724248.0, mailed on Jun. 4, 2008.
Examination Report under Section 18(3) re for UK Patent Application No. GB0724248.0, mailed on Jan. 30, 2008.
Examination Report under Section 18(3) re for UK Patent Application No. GB0724760.4, mailed on Jan. 30, 2008.
Examination Report under Section 18(3) re for UK Patent Application No. GB0800040.8, mailed on Jan. 30, 2008.
Faultline, "AT&T Targets video home security as next broadband market"; Nov. 2, 2006; The Register; 2 Pages.
File, The Authoritative Dictionary of IEEE Standard Terms. 7th ed. 2000, pp. 432.
Final Office Action mailed Aug. 1, 2011 for U.S. Appl. No. 12/630,092, filed Dec. 3, 2009.
Final Office Action mailed Jun. 1, 2009 for U.S. Appl. No. 11/084,232, filed Mar. 16, 2005.
Final Office Action mailed Jun. 5, 2012 for U.S. Appl. No. 12/771,071, filed Apr. 30, 2010.
Final Office Action mailed May 9, 2013 for U.S. Appl. No. 12/189,780, filed Aug. 11, 2008.
Final Office Action mailed May 9, 2013 for U.S. Appl. No. 12/952,080, filed Nov. 22, 2010.
Final Office Action mailed Jan. 10, 2011 for U.S. Appl. No. 12/189,785, filed Aug. 11, 2008.
Final Office Action mailed Jun. 10, 2011 for U.S. Appl. No. 11/084,232, filed Mar. 16, 2005.
Final Office Action mailed Jan. 13, 2011 for U.S. Appl. No. 12/189,780, filed Aug. 11, 2008.
Final Office Action mailed Oct. 17, 2012 for U.S. Appl. No. 12/637,671, filed Dec. 14, 2009.
Final Office Action mailed Sep. 17, 2012 for U.S. Appl. No. 12/197,958, filed Aug. 25, 2008.
Final Office Action mailed Mar. 21, 2013 for U.S. Appl. No. 12/691,992, filed Jan. 22, 2010.
Final Office Action mailed Jul. 23, 2013 for U.S. Appl. No. 13/531,757, filed Jun. 25, 2012.

(56) References Cited

OTHER PUBLICATIONS

Final Office Action mailed Feb. 26, 2013 for U.S. Appl. No. 12/771,471, filed Apr. 30, 2010.
Final Office Action mailed Jun. 29, 2012 for U.S. Appl. No. 12/539,537, filed Aug. 11, 2009.
Final Office Action mailed Dec. 31, 2012 for U.S. Appl. No. 12/770,365, filed Apr. 29, 2010.
Final Office Action mailed Oct. 31, 2012 for U.S. Appl. No. 12/771,624, filed Apr. 30, 2010.
Final Office Action mailed Feb. 16, 2011 for U.S. Appl. No. 12/019,568, filed Jan. 24, 2008.
Final Office Action mailed Jul. 12, 2010 for U.S. Appl. No. 12/019,554, filed Jan. 24, 2008.
Final Office Action mailed Sep. 14, 2011 for U.S. Appl. No. 12/197,931, filed Aug. 25, 2008.
Foreign communication from a related counterpart application-International Preliminary Examination Report, App No. PCT/US02/14450, Mar. 2, 2004, 4 pgs.
Foreign communication from a related counterpart application-International Search Report, App No. PCT/US02/14450, Dec. 17, 2002, 6 pgs.
Foreign communication from a related counterpart application—Written Opinion, App No. PCT/US02/14450, Oct. 21, 2003, 4 pgs.
Form PCT/ISA/210, "PCT International Search Report for the Application No. PCT/US05/08766," May 23, 2006, 2 pages.
Form PCT/ISA/210, "PCT International Search Report for the Application No. PCT/US08/72831," Nov. 4, 2008, 2 pages.
Form PCT/ISA/210, "PCT International Search Report for the Application No. PCT/US08/74246," Nov. 14, 2008, 2 pages.
Form PCT/ISA/210, "PCT International Search Report for the Application No. PCT/US08/74260," Nov. 13, 2008, 2 pages.
Form PCT/ISA/210, "PCT International Search Report for the Application No. PCT/US08/83254," Jan. 14, 2009, 2 pages.
Form PCT/ISA/210, "PCT International Search Report for the Application No. PCT/US09/53485," Oct. 22, 2009, 2 pages.
Form PCT/ISA/210, "PCT International Search Report for the Application No. PCT/US09/55559," Nov. 12, 2009, 2 pages.
Form PCT/ISA/210, "PCT International Search Report for the Application No. PCT/US10/50585," Dec. 30, 2010, 2 pages.
Form PCT/ISA/210, "PCT International Search Report for the Application No. PCT/US10/57674," Mar. 2, 2011, 2 pages.
Form PCT/ISA/210, "PCT International Search Report for the Application No. PCT/US11/34858," Oct. 3, 2011, 2 pages.
Form PCT/ISA/210, "PCT International Search Report for the Application No. PCT/US11/35994," Sep. 28, 2011, 2 pages.
Form PCT/ISA/210, "PCT International Search Report for the Application No. PCT/US11/53136," Jan. 5, 2012, 2 pages.
Form PCT/ISA/220, "PCT Notification of Transmittal of the International Search Report and the Written Opinion fo the International Searching Authority, or the Declaration for the Application No. PCT/US08/74260," Nov. 13, 2008, 1 page.
Form PCT/ISA/220, "PCT Notification of Transmittal of the International Search Report and the Written Opinion of the International Searching Authority, or the Declaration for the Application No. PCT/US08/72831," Nov. 4, 2008, 1 page.
Form PCT/ISA/220, "PCT Notification of Transmittal of the International Search Report and the Written Opinion of the International Searching Authority, or the Declaration for the Application No. PCT/US08/74246" Nov. 14, 2008, 1 page.
Form PCT/ISA/220, "PCT Notification of Transmittal of the International Search Report and the Written Opinion of the International Searching Authority, or the Declaration for the Application No. PCT/US08/83254," Jan. 14, 2009, 1 page.
Form PCT/ISA/220, "PCT Notification of Transmittal of the International Search Report and the Written Opinion of the International Searching Authority, or the Declaration for the Application No. PCT/US09/53485, " Oct. 22, 2009, 1 page.
Form PCT/ISA/220, "PCT Notification of Transmittal of the International Search Report and the Written Opinion of the International Searching Authority, or the Declaration for the Application No. PCT/US09/55559," Nov. 12, 2009, 1 page.
Form PCT/ISA/220, "PCT Notification of Transmittal of the International Search Report and the Written Opinion of the International Searching Authority, or the Declaration for the Application No. PCT/US10/50585," Dec. 30, 2010, 1 page.
Form PCT/ISA/220, "PCT Notification of Transmittal of the International Search Report and the Written Opinion of the International Searching Authority, or the Declaration for the Application No. PCT/US10/57674," Mar. 2, 2011, 1 page.
Form PCT/ISA/220, "PCT Notification of Transmittal of the International Search Report and the Written Opinion of the International Searching Authority, or the Declaration for the Application No. PCT/US11/35994," Sep. 28, 2011, 1 page.
Form PCT/ISA/220, PCT Notification of Transmittal of the International Search Report and the Written Opinion of the International Searching Authority, or the Declaration for the Application No. PCT/US05/08766, May 23, 2006, 1 page.
Form PCT/ISA/237, " PCT Written Opinion ofthe International Searching Authority for the Application No. PCT/US05/08766," May 23, 2006, 5 pages.
Form PCT/ISA/237, "PCT Written Opinion of the International Searching Authority for the Application No. PCT/US08/72831," Nov. 4, 2008, 6 pages.
Form PCT/ISA/237, "PCT Written Opinion of the International Searching Authority for the Application No. PCT/US08/74246," Nov. 14, 2008, 6 pages.
Form PCT/ISA/237, "PCT Written Opinion of the International Searching Authority for the Application No. PCT/US08/74260, " Nov. 13, 2008, 6 pages.
Form PCT/ISA/237, "PCT Written Opinion of the International Searching Authority for the Application No. PCT/US09/53485," Oct. 22, 2009, 8 pages.
Form PCT/ISA/237, "PCT Written Opinion of the International Searching Authority for the Application No. PCT/US09/55559," Nov. 12, 2009, 6 pages.
Form PCT/ISA/237, "PCT Written Opinion of the International Searching Authority for the Application No. PCT/US10/50585," Dec. 30, 2010, 7 pages.
Form PCT/ISA/237, "PCT Written Opinion of the International Searching Authority for the Application No. PCT/US10/57674, " Mar. 2, 2011, 6 pages.
Form PCT/ISA/237, "PCT Written Opinion of the International Searching Authority for the Application No. PCT/US11/34858," Oct. 3, 2011, 8 pages.
Form PCT/ISA/237, "PCT Written Opinion of the International Searching Authority for the Application No. PCT/US11/35994," Sep. 28, 2011, 11 pages.
Form PCT/ISA/237, "PCT Written Opinion of the International Searching Authority for the Application No. PCT/US11/53136," Jan. 5, 2012.
Form PCT/ISA/237, "PCT Written Opinion of the International Searching Authority of the Application No. PCT/US08/83254," Jan. 14, 2009, 7 pages.
Gateway Registry Methods and Systems, U.S. Appl. No. 13/486,276, filed Jun. 1, 2012.
Genex Technologies, Genex OmniEye, www.aviq.com/avcat/images/documents/pdfs/omnieye%20nightwatchbrochure.pdf; webpage accessed Jan. 10, 2018.
Gong, Li, A Software architecture for open service gateways, Internet Computing, IEEE 5.1, Jan.-Feb. 2001, 64-70.
Grayelectronics, "Digitizing TV cameras on TCP/IP Computer Networks," http://www.grayelectronics.com/default.htm, printed on Oct. 12, 1999 (2 pages).
Grayelectronics, http://www.grayelectronics.com; webpage accessed on Jan. 10, 2018.
GTI Genex Technologies, Inc. OmniEye.(Trademark). Product Brochure, Sep. 14, 1999 (5 pages).
Gutierrez J.A., "On the Use of IEEE 802.15.4 to Enable Wireless Sensor Networks in Building Automation," Personal, Indoor and Mobile Radio Communications (PIMRC), 15th IEEE International Symposium, 2004, vol. 3, pp. 1865-1869.

(56) References Cited

OTHER PUBLICATIONS

Indian Patent App. No. 10698/DELNP/2012, corresponds to WO2011/143273, filed Nov. 17, 2011.
Indian Patent App. No. 3687/DELNP/2012, corresponds to WO2011/038409 filed on Sep. 28, 2010.
International Search Report for Application No. PCT/US13/48324, mailed on Jan. 14, 2014, 2 pages.
International Search Report for Application No. PCT/US2014/050548, mailed on Mar. 18, 2015, 4 pages.
J. David Eisenberg, SVG Essentials: Producing Scalable Vector Graphics with XML. O'Reilly & Associates, Inc., Sebastopol, CA 2002.
US Patent Application filed on Sep. 22, 2022, entitled "Forming a Security Network Including Integrated Security System Components and Network Devices", U.S. Appl. No. 17/934,443.
US Patent Application filed on Nov. 29, 2022, entitled "Communication Protocols Over Internet Protocol (IP) Networks", U.S. Appl. No. 18/059,604.
US Patent Application filed on Nov. 30, 2022, entitled "Custom Content for Premises Management", U.S. Appl. No. 18/060,374.
US Patent Application filed on Dec. 1, 2022, entitled "Controlling Data Routing in Premises Management Systems", U.S. Appl. No. 18/073,514.
US Patent Application filed on Sep. 1, 2023, entitled "Communication and Automation in a Premises Management System", U.S. Appl. No. 18/460,355.
US Patent Application filed on Sep. 22, 2023, entitled "Automation System User Interface", U.S. Appl. No. 18/472,477.
US Patent Application filed on Sep. 22, 2023, entitled "Communication Protocols Over Internet Protocol (IP) Networks", U.S. Appl. No. 18/472,408.
US Patent Application filed on Sep. 22, 2023, entitled "Cross-Client Sensor User Interface in an Integrated Security Network", U.S. Appl. No. 18/472,628.
US Patent Application filed on Sep. 25, 2023, entitled "Control System User Lnterface", U.S. Appl. No. 18/474,039.
US Patent Application filed on Oct. 9, 2023, entitled "Integrated Security System With Parallel Processing Architecture", U.S. Appl. No. 18/483,080.
US Patent Application filed on Oct. 9, 2023, entitled "Method and System for Managing Communication Connectivity", U.S. Appl. No. 18/483,196.
US Patent Application filed on Oct. 26, 2023, entitled "Controlling Data Routing in Premises Management Systems", U.S. Appl. No. 18/495,430.
US Patent Application filed on Jan. 4, 2024, entitled "Media Content Management", U.S. Appl. No. 18/403,953.
US Patent Application filed on Nov. 6, 2023, entitled "Method, System and Apparatus for Automated Inventory Reporting of Security, Monitoring and Automation Hardware and Software at Customer Premises", U.S. Appl. No. 18/503,102.
US Patent Application filed on Nov. 22, 2023, entitled "Communication Protocols Over Internet Protocol (IP) Networks", U.S. Appl. No. 18/517,821.
US Patent Application filed on Nov. 27, 2023, entitled "Networked Touchscreen With Integrated Interfaces", U.S. Appl. No. 18/520,373.
US Patent Application filed on Apr. 12, 2023, entitled "Integrated Security System With Parallel Processing Architecture", U.S. Appl. No. 18/299,394.
US Patent Application filed on Apr. 17, 2023, entitled "Integrated Cloud System for Premises Automation", U.S. Appl. No. 18/301,626.
US Patent Application filed on Apr. 17, 2023, entitled "Server-Based Notification of Alarm Event Subsequent to Communication Failure With Armed Security System", U.S. Appl. No. 18/301,923.
US Patent Application filed on Apr. 18, 2023, entitled "Method and System for Providing Alternate Network Access", U.S. Appl. No. 18/302,661, U.S. Appl. No. 18/302,661.
US Patent Application filed on Apr. 27, 2023, entitled "Integrated Cloud System With Lightweight Gateway for Premises Automation", U.S. Appl. No. 18/307,985.
US Patent Application filed on May 1, 2023, entitled "Premises System Management Using Status Signal" U.S. Appl. No. 18/310,294.
US Patent Application filed on May 8, 2023, entitled "Communication Protocols in Integrated Systems", U.S. Appl. No. 18/314,002.
US Patent Application filed on May 8, 2023, entitled "Integrated Cloud System With Lightweight Gateway for Premises Automation", U.S. Appl. No. 18/313,728.
US Patent Application filed on May 8, 2023, entitled "Security Network Integrating Security System and Network Devices", U.S. Appl. No. 18/313,817.
US Patent Application filed on May 12, 2023, entitled "Virtual Device Systems and Methods", U.S. Appl. No. 18/316,580.
US Patent Application filed on Jul. 13, 2023, entitled "Methods and Systems for Data Communication", U.S. Appl. No. 18/351,636.
US Patent Application filed on Jul. 14, 2023, entitled "Bidirectional Security Sensor Communication for a Premises Security System", U.S. Appl. No. 18/352,803.
US Patent Application filed on Jul. 21, 2023, entitled "Communication Protocols in Integrated Systems", U.S. Appl. No. 18/356,337.
US Patent Application filed on Aug. 16, 2023, entitled "Mobile Premises Automation Platform", U.S. Appl. No. 18/450,878.
US Patent Application filed on Aug. 25, 2023, entitled "Automation System With Mobile Interface", U.S. Appl. No. 18/456,355.
X. Li, R. Lu, X. Liang, X. Shen, J. Chen and X. Lin, "Smart community: an internet of things application," in IEEE Communications Magazine, vol. 49, No. 11, pp. 68-75, Nov. 2011, doi: 10.1109/MCOM.2011.6069711. (Year: 2011).

* cited by examiner

METHOD AND SYSTEM FOR PROCESSING SECURITY EVENT DATA

CROSS-REFERENCE TO RELATED APPLICATIONS

This application is a continuation of U.S. patent application Ser. No. 16/910,967, filed on Jun. 24, 2020, now U.S. Pat. No. 11,341,840, issued on May 24, 2022, which is a continuation of U.S. patent application Ser. No. 16/059,833, filed on Aug. 9, 2018, issued as U.S. Pat. No. 10,741,057 on Aug. 11, 2020, which is a continuation of U.S. patent application Ser. No. 14/852,822, filed on Sep. 14, 2015, issued as U.S. Pat. No. 10,078,958 on Sep. 18, 2018, which is a continuation of U.S. patent application Ser. No. 12/971,282, filed on Dec. 17, 2010, issued as U.S. Pat. No. 9,147,337 on Sep. 29, 2015, which are each hereby incorporated by reference in their entireties.

BACKGROUND

Residential electronics and control standards provide an opportunity for a variety of options for securing, monitoring, and automating residences. Wireless protocols for transmission of security information permit placement of a multitude of security sensors throughout a residence without a need for running wires back to a central control panel. Inexpensive wireless cameras also allow for placement of cameras throughout a residence to enable easy monitoring of the residence. A variety of home automation control protocols have also been developed to allow for centralized remote control of lights, appliances, and environmental apparatuses (e.g., thermostats). Traditionally, each of these security, monitoring and automation protocols require separate programming, control and monitoring stations. To the extent that home automation and monitoring systems have been coupled to home security systems, such coupling has involved including the automation and monitoring systems as slaves to the existing home security system. This limits the flexibility and versatility of the automation and monitoring systems and ties such systems to proprietary architectures.

A security system alerts occupants of a dwelling and emergency authorities of a violation of premises secured by the system. A home monitoring system monitors a status of a home so that a user can be made aware of any monitored state changes. A home automation system automates and remotely controls lifestyle conveniences such as lighting, heating, cooling, and appliances.

Rather than having multiple devices to control each of the security, monitoring and automation environments, it is desirable to have a centralized controller capable of operating in each environment, thereby reducing the equipment needed in a dwelling. It is further desirable for such a controller to function as a gateway for external network access. Gateway access can include user access to the controller in order to control or monitor devices in locations remote from the dwelling.

Traditional security systems communicate alarm event information directly to a central station alarm monitoring system. Non-alarm events registered by the security system are not provided to the central station. Thus, it is difficult, if not impossible, for a security system provider to track sequences of events leading to and following generation of an alarm event. This can be important in diagnosing proper functioning of a security system or in situations where a dispute arises between an end-user of a security system and the provider of the security system related to performance of the security system or the security system provider during an alarm situation. It is therefore desirable to have a system that records events leading to and following an alarm event. It is further desirable to have these recorded events available to not only an end-user but also to the provider of the security system.

SUMMARY

A premises management system located at a premises may communicate with a remote server external to the premises. The premises management system may comprise a security system, an automation system, a combination thereof, and/or the like. The premises management system may comprises devices located at the premises, such as one or more premises devices (e.g., a security device, automation device), and a controller. The premises management system may generate premises data from the devices located at the premises. The premises data may be sent to the remote server. The remote server may process (e.g., analyze) the premises device. The remote server may determine alarm event data and non-alarm event data. The alarm event data and/or the non-alarm event data may be stored (e.g., by the remote device). The alarm event data and the non-alarm event data may be processed together. The alarm event data may be analyzed using the non-alarm event data. A notification may be sent (e.g., to a monitoring station, to a user device) based on the processing of the alarm event data and the non-alarm event data.

The foregoing is a summary and thus contains, by necessity, simplifications, generalizations and omissions of detail. Consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Embodiments of the present invention provide a server-based environment for reporting a status of a security, monitoring and automation (SMA) controller and associated sensor and monitoring devices. Embodiments of the present invention provide for an always-on persistent network connection between the SMA controller and a remote server. Through this persistent connection, the SMA controller can report information related to sensor and system events to a server. An aspect of these embodiments further provides for reporting the cessation of the network connection to the servers. These events, and others, are recorded using embodiments of the present invention and made available to selected users of the server systems for analysis.

Architectural Overview

Embodiments of the configurable security, monitoring and automation (SMA) controller of the present invention provide not only for communicating with and interpreting signals from sensors and devices within a dwelling, but also for accessing and monitoring those sensors and devices from locations remote to the dwelling. Embodiments of the SMA controller provide such capability through linkages to external servers via access networks such as the Internet, provider network, or a cellular network. The external servers provide a portal environment through which a user can, for example, monitor the state of sensors coupled to the SMA controller in real-time, configure the controller, and provide controlling information to the SMA controller. The external servers can also monitor the state of the SMA controller and the network connections between the SMA controller and the servers. The servers further provide a connection to a traditional security central station, which can then contact authorities in the event of an alarm condition being detected by the SMA controller in the dwelling.

Figure 1A:
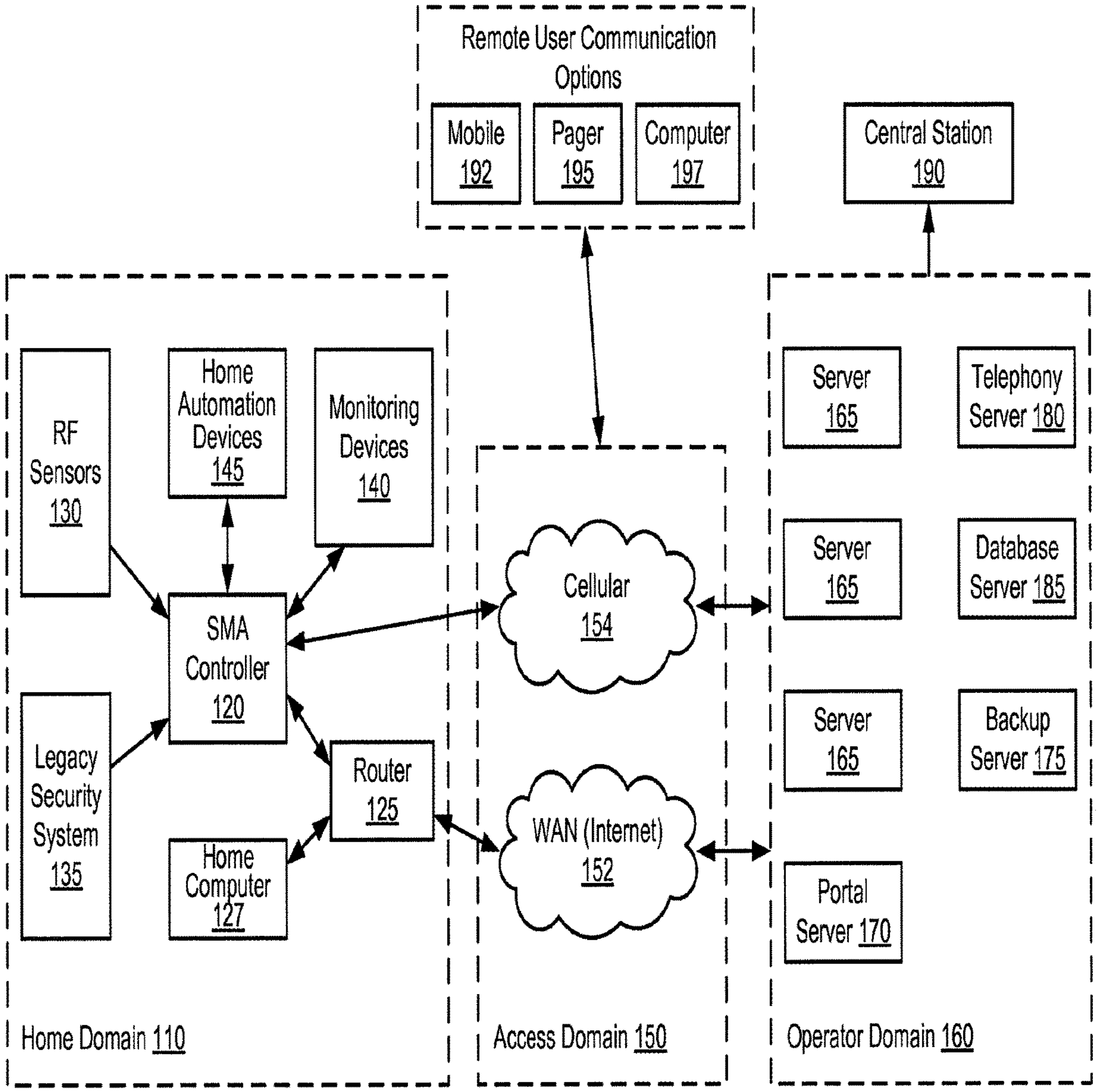
FIG. 1A is a simplified block diagram illustrating an architecture including a set of logical domains and functional entities within which embodiments of the present invention interact.

FIG. 1A is a simplified block diagram illustrating an architecture including a set of logical domains and functional entities within which embodiments of the present invention interact. A home domain 110 includes an embodiment of the SMA controller 120. The home domain is coupled via an access domain 150 to an operator domain 160 that includes various servers. The servers are in turn coupled to a central station 190 and to various remote user communication options.

The home domain refers to a collection of security, monitoring and automation entities within a dwelling or other location having SMA devices. SMA controller 120 is a device that provides an end-user SMA interface to the various SMA entities (e.g., radio-frequency sensors) within home domain 110. SMA controller 120 further acts as a gateway interface between home domain 110 and operator domain 160. SMA gateway 120 provides such gateway access to operator domain 160 via a network router 125. Network router 125 can be coupled to SMA controller 120 and to home network devices such as home computer 127 via either hard wired or wireless connections (e.g., WiFi, tethered Ethernet, and power-line network). A network router 125 coupled to a broadband modem (e.g., a cable modem or DSL modem) serves as one link to networks in access domain 150.

SMA devices within home domain 110 can include a variety of RF or wireless sensors 130 whose signals are received and interpreted by SMA gateway 120. RF sensors 130 can include, for example, door or window sensors, motion detectors, smoke detectors, glass break detectors, inertial detectors, water detectors, carbon dioxide detectors, and key fob devices. SMA gateway 120 can be configured to react to a change in state of any of these detectors. In addition to acting and reacting to changes in state of RF sensors 130, SMA controller 120 also can be coupled to a legacy security system 135. SMA controller 120 controls the legacy security system by interpreting signals from sensors coupled to the legacy security system and reacting in a user-configured manner. SMA gateway 120, for example, will provide alarm or sensor state information from legacy security system 135 to servers in operator domain 160 that may ultimately inform central station 190 to take appropriate action.

SMA gateway 120 can also be coupled to one or more monitoring devices 140. Monitoring devices 140 can include, for example, still and video cameras that provide images that are viewable on a screen of SMA gateway 120 or a remotely connected device. Monitoring devices 140 can be coupled to SMA gateway 120 either wirelessly (e.g., WiFi via router 125) or other connections.

Home automation devices 145 (e.g., home area network devices having an automation interface) can also be coupled to and controlled by SMA gateway 120. SMA gateway 120 can be configured to interact with a variety of home automation protocols, such as, for example, Z-Wave and ZigBee.

Embodiments of SMA controller 120 can be configured to communicate with a variety of RF or wireless sensors and are not limited to the RF sensors, monitoring devices and home automation devices discussed above. A person of ordinary skill in the art will appreciate that embodiments of the present invention are not limited to or by the above-discussed devices and sensors, and can be applied to other areas and devices.

Embodiments of SMA controller 120 can be used to configure and control home security devices (e.g., 130 and 135), monitoring devices 140 and automation devices 145, either directly or by providing a gateway to remote control via servers in operator domain 160. SMA controller 120 communicates with servers residing in operator domain 160 via networks in access domain 150. Broadband communication can be provided by coupling SMA controller 120 with a network router 125, which in turn is coupled to a wide area network 152, such as a provider network or the Internet, via an appropriate broadband modem. The router can be coupled to the wide area network through cable broadband, DSL, and the like. Wide area network 152, in turn, is coupled to servers in operator domain 160 via an appropriate series of routers and firewalls (not shown). SMA controller 120 can include additional mechanisms to provide a communication with the operator domain. For example, SMA controller 120 can be configured with a cellular network transceiver that permits communication with a cellular network 154. In turn, cellular network 154 can provide access via routers and firewalls to servers in operator domain 160. Embodiments of SMA controller 120 are not limited to providing gateway functionality via cellular and dwelling-based routers and modems. For example, SMA gateway 120 can be configured with other network protocol controllers such as WiMAX satellite-based broadband, direct telephone coupling, and the like.

Operator domain 160 refers to a logical collection of SMA servers and other operator systems in an operator's network that provide end-user interfaces, such as portals accessible to subscribers of the SMA service, that can configure, manage and control SMA elements within home domain 110. Servers can also provide management portals for the provider to configure available services to the SMA controllers. Servers in operator domain 160 can be maintained by a provider (operator) of subscriber-based services for SMA operations. Examples of providers include cable providers, telecommunications providers, and the like. A production server architecture in operator domain 160 can support SMA systems in millions of home domains 110.

Individual server architectures can be of a variety of types, and in one embodiment, the server architecture is a tiered Java2 Enterprise Edition (J2EE) service oriented architecture. Such a tiered service oriented architecture can include an interface tier, a service tier, and a data access logic tier. The interface tier can provide entry points from outside the server processes, including, for example, browser web applications, mobile web applications, web services, HTML, XHTML, SOAP, and the like. A service tier can provide a variety of selectable functionality passed along by the operator to the end user, including widget programs. Service tiers can relate to end user subscription levels offered by the operator (e.g., payment tiers corresponding to "gold" level service, "silver" level service and "bronze" level service). Finally the data access logic tier provides access to various sources of data including database servers.

FIG. 1A illustrates an example set of servers that can be provided in operator domain 160. Servers 165 can support all non-alarm and alarm events, heartbeat, and command traffic between the various servers and SMA controllers 120. Servers 165 can also manage end-user electronic mail and SMS notification, as well as integration with provider billing, provisioning, inventory, tech support systems, and the like.

A portal server 170 can provide various user interface applications, including, for example, a subscriber portal, a mobile portal, and a management portal. A subscriber portal is an end-user accessible application that permits an end-user to access a corresponding SMA controller remotely via standard web-based applications. Using such a subscriber portal can provide access to the same SMA functions that an interface directly coupled to the SMA controller would provide, plus additional functions such as alert and contact management, historical data, widget and camera management, account management, and the like. A mobile portal can provide all or part of the access available to an end-user via the subscriber portal. A mobile portal can be limited, however, to capabilities of an accessing mobile device (e.g., touch screen or non-touch screen cellular phones).

A management portal provides an operator representative access to support and manage SMA controllers in home domains 110 and corresponding user accounts via a web-based application. Using a management portal, an operator representative can provision and provide a variety of functionality via, for example, widget programs to the SMA controllers, as will be discussed in greater detail below. The management portal can provide tiers of management support so that levels of access to user information can be restricted based on authorization of a particular employee. User information can include, for example, records of events transmitted by SMA controllers to the operator domain, as will be discussed in greater detail below.

Telephony server 180 can process and send information related to alarm events received from SMA controllers 120 to alarm receivers at central monitoring station 190. A server 165 that processes the alarm event makes a request to telephony server 180 to dial the central station's receiver and send corresponding contact information. Telephony server 180 can communicate with a plurality of central stations 190. Server 165 can determine a correct central station to contact based upon user account settings associated with the transmitting SMA controller. Thus, alarms can be routed to different central stations based upon user accounts. Further, accounts can be transferred from one central station to another by modifying user account information. Telephony server 180 can communicate with alarm receivers at central station 190 using, for example, a security industry standard contact identification protocol (e.g., dual-tone multi-frequency [DTMF]) and broadband protocols.

A backup server 175 can be provided to guarantee that an alarm path is available in an event that one or more servers 165 become unavailable or inaccessible. A backup server 175 can be co-located to the physical location of servers 165 to address scenarios in which one or more of the servers fail. Alternatively, a backup server 175 can be placed in a location remote from servers 165 in order to address situations in which a network failure or a power failure causes one or more of servers 165 to become unavailable. SMA controllers 120 can be configured to transmit alarm events to a backup server 175 if the SMA controller cannot successfully send such events to servers 165.

A database server 185 provides storage of all configuration and user information accessible to other servers within operator domain 160. Database server 185 can also provide storage of event data associated with all SMA controllers coupled to operator domain 160. As will be discussed in greater detail below, such event data can be used to track event sequences occurring around the time of an alarm event. Selection of a type of database provided by database server 185 can be dependent upon a variety of criteria, including, for example, scalability and availability of data. One embodiment of the present invention uses database services provided by an Oracle database.

Figure 1B:
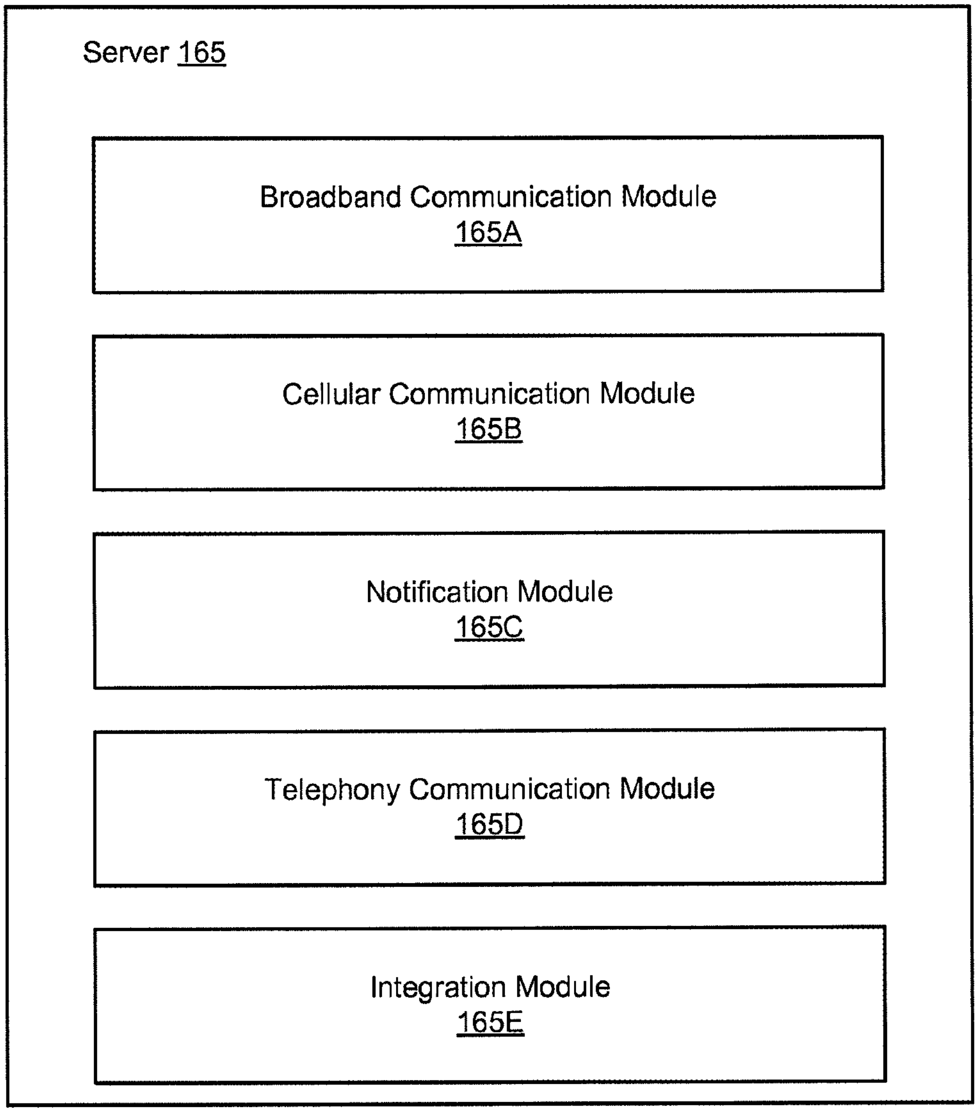
FIG. 1B is a simplified block diagram illustrating a logical architecture for a server usable by embodiments of the present invention.

FIG. 1B is a simplified block diagram illustrating a logical architecture for a server 165 usable by embodiments of the present invention. A server 165 in operator domain 160 provides a variety of functionality. Logically, a server 165 can be divided into the following functional modules: a broadband communication module 165A, a cellular communication module 165B, a notification module 165C, a telephony communication module 165D, and an integration module 165E.

Broadband communication module 165A manages broadband connections and message traffic from a plurality of SMA controllers 110 coupled to server 165. Embodiments of the present invention provide for the broadband channel to be a primary communication channel between an SMA controller 120 and servers 165. The broadband communication module handles a variety of communication, including, for example, all non-alarm and alarm events, broadband heartbeat, and command of traffic between server 165 and SMA controller 120 over the broadband channel. Embodiments of the present invention provide for an always-on persistent TCP socket connection to be maintained between each SMA controller and server 165. A variety of protocols can be used for communications between server 165 and SMA controller 120 (e.g., XML over TCP, and the like).

Such communication can be secured using standard transport layer security (TLS) technologies. Through the use of an always-on socket connection, servers 165 can provide near real-time communication between the server and an SMA controller 120. For example, if a user has a subscriber portal active and a zone is tripped within home domain 110, a zone fault will be reflected in near real-time on the subscriber portal user interface.

Cellular communication module 165B manages cellular connections and message traffic from SMA controllers 120 to a server 165. Embodiments of the present invention use the cellular channel as a backup communication channel to the broadband channel. Thus, if a broadband channel becomes unavailable, communication between an SMA controller and a server switches to the cellular channel. At this time, the cellular communication module on the server handles all non-alarm and alarm events, and command traffic from an SMA controller. When a broadband channel is active, heartbeat messages can be sent periodically on the cellular channel in order to monitor the cellular channel. When a cellular protocol communication stack is being used, a TCP socket connection can be established between the SMA controller and server to ensure reliable message delivery for critical messages (e.g., alarm events and commands). Once critical messages have been exchanged, the TCP connection can be shut down thereby reducing cellular communication costs. As with broadband communication, XMPP can be the messaging protocol used for such communications. Similarly, such communication can be secured using TLS and SASL authentication protocols. Non-critical messages between an SMA controller and a server can be sent using UDP. A compressed binary protocol can be used as a messaging protocol for such communications in order to minimize cellular costs for such message traffic. Such messages can be secured using an encryption algorithm, such as the tiny encryption algorithm (TEA). Cellular communication can be established over two network segments: the GSM service provider's network that provides a path between an SMA controller and a cellular access point, and a VPN tunnel between the access point and an operator domain data center.

A notification module 165C determines if and how a user should be notified of events generated by their corresponding SMA controller 120. A user can specify who to notify of particular events or event types and how to notify the user (e.g., telephone call, electronic mail, text message, page, and the like), and this information is stored by a database server 185. When events such as alarm or non-alarm events are received by a server 165, those events can be passed asynchronously to the notification module, which determines if, who and how to send those notifications based upon the user's configuration.

Telephony communication module 165D provides communication between a server 165 and telephony server 180. When a server 165 receives and performs initial processing of alarm events, the telephony communication module forwards those events to a telephony server 180 which in turn communicates with a central station 190, as discussed above. Alternatively, communication between server 165 and central station 190 can be direct or using a webserver via a wide area network (e.g., 152). Such communication would obviate the need for a telephony server and telephony communication module, or could be used in conjunction with telephony communications (i.e., telephony communications as a backup to the broadband communications).

Integration module 165E provides infrastructure and interfaces to integrate a server 165 with operator business systems, such as, for example, billing, provisioning, inventory, tech support, and the like. An integration module can provide a web services interface for upstream integration that operator business systems can call to perform operations like creating and updating accounts and querying information stored in a database served by database server 185. An integration module can also provide an event-driven framework for downstream integration to inform operator business systems of events within the SMA system.

As discussed above, the network connection between an SMA controller 120 and a server 165 is always on and persistent. This allows for constant remote monitoring of the state of the SMA controller, sensors, and devices coupled to the SMA controller. Notification module 165C can be configured to report state changes of the SMA controller and sensors to previously determined entities. Such state change information can also include a current communication mode between the SMA controller and server. For example, if broadband communication becomes unavailable and a switch is made to cellular communication, an end user can be automatically notified of the change. Likewise, if all communication with the SMA controller is lost, then a different notification can be provided. The nature of a notification associated with an event can be configured by an end user or provider through portal server 170 or an input device coupled to SMA controller 120.

Connectivity reporting can also be used to report a loss of communication subsequent to a zone fault event and to define a response to such a scenario. An SMA controller can be configured with an entry delay timer that allows a person entering home domain 110, and thereby triggering a zone fault event, to disarm an armed SMA controller before an alarm signal is sent to a central station 190. An intruder to the home domain might take advantage of the unified nature of the SMA controller and disable the SMA controller prior to expiration of the entry delay (i.e., a so-called "smash-and-grab" scenario), in order to prevent sounding of an alarm. The continuous communication between the SMA controller and an operator domain server results in the sensor state change associated with the zone fault event to be provided to a server 165 in near real time, along with a message indicating that the SMA controller's entry delay timer has been initiated. If the server subsequently detects a loss of communication with the SMA controller before a disarm signal is received, the notification module can be configured to relay an alarm signal to, for example, one or more of the end user, the central station, and a provider administrator. The alarm signal can be defined using available central station protocols (e.g., contact ID) to indicate a "smash and grab" scenario or an indication that is agreed upon between the central station provider and the provider of the operator domain services.

The server can further be configured with a delay window that results in the server waiting to report an alarm associated with the zone fault event. This allows for communication to be restored with the SMA controller and a disarm signal to be received prior to transmission of the alarm report. A configurable server delay window can be defined in accord with security industry best practices. Alternatively, the configurable server delay window can be defined in accord with a provider's specifications (e.g., customer tiers or purchased services). The delay window timer can be started at the same time the message indicating that the SMA controller's entry delay timer has been initiated is received. Alternatively, the server can start the delay window timer at the same time the loss of communication is detected. As a further alternative, the server can independently track the entry delay timer when the message indicating that the SMA controller's entry delay timer has been initiated and then start the delay window time subsequent to the expiration of the entry delay timer. In general, a delay window timer tracked by the server can include an aggregation of the entry delay timer, as configured at the SMA controller, and an additional time configured by the provider (e.g., a "smash and grab" wait time). This general delay window timer can be started at the time the message indicating that the SMA controller's entry delay timer has been initiated is received (or alternatively, upon receipt of the zone fault event message while the system state is armed).

Figure 2:
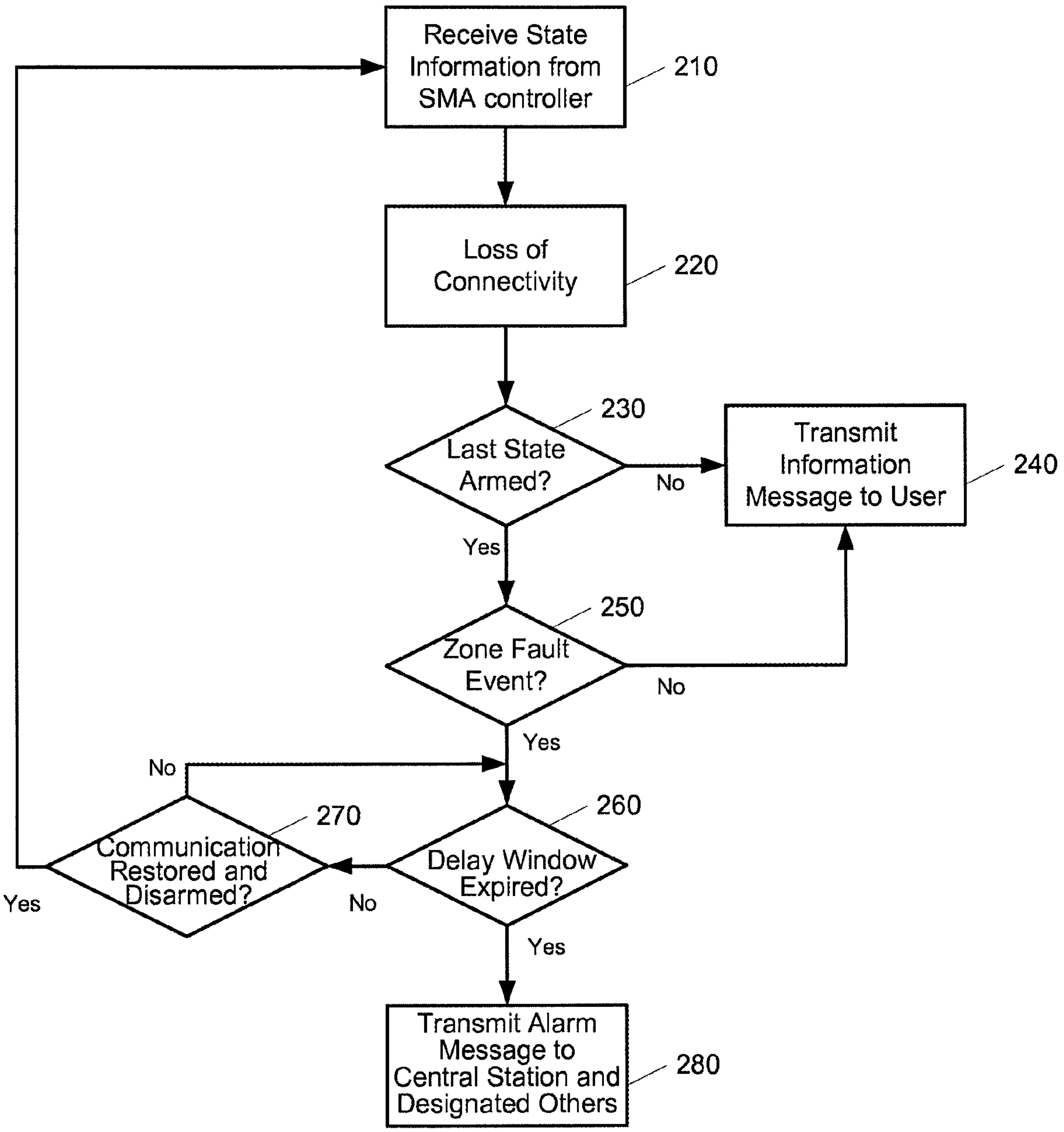
FIG. 2 is a simplified flow diagram illustrating an example of reporting of loss of connectivity and possible transmission of an alarm associated with a zone fault event.

FIG. 2 is a simplified flow diagram illustrating reporting of loss of connectivity and possible transmission of an alarm associated with a zone fault event, in accord with embodiments of the present invention. As discussed above, state information related to the SMA controller is received by a server 165 using, for example, a persistent network connection through a broadband communication module 165A (210). Such state information can include, for example, an indication of continued operation of the SMA controller, arm/disarm, and sensor event state changes (e.g., a zone fault event).

The server then detects a loss of connectivity or communication with the SMA controller (220). If the server determines that the SMA controller was not armed (230), then a notification of the loss of communication is transmitted by notification module 165C to preconfigured recipients (e.g., the end users) (240). If the server determines that the SMA controller was armed at the time of loss of communication (230), a determination can be made as to whether a sensor zone fault event had been detected prior to the loss of communication (250). If no sensor event had been detected, then a notification of loss of communication can be transmitted to the preconfigured recipients (240). If a sensor event had been detected prior to the loss of communication, and the system was armed, then a determination is made as to whether the preconfigured server delay window has expired (260). The delay window is tracked solely by the server, but can include an aggregation of the entry delay configured by the SMA controller as well as an additional time configured by the provider (e.g., the "smash and grab" wait time). The delay window timer can begin at the time a message is received by the server that an entry delay timer has been initiated or at the time the loss of connectivity is detected.

If the delay window has not expired, then a determination is made as to whether communication is restored and the SMA controller is disarmed (270). If communications are restored and the SMA controller is disarmed, then the process can return to a monitoring state (210). If communications are not restored and the SMA controller disarmed, then communications are monitored until the expiration of the delay window. Once the delay window expires without further communication with the SMA controller, an alarm event message is transmitted to a central station 190 and to other preconfigured recipients (280). As discussed above, the alarm event message can be designated as a "smash and grab" alarm event or a general alarm event, as agreed to between the central station provider and the provider of SMA services.

As indicated above, the server-based delay window is configurable by the provider of the SMA services. In one embodiment, the server-based delay window can represent an aggregate of the user-configurable entry delay on the SMA controller and a provider-configurable "smash and grab" delay time (e.g., entry delay of 30 seconds and a "smash and grab" delay time of 60 seconds results in a total delay window of 90 seconds before sending the alarm message to the central station). In another embodiment, an SMA controller can be configured to send an alarm indication message to the remote server, but then the server will wait the delay window time to receive a second alarm message or a cancel message from the SMA controller before sending the alarm message to the central station. In this embodiment, the server can wait for the delay window to expire before sending the alarm if the server hasn't received the second message from the SMA controller. If a second alarm message is received, then an alarm message will be sent to the central station immediately, without waiting for expiration of the delay window. In this scenario, the delay window is the provider-configured "smash and grab" time or an "abort window" per ANSI/SIA CP-01 or the like. In either scenario, the server-based delay time (e.g., the "smash and grab" delay time) can be based upon user tiers (i.e., higher paying customers getting shorter delay times) or other criteria of the provider's choosing.

In addition, FIG. 2 illustrates a determination that a loss of connectivity has occurred. In an alternative embodiment, no such determination need be made. Instead, if SMA controller 120 fails to provide a disarm or some other communication to server 165 within the delay window period, then the alarm message is provided to the central station.

SMA Controller Architecture

Figure 3A:
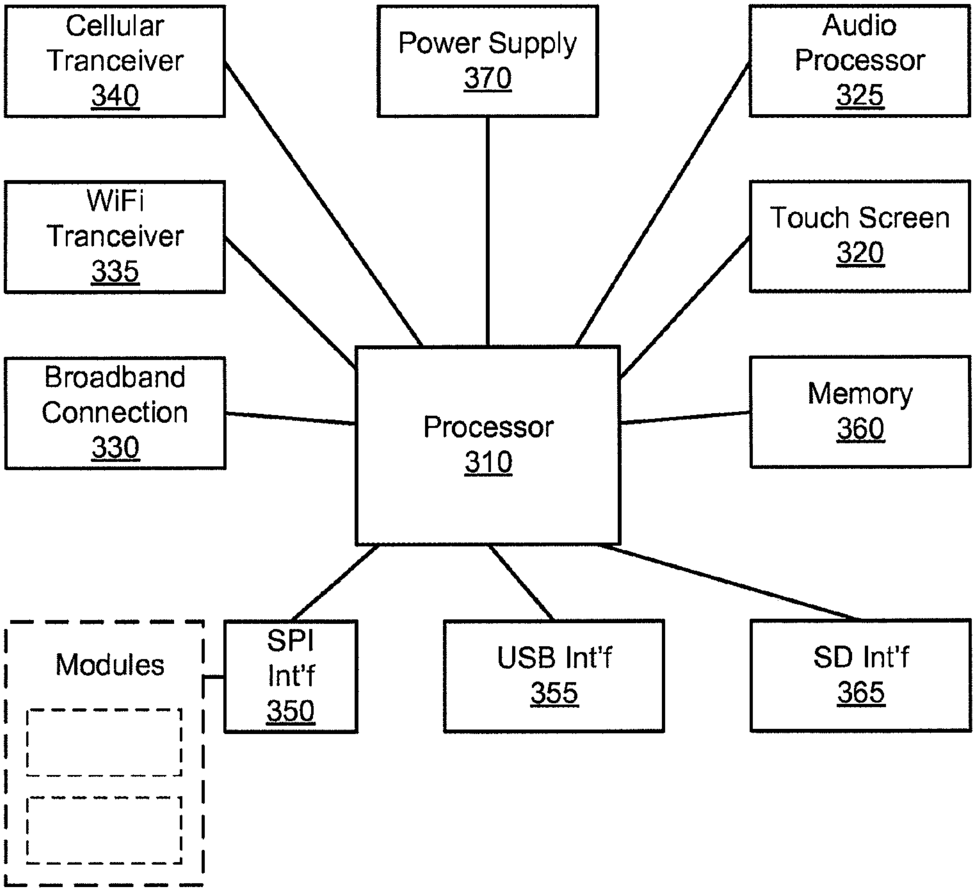
FIG. 3A is a simplified block diagram illustrating a hardware architecture of an SMA controller, usable with embodiments of the present invention.

FIG. 3A is a simplified block diagram illustrating a hardware architecture of an SMA controller, according to one embodiment of the present invention. A processor 310 is coupled to a plurality of communications transceivers, interface modules, memory modules, and user interface modules. Processor 310, executing firmware discussed below, performs various tasks related to interpretation of alarm and non-alarm signals received by SMA controller 120, interpreting reactions to those signals in light of configuration information either received from a server (e.g., server 165) or entered into an interface provided by SMA controller 120 (e.g., a touch screen 320). Embodiments of the present invention can use a variety of processors, for example, an ARM core processor such as a FREESCALE i.MX35 multimedia applications processor.

SMA controller 120 can provide for user input and display via a touch screen 320 coupled to processor 310. Processor 310 can also provide audio feedback to a user via use of an audio processor 325. Audio processor 325 can, in turn, be coupled to a speaker that provides sound in home domain 110. SMA controller 120 can be configured to provide a variety of sounds for different events detected by sensors associated with the SMA controller. Such sounds can be configured by a user so as to distinguish between alarm and non-alarm events.

As discussed above, an SMA controller 120 can communicate with a server 165 using different network access means. Processor 310 can provide broadband access to a router (e.g., router 125) via an Ethernet broadband connection PHY 130 or via a WiFi transceiver 335. The router can then be coupled to or be incorporated within an appropriate broadband modem. Cellular network connectivity can be provided by a cellular transceiver 340 that is coupled to processor 310. SMA controller 120 can be configured with a set of rules that govern when processor 310 will switch between a broadband connection and a cellular connection to operator domain 160.

In order to communicate with the various sensors and devices within home domain 110, processor 310 can be coupled to one or more transceiver modules via, for example, a serial peripheral interface such as a SPI bus 350. Such transceiver modules permit communication with sensors of a variety of protocols in a configurable manner. Embodiments of the present invention can use a transceiver to communicate with a variety of RF sensors 130, using a variety of communication protocols. Similarly, home automation transceivers (e.g., home area network devices having an automation interface) that communicate using, for example, Z-Wave or ZigBee protocols can be coupled to processor 310 via SPI 350. If SMA controller 120 is coupled to a legacy security system 135, then a module permitting coupling to the legacy security system can be coupled to processor 310 via SPI 350. Other protocols can be provided for via such plug-in modules including, for example, digital enhanced cordless telecommunication devices (DECT). In this manner, an SMA controller 120 can be configured to provide for control of a variety of devices and protocols known both today and in the future. In addition, processor 310 can be coupled to other types of devices (e.g., transceivers or computers) via a universal serial bus (USB) interface 355.

In order to locally store configuration information and software (e.g., widget programs) for SMA controller 120, a memory 360 is coupled to processor 310. Additional memory can be coupled to processor 310 via, for example, a secure digital interface 365. A power supply 370 is also coupled to processor 310 and to other devices within SMA controller 120 via, for example, a power management controller module.

SMA controller 120 is configured to be a customer premises equipment device that works in conjunction with server counterparts in operator domain 160 in order to perform functions required for security monitoring and automation. Embodiments of SMA controller 120 provide a touch screen interface (e.g., 320) into all the SMA features. Via the various modules coupled to processor 310, the SMA controller bridges the sensor network, the control network, and security panel network to broadband and cellular networks. SMA controller 120 further uses the protocols discussed above to carry the alarm and activity events to servers in the operator domain for processing. These connections also carry configuration information, provisioning commands, management and reporting information, security authentication, any real-time media such as video or audio, and any data transfer required by locally-executing widget programs.

Figure 3B:
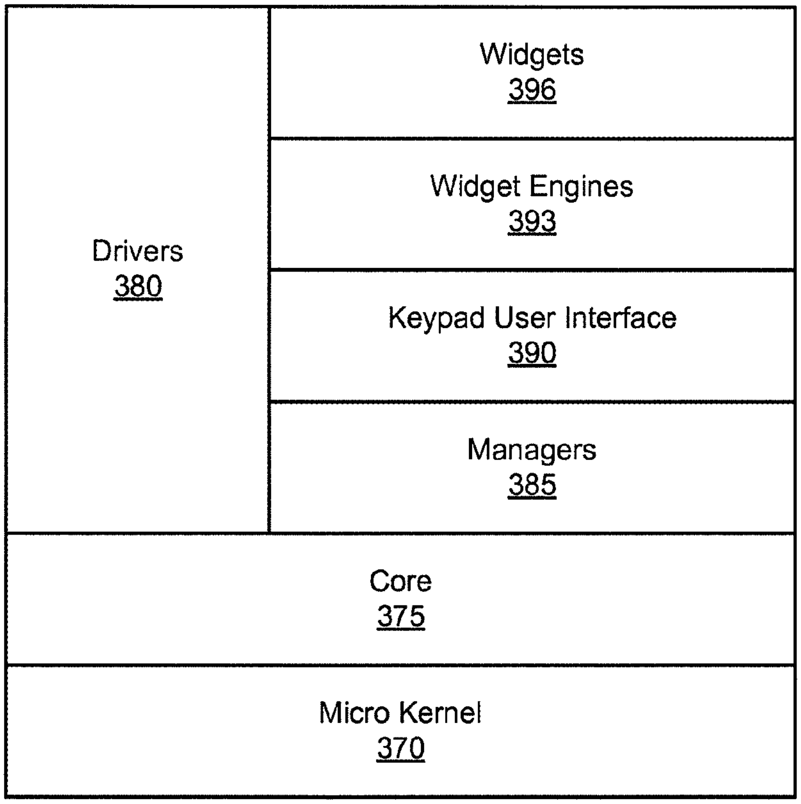
FIG. 3B is a simplified block diagram illustrating a logical stacking of an SMA controller's firmware architecture, usable with embodiments of the present invention.

FIG. 3B is a simplified block diagram illustrating a logical stacking of an SMA controller's firmware architecture, usable with embodiments of the present invention. Since SMA controller 120 provides security functionality for home domain 110, the SMA controller should be a highly available system. High availability suggests that the SMA controller be ready to serve an end-user at all times, both when a user is interacting with the SMA controller through a user interface and when alarms and other non-critical system events occur, regardless of whether a system component has failed. In order to provide such high availability, SMA controller 120 runs a micro-kernel operating system 370. An example of a micro-kernel operating system usable by embodiments of the present invention is a QNX real-time operating system. Under such a micro-kernel operating system, drivers, applications, protocol stacks and file systems run outside the operating system kernel in memory-protected user space. Such a micro-kernel operating system can provide fault resilience through features such as critical process monitoring and adaptive partitioning. As a result, components can fail, including low-level drivers, and automatically restart without affecting other components or the kernel and without requiring a reboot of the system. A critical process monitoring feature can automatically restart failed components because those components function in the user space. An adaptive partitioning feature of the micro kernel operating system provides guarantees of CPU resources for designated components, thereby preventing a component from consuming all CPU resources to the detriment of other system components.

A core layer 375 of the firmware architecture provides service/event library and client API library components. A client API library can register managers and drivers to handle events and to tell other managers or drivers to perform some action. The service/event library maintains lists of listeners for events that each manager or driver detects and distributes according to one of the lists.

Driver layer 380 interacts with hardware peripherals of SMA controller 120. For example, drivers can be provided for touch screen 320, broadband connection 330, WiFi transceiver 335, cellular transceiver 340, USB interface 355, SD interface 365, audio processor 325, and the various modules coupled to processor 310 via SPI interface 350. Manager layer 385 provides business and control logic used by the other layers. Managers can be provided for alarm activities, security protocols, keypad functionality, communications functionality, audio functionality, and the like.

Keypad user interface layer 390 drives the touch screen user interface of SMA controller 120. An example of the touch screen user interface consists of a header and a footer, widget icons and underlying widget user interfaces. Keypad user interface layer 390 drives these user interface elements by providing, for example, management of what the system Arm/Disarm interface button says and battery charge information, widget icon placement in the user face area between the header and footer, and interacting with widget engine layer 393 to display underlying widget user interface when a widget icon is selected.

In embodiments of the present invention, typical SMA controller functions are represented in the touch screen user interface as widgets (or active icons). Widgets provide access to the various security monitoring and automation control functions of SMA controller 120 as well as support for multi-media functionality through widgets that provide, for example, news, sports, weather and digital picture frame functionality. A main user interface screen can provide a set of icons, each of which represents a widget. Selection of a widget icon can then launch the widget. Widget engine layer 393 includes, for example, widget engines for native, HTML and FLASH-based widgets. Widget engines are responsible for displaying particular widgets on the screen. For example, if a widget is developed in HTML, selection of such a widget will cause the HTML widget engine to display the selected widget or touch screen 320. Information related to the various widgets is provided in widget layer 396.

Figure 4:
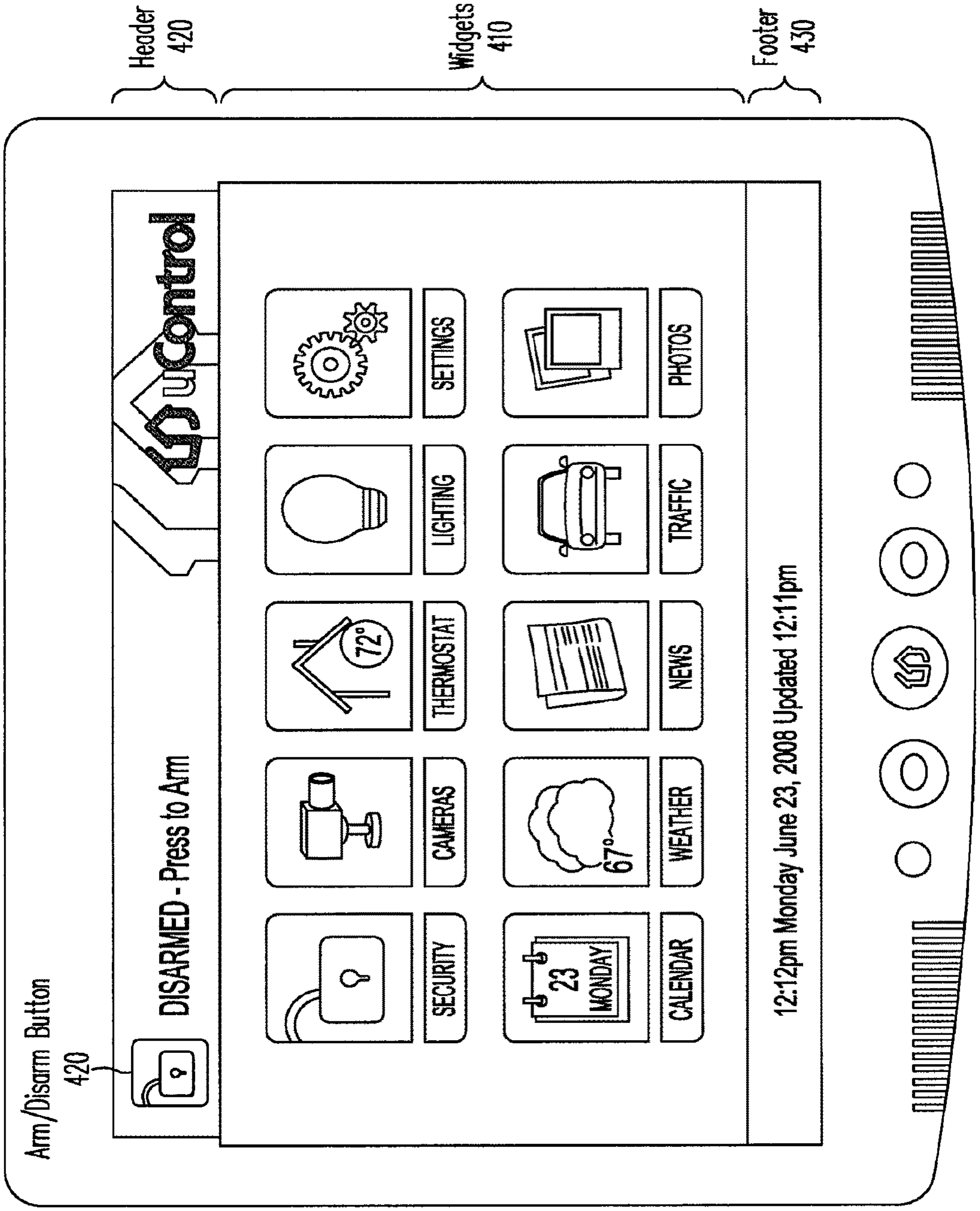
FIG. 4 is an illustration of an example user interface for an SMA controller, usable by embodiments of the present invention.

FIG. 4 is an illustration of an example user interface for an SMA controller 120, according to an embodiment of the present invention. The illustrated user interface provides a set of widget icons 410 that provide access to functionality of SMA controller 120. As illustrated, widgets are provided to access security functionality, camera images, thermostat control, lighting control, and other settings of the SMA controller. Additional widgets are provided to access network-based information such as weather, news, traffic, and digital picture frame functionality. A header 420 provides access to an Arm/Disarm button 425 that allows for arming the security system or disarming it. Additional information can be provided in the header, such as, for example, network status messages. A footer 430 can provide additional status information such as time and date, as displayed.

A user can select widgets corresponding to desired functionality. Embodiments of the present invention provide for access to widgets via portal server 170. A provider of operator domain 160 can determine functionality accessible to users, either for all users or based upon tiers of users (e.g., subscription levels associated with payment levels). A user can then select from the set of accessible widgets and the selected widgets will be distributed and displayed on the user interface of SMA controller 120. Configurability of SMA controller 120 is also driven by user determined actions and reactions to sensor stimulus.

Mechanism for Tracking Event Information

Traditional security systems communicate alarm event information directly to a central station alarm monitoring system. Non-alarm events are not provided to the central station. Nor does the central station provide server-based delay window functionality, as described above. Thus, there is no mechanism for tracking such events.

The operator domain servers, used by embodiments of the present invention, provide a mechanism for tracking all events generated by SMA controllers coupled to the operator domain. As discussed above, through the broadband and cellular communication modules, server 165 maintains persistent communication channels with an SMA controller so as to provide near real-time communication. Through these communication channels, every event (e.g., zone faults, arming/disarming, and the like) registered by an SMA controller is transmitted to a server 165. Further, the servers can detect loss of connectivity between a SMA controller and respond to that loss of connectivity.

As these event messages are received by a server 165, the servers process the event messages and react to the events by providing alerts to users or to a central station alarm monitoring system, if the event is an alarm event. In addition, a server 165 can provide event data to a database server 185 for recording in an event database.

Each record in the event database can include an identifier of the originating SMA controller, an identifier of the type of event, and a time stamp, for example. In addition to this type of event data, SMA controller status can also be recorded in the event database, either as additional information to an event or as a periodic status message. Communication channel status can also be recorded as events in the event database. The database can also include records related to actions taken by the servers in the operator domain in response to the SMA controller messages.

Figure 5:
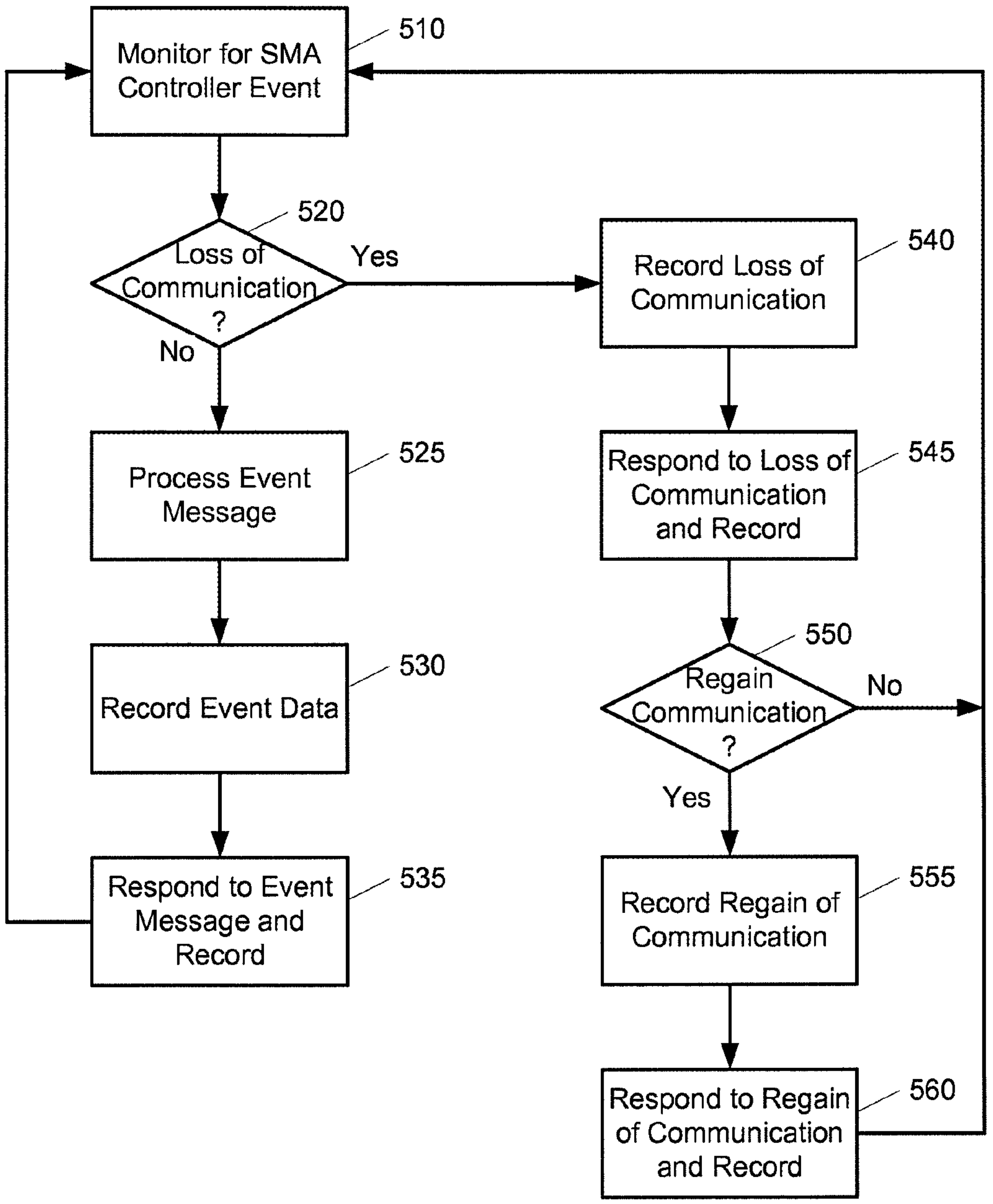
FIG. 5 is a simplified flow diagram illustrating one example of a process performed by an operator domain server to monitor and respond to event message from one or more SMA controllers, according to embodiments of the present invention.

FIG. 5 is a simplified flow diagram illustrating one example of a process performed by an operator domain server (e.g., server 165) to monitor and respond to event message from one or more SMA controllers. A server monitors one of the broadband or cellular networks for events related to an SMA controller supported by the operator domain (510). As discussed above, these events can include zone fault events detected by the sensors coupled to the SMA controller, SMA controller system events such as arming and disarming or power faults, losses in communication with an SMA controller, and the like. If the detected event is not a loss in communication (520), the received event message is processed by the server in the operator domain (525). The event message received from the SMA controller will include an identifier of the SMA controller transmitting the message as well as information related to the nature and source of the event being reported. For example, an event message may include an identifier of a sensor detecting the fault event as well as a time stamp for when the event occurred and other zone information. As the event message is processed, data from the event message can then be recorded in, for example, a database associated with database server 185 (530). Recordation of the event can consist of inclusion of a record in an appropriate table of the database that includes an identifier of the source SMA controller, and other event identifying information. The server can also respond appropriately to the event message and record the nature of and performance of the response in the database (535). For example, if a user of the SMA controller has configured the system to report all occurrences of doors opening and closing to a mobile device, the server can perform that reporting as well as record an entry in the database when the performance of that action has occurred.

If the event is a loss of communication (520), then the server can record an entry in the database reflecting that loss of communication with an identified SMA controller (540). The entry can include not only an identifier of the SMA controller to which communication has been lost, but also information reflecting the communication conduit being utilized when communication was lost, a time stamp of when communication was lost, and the like. Once a loss of communication has been detected, the server can also respond to the loss of communication and record an entry in the database reflecting the nature of that response (545). For example, if the server loses communication with an SMA controller over a broadband connection, a response may be to attempt to regain communication with the SMA controller using a cellular connection (e.g., 154). Another example of a response to loss in communication can be those steps discussed above with regard to a "smash-and-grab" scenario in which a timer is begun and transmission of the alarm event is provided to a central station alarm monitoring system in the event the timer expires. All the steps involved in the "smash-and-grab" scenario can be recorded in the database. If communication is not regained (550), then the system can continue to monitor for additional communication or resumption of communication with the SMA controller (510). If communication is restored (550), then a record can be made reflecting the restoration of communication (555). Any necessary responses to such regaining of communication can also be recorded (560). For example, if resumption of communication and subsequent actions from an SMA controller result in cancellation of timers associated with a "smash-and-grab" alarm event, then those actions can be recorded in the database.

The events stored in an operator domain database, or other data storage system, can be filtered and analyzed as required by the provider. For example, all events recorded for a particular SMA controller (or associated subscriber), can be searched for and included in a report requested either by the subscriber or the provider. Such a report can be made available through a subscriber portal or a management portal. In addition, events can be further filtered based upon event type (e.g., communication failure, zone fault, or fault within a particular zone). As discussed above, another type of report that can be useful is an alarm event report in which all events recorded within a time frame before and after a recorded alarm event for a particular subscriber can be gathered and displayed for review. These events include non-alarm events that may provide insight as to what was occurring within the home domain prior to the trigger of the alarm event and how did the system react in response (e.g., provision of an alarm event to a central station alarm monitoring system within an appropriate delay time). Traditional security systems do not provide this functionality because they do not transmit non-alarm event information to a central station and they do not provide an operator domain functionality for recording all events from a security controller.

An Example Computing and Network Environment

As shown above, the present invention can be implemented using a variety of computer systems and networks. An example of one such computing and network environment is described below with reference to FIGS. 6 and 7.

Figure 6:
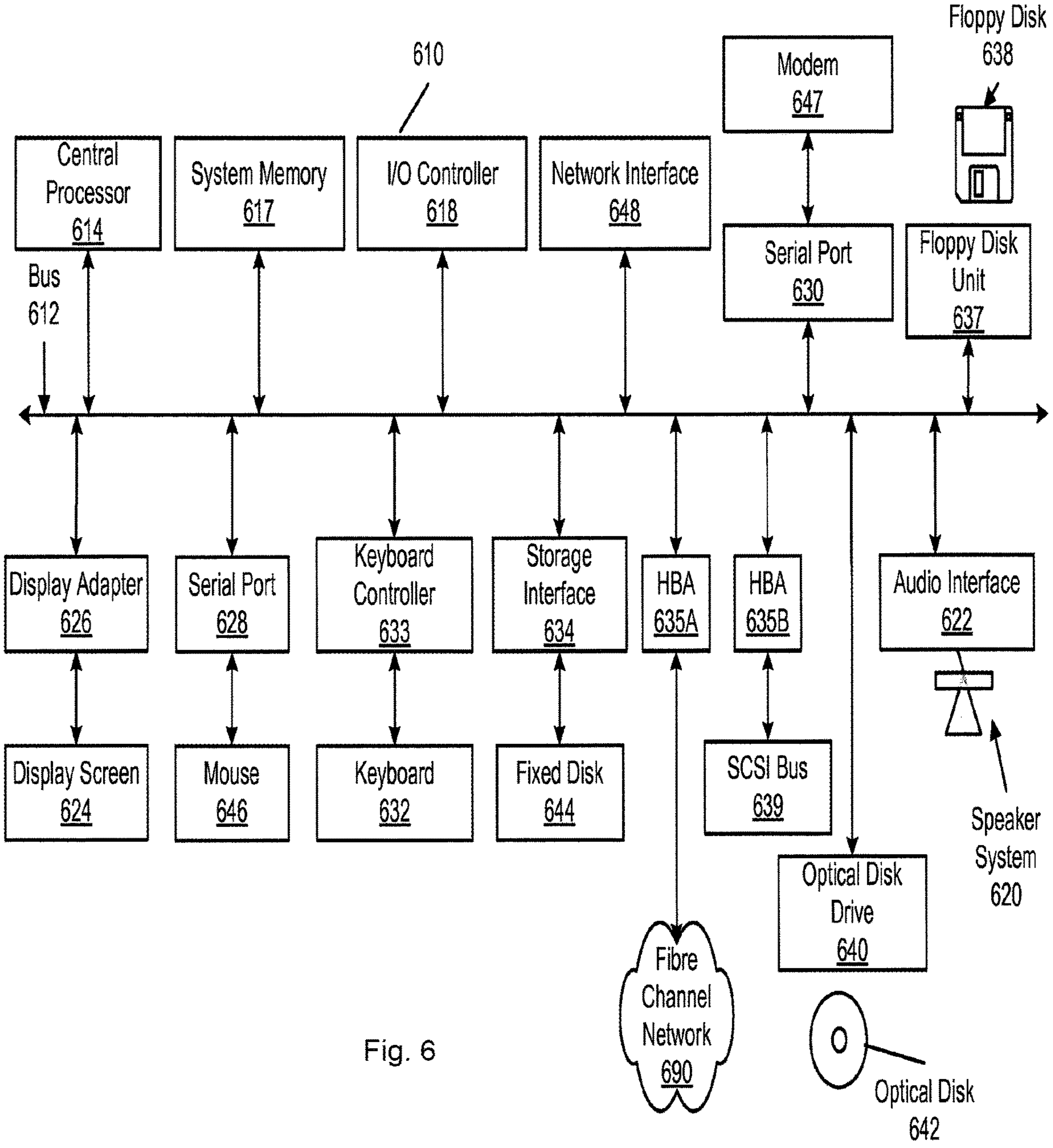
FIG. 6 is a simplified block diagram of a computer system suitable for implementing aspects of the present invention.

FIG. 6 depicts a block diagram of a computer system 610 suitable for implementing aspects of the present invention (e.g., servers 165, portal server 170, backup server 175, telephony server 180, and database server 185). Computer system 610 includes a bus 612 which interconnects major subsystems of computer system 610, such as a central processor 614, a system memory 617 (typically RAM, but which may also include ROM, FLASH RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 612 allows data communication between central processor 614 and system memory 617, which may include read-only memory (ROM) or FLASH memory (neither shown), and random access memory (RAM) (not shown), as previously noted. The RAM is generally the main memory into which the operating system and application programs are loaded. The ROM or FLASH memory can contain, among other code, the Basic Input-Output system (BIOS) which controls basic hardware operation such as the interaction with peripheral components. Applications resident with computer system 510 are generally stored on and accessed via a computer-readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer-readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present invention. The devices and subsystems can be interconnected in different ways from that shown in FIG. 6. The operation of a computer system such as that shown in FIG. 6 is readily known in the art and is not discussed in detail in this application. Code to implement the present invention can be stored in computer-readable storage media such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
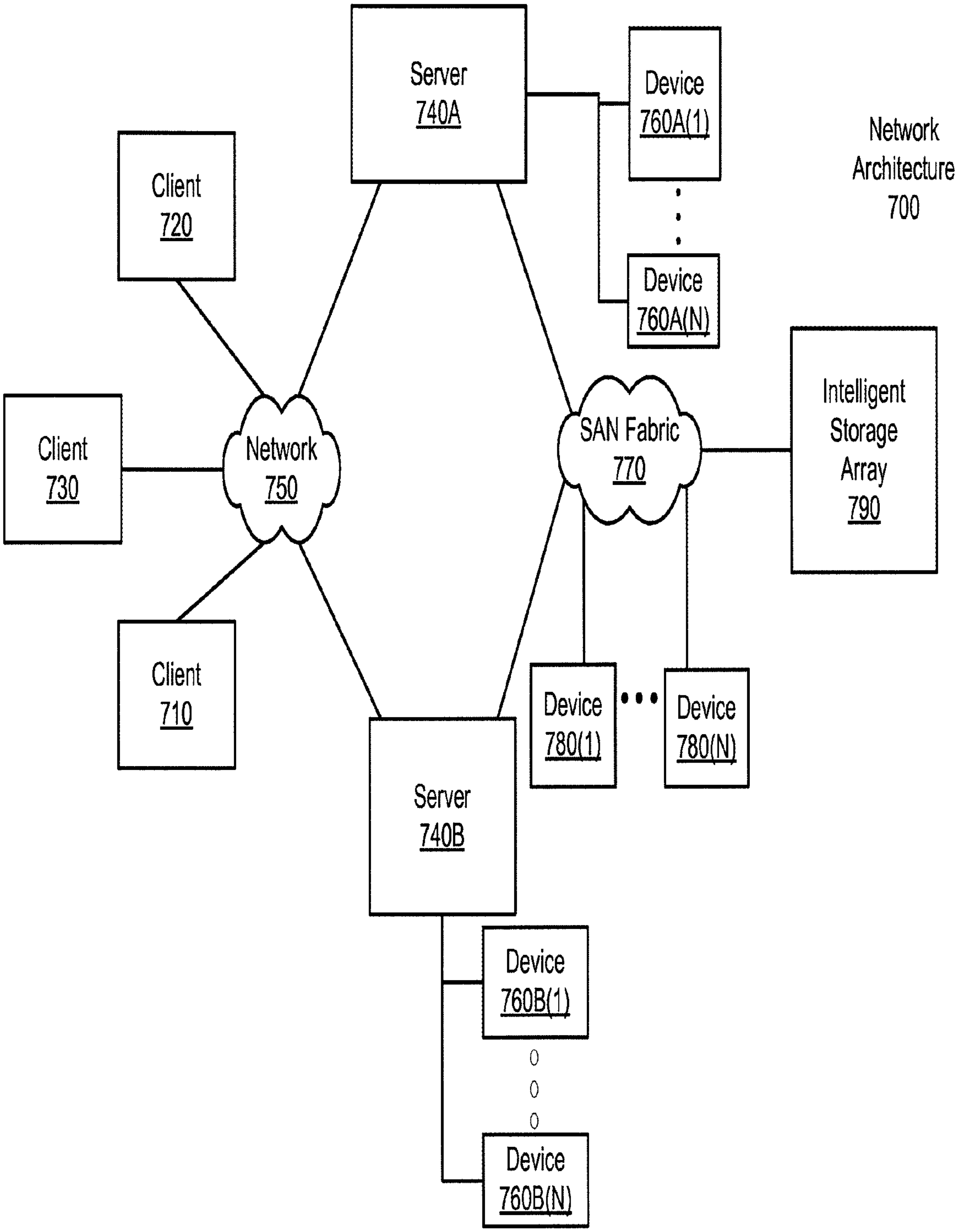
FIG. 7 is a simplified block diagram of a network architecture suitable for implementing aspects of the present invention.

FIG. 7 is a block diagram depicting a network architecture 700 in which client systems 710, 720 and 730, as well as storage servers 740A and 740B (any of which can be implemented using computer system 610), are coupled to a network 750. Storage server 740A is further depicted as having storage devices 760A(1)-(N) directly attached, and storage server 740B is depicted with storage devices 760B(1)-(N) directly attached. Storage servers 740A and 740B are also connected to a SAN fabric 770, although connection to a storage area network is not required for operation of the invention. SAN fabric 770 supports access to storage devices 780(1)-(N) by storage servers 740A and 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720 and 730 to network 750. Client systems 710, 720 and 730 are able to access information on storage server 740A or 740B using, for example, a web browser or other client software (not shown). Such a client allows client systems 710, 720 and 730 to access data hosted by storage server 740A or 740B or one of storage devices 760A(1)-(N), 760B(1)-(N), 780(1)-(N) or intelligent storage array 690. FIG. 7 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 610). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof. For example, specific electronic components can be employed in an application specific integrated circuit or similar or related circuitry for implementing the functions associated with one or more of the described functional blocks.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and FLASH-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein. A non-transitory computer-readable medium includes all forms of computer-readable media except for a transitory, propagating signal.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

The invention claimed is:

1. A method comprising:

determining, by a computing device located at a premises, an alarm event associated with a premise system located at the premises;

determining, by the computing device, a threshold time period associated with the alarm event;

determining, by the computing device, one or more non-alarm events associated with the premises system that occur within the threshold time period of the alarm event; and sending, by the computing device and to a server device located external to the premises, the alarm event and the one or more non-alarm events, wherein the alarm event and the one or more non-alarm event are stored in a data store external to the premises.

2. The method of claim 1, wherein sending the alarm event and the one or more non-alarm events comprises sending an information packet associated with the alarm event and comprising the alarm event and the one or more non-alarm events.

3. The method of claim 1, wherein the one or more non-alarm events comprises at least one of a time delay event, a loss of communication event, a restoration of communication event, a disarming event, or an arming event.

4. The method of claim 1, wherein a user interface allows filtering the non-alarm events stored in the data store external to the premises based on one or more filtering conditions.

5. The method of claim 1, wherein the computing device comprises one or more of a gateway device or a premises system controller.

6. The method of claim 1, wherein a notification is caused to be sent, by one or more of the computing device or the server device, to an additional computing device based on the alarm event and the one or more non-alarm events.

7. A device comprising:

one or more processors; and memory storing instructions that, when executed by the one or more processors, cause the device to:

determine, at a premises, an alarm event associated with a premise system located at the premises;

determine a threshold time period associated with the alarm event;

determine one or more non-alarm events associated with the premises system that occur within the threshold time period of the alarm event; and send, to a server device located external to the premises, the alarm event and the one or more non-alarm events, wherein the alarm event and the one or more non-alarm events are stored in a data store external to the premises.

8. The device of claim 7, wherein the instructions that, when executed by the one or more processors, cause the device to send the alarm event and the one or more non-alarm events comprises instructions that, when executed by the one or more processors, cause the device to send an information packet associated with the alarm event and comprising the alarm event and the one or more non-alarm events.

9. The device of claim 7, wherein the one or more non-alarm events comprises at least one of a time delay event, a loss of communication event, a restoration of communication event, a disarming event, or an arming event.

10. The device of claim 7, wherein a user interface allows filtering the non-alarm events stored in the data store external to the premises based on one or more filtering conditions.

11. The device of claim 7, wherein the device comprises one or more of a gateway device or a premises system controller.

12. The device of claim 7, wherein a notification is caused to be sent, by one or more of the device or the server device, to an additional computing device based on the alarm event and the one or more non-alarm events.

13. A system comprising:

a server device located external to a premises; and a computing device located at the premises and configured to:

determine an alarm event associated with a premise system located at the premises;

determine a threshold time period associated with the alarm event;

determine one or more non-alarm events associated with the premises system that occur within the threshold time period of the alarm event; and send, to the server device, the alarm event and the one or more non-alarm events, wherein the alarm event and the one or more non-alarm events are stored in a data store external to the premises.

14. The system of claim 13, wherein the computing device is configured to send the alarm event and the one or more non-alarm events based on sending an information packet associated with the alarm event and comprising the alarm event and the one or more non-alarm events.

15. The system of claim 13, wherein the one or more non-alarm events comprises at least one of a time delay event, a loss of communication event, a restoration of communication event, a disarming event, or an arming event.

16. The system of claim 13, wherein a user interface allows filtering the non-alarm events stored in the data store external to the premises based on one or more filtering conditions.

17. The system of claim 13, wherein the computing device comprises one or more of a gateway device or a premises system controller.

18. The system of claim 13, wherein a notification is caused to be sent, by one or more of the computing device or the server device, to an additional computing device based on the alarm event and the one or more non-alarm events.

19. A non-transitory computer-readable medium storing computer- executable instructions that, when executed, cause:

determining, by a computing device located at a premises, an alarm event associated with a premise system located at the premises;

determining, by the computing device, a threshold time period associated with the alarm event;

determining, by the computing device, one or more non-alarm events associated with the premises system that occur within the threshold time period of the alarm event; and sending, by the computing device and to a server device located external to the premises, the alarm event and the one or more non-alarm events, wherein the alarm event and the one or more non-alarm events are stored in a data store external to the premises.

20. The non-transitory computer-readable medium of claim 19, wherein sending the alarm event and the one or more non-alarm events comprises sending an information packet associated with the alarm event and comprising the alarm event and the one or more non-alarm events.

21. The non-transitory computer-readable medium of claim 19, wherein the one or more non-alarm events comprises at least one of a time delay event, a loss of communication event, a restoration of communication event, a disarming event, or an arming event.

22. The non-transitory computer-readable medium of claim 19, wherein a user interface allows filtering the non-alarm events stored in the data store external to the premises based on one or more filtering conditions.

23. The non-transitory computer-readable medium of claim 19, wherein the computing device comprises one or more of a gateway device or a premises system controller.

24. The non-transitory computer-readable medium of claim 19, wherein a notification is caused to be sent, by one or more of the computing device or the server device, to an additional computing device based on the alarm event and the one or more non-alarm events.

* * * * *